(12) United States Patent
Ben-Yoav et al.

(10) Patent No.: US 12,535,458 B2
(45) Date of Patent: Jan. 27, 2026

(54) ELECTROCHEMICAL SENSOR AND DETERMINATION OF HYDROXYUREA

(71) Applicant: B.G. NEGEV TECHNOLOGIES AND APPLICATIONS LTD., AT BEN-GURION UNIVERSITY, Beer-Sheva (IL)

(72) Inventors: Hadar Shmuel Ben-Yoav, Ramat Gan (IL); Matan Aroosh, Kiryat Gat (IL); Remi Cazelles, Bordeaux (FR); Rajendra Prasad Shukla, Ghaziabad (IN)

(73) Assignee: B.G. NEGEV TECHNOLOGIES AND APPLICATIONS LTD., AT BEN-GURION UNIVERSITY, Beer-Sheva (IL)

( * ) Notice: Subject to any disclaimer, the term of this patent is extended or adjusted under 35 U.S.C. 154(b) by 307 days.

(21) Appl. No.: 18/268,448

(22) PCT Filed: Dec. 22, 2021

(86) PCT No.: PCT/IL2021/051521
§ 371 (c)(1),
(2) Date: Jun. 20, 2023

(87) PCT Pub. No.: WO2022/137236
PCT Pub. Date: Jun. 30, 2022

(65) Prior Publication Data
US 2024/0369512 A1    Nov. 7, 2024

Related U.S. Application Data

(60) Provisional application No. 63/128,876, filed on Dec. 22, 2020.

(51) Int. Cl.
*G01N 27/416* (2006.01)
*G01N 27/02* (2006.01)
(Continued)

(52) U.S. Cl.
CPC ....... *G01N 27/4166* (2013.01); *G01N 27/026* (2013.01); *G01N 27/333* (2013.01); *G01N 33/49* (2013.01)

(58) Field of Classification Search
CPC .............. G01N 27/026; G01N 27/333; G01N 27/4166; G01N 33/49
See application file for complete search history.

(56) References Cited

U.S. PATENT DOCUMENTS

| | | | |
|---|---|---|---|
| 2003/0011933 A1 | 1/2003 | Tsuchiyama et al. | |
| 2015/0025678 A1 | 1/2015 | Mellars et al. | |

FOREIGN PATENT DOCUMENTS

| | | |
|---|---|---|
| WO | 2007096849 A1 | 8/2007 |
| WO | 2018225058 A1 | 12/2018 |

OTHER PUBLICATIONS

M. Arrosh, Intelligent Multi-Electrode Array for Schizophrenia Treatment Monitoring, in IDS filed on Jun. 20, 2015, presented Nov. 15-30, 2020 (Year: 2020).*

(Continued)

*Primary Examiner* — C. Sun
(74) *Attorney, Agent, or Firm* — Elmore Patent Law Group, PC; Joseph C. Zucchero; Carolyn S. Elmore

(57) ABSTRACT

An electrochemical sensor comprising an array of working electrodes made of noble metals, wherein the array includes: one or more bare working electrode(s); and a first set of working electrodes coated with a first transition metal dichalcogenide, the first set comprises at least subset A and subset B, wherein working electrodes of subset B show the presence of hydroxide form(s) and/or high oxidation state oxide forms(s) of the noble metal, whereas working electrodes of subset A are free of such forms; and/or working electrodes of subset B show higher capacitive currents and lower charge transfer resistance compared to working elec- (Continued)

trodes of subset A, as determined by electrochemical impedance spectroscopy.

17 Claims, 22 Drawing Sheets

(51) Int. Cl.
*G01N 27/333* (2006.01)
*G01N 33/49* (2006.01)

(56) References Cited

OTHER PUBLICATIONS

X. Chia, Electrochemistry of Nanostructured Layered Transition-Metal Dichalcogenides, Chemical Review, 2015 (115), pp. 11941-11966 (Year: 2015).*

Santhosh Kumar Gunapu, D. V, et al., "Facile synthesis and characterization of Poly (3, 4-ethylenedioxythiophene)/Molybdenum disulfide (PEDOT/MoS) composite coatings for potential neural electrode applications", J Appl Electrochem., 50(9), Jun. 18, 2020, 943-958.

Ahmadvand, T., et al., "A Novel Low-Cost Method for Fabrication of 2d Multi-Electrode Array (Mea) to Evaluate Functionality of Neuronal Cells", Proceedings of the 1st International Electronic Conference on Biosensors, Proceedings 60(1), 51, Nov. 2-17, 2020. doi:10.3390/IECB2020-07087, 8 pgs.

Aroosh, M., et al., "Intelligent microelectrodes array for schizophrenia treatment monitoring", Proceedings of the 7th International Electronic Conference on Sensors and Applications; Nov. 15-30, 2020, 4 pgs.

Cazelles, R., et al., "Electrochemical Determination of Hydroxyurea in a Complex Biological Matrix Using Mos2-Modified Electrodes and Chemometrics", Biomedicines, 2021, 9(1), 6https://dx.doi.org/10.3390/biomedicines9010006, 17 pgs.

Cheuqupan, W., et al., "Voltammetric and in situ infrared spectroscopy studies of hydroxyurea electrooxidation at Au(111) electrodes in HClO4 solutions", Electrochim. Acta, 246previous version Electrochemistry Communications, 76, Mar. 2017, pp. 34-37, https://doi.org/10.1016/j.elecom.2017.01.016, 951-962.

Naik, K. M, et al., "Anodic voltammetric behavior of hydroxyurea and its electroanalytical determination in pharmaceutical dosage form and urine", J. Electroanal. Chem., 755http://dx.doi.org/10.1016/j.jelechem.2015.07.038, Oct. 15, 2015, 109-114.

Naik, K. M, et al., "Electrochemical response of hydroxyurea by different voltammetric techniques at carbon paste electrode", Anal. Methods, 5DOI: 10.1039/c3ay41680a, 2013, 6947-6953.

Naik, K. M, et al., "Novel electroanalysis of hydroxyurea at glassy carbon and gold electrode surfaces", J. Electrochem. Sci. Eng., 4(3)doi: 10.5599/jese.2014.0064, 2014, 111-121.

Sun, H., et al., "Gold nanoparticle-decorated MoS2 nanosheets for simultaneous detection of ascorbic acid, dopamine and uric acid", RSC Adv., 2014, 4, DOI: 10.1039/c4ra04046e, 27625-27629.

* cited by examiner

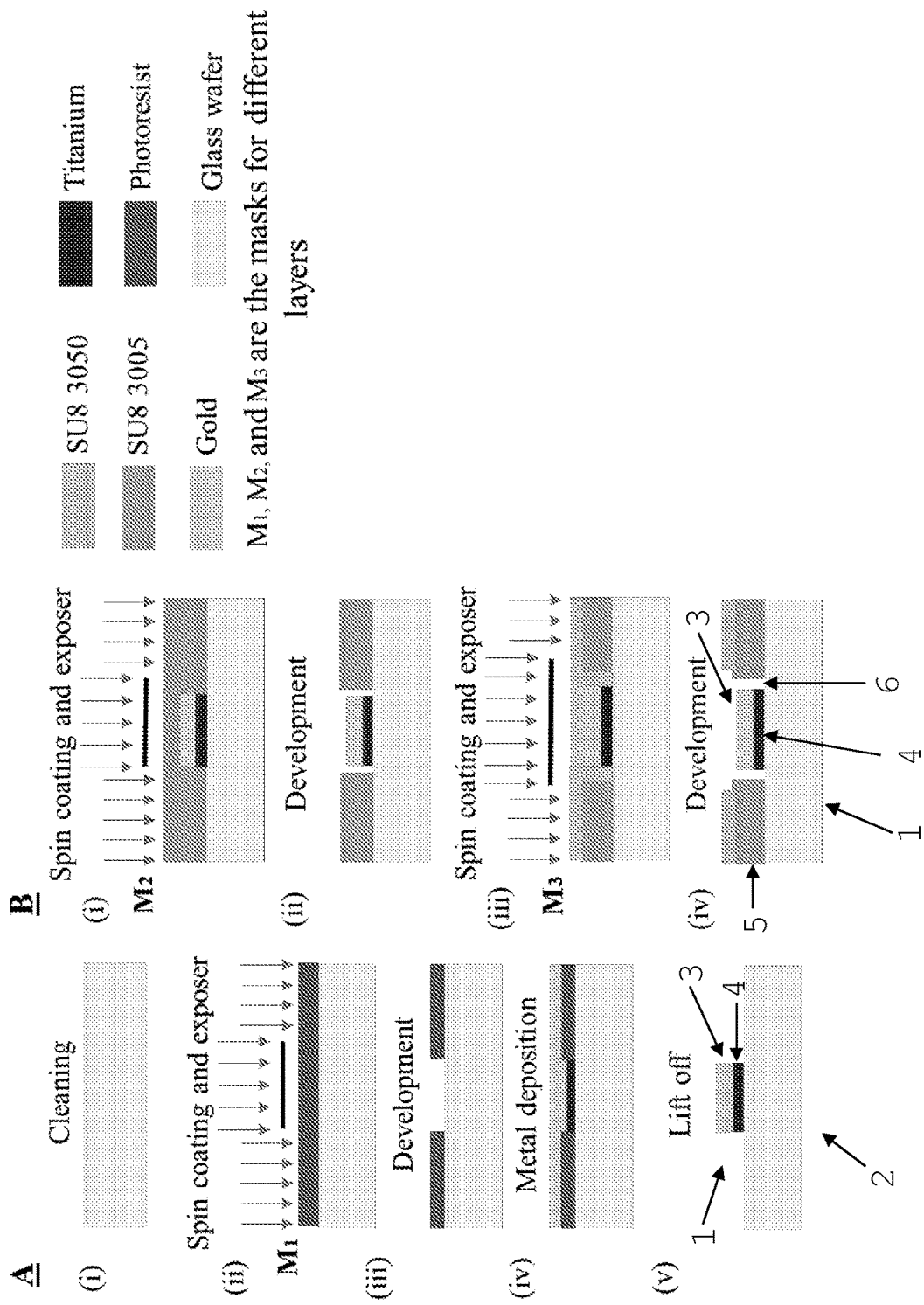

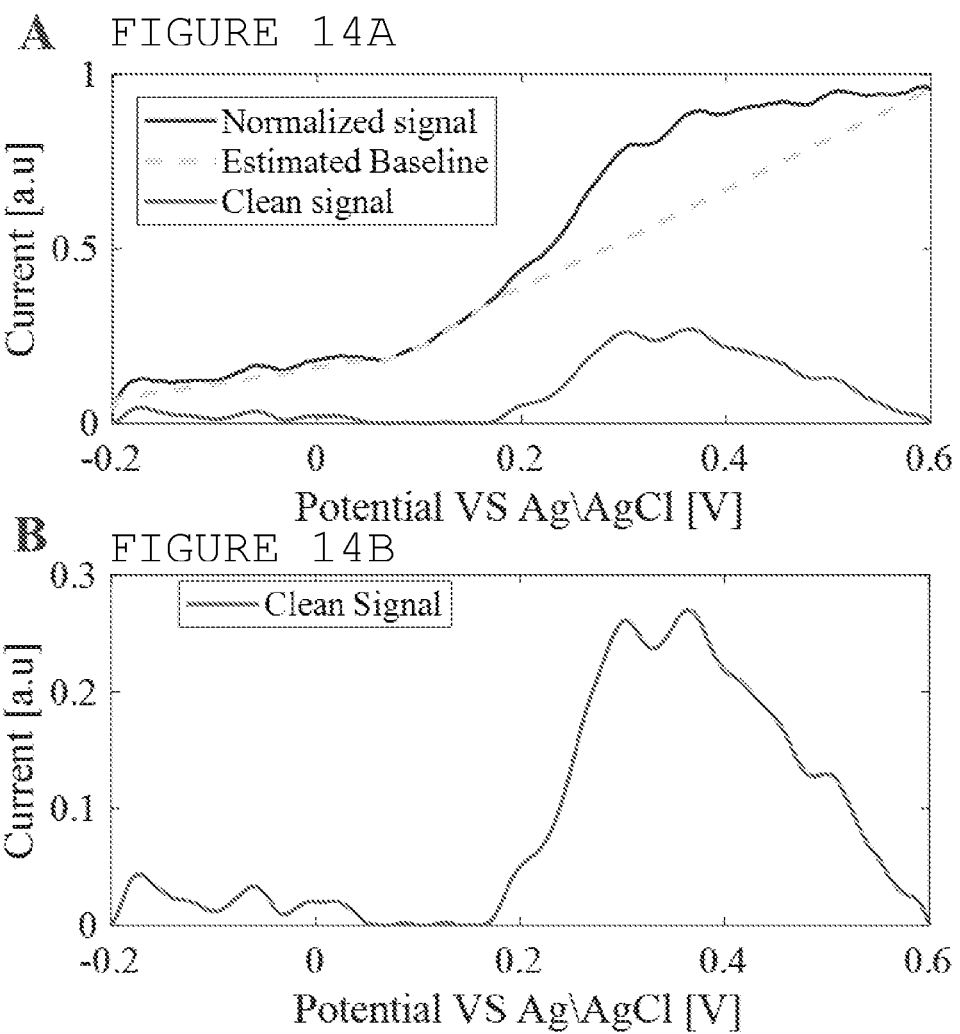

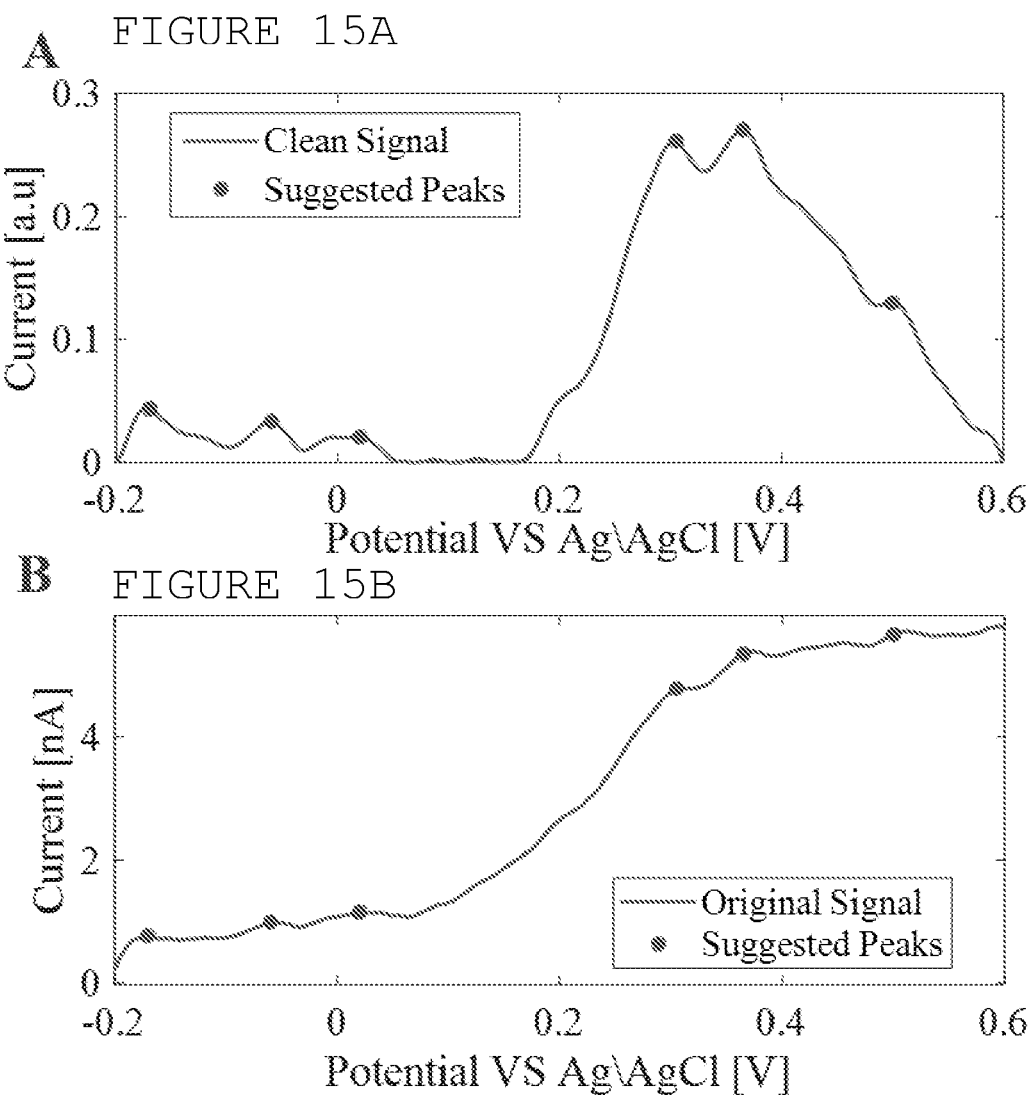

ELECTROCHEMICAL SENSOR AND DETERMINATION OF HYDROXYUREA

RELATED APPLICATIONS

This application is a 371 of International Application No. PCT/IL2021/051521, filed Dec. 22, 2021, which claims the benefit of U.S. Provisional Application No. 63/128,876, filed on Dec. 22, 2020. The entire teachings of the above application(s) are incorporated herein by reference.

BACKGROUND OF THE INVENTION

There exists a need to determine drug concentrations in biofluid samples taken from patients prescribed with certain drugs, e.g., anticancer drugs, to generate individualized dosing regimen and thereby maximize treatment efficacy.

Some drugs lend themselves to electrochemical detection e.g., in blood or urine samples, owing to their ability to undergo oxidation-reduction reaction to produce concentration-dependent electrochemical signal. A frequently used electrochemical technique is voltammetry, which is based on a measurement setup consisting of a working electrode, a counter electrode and optionally a reference electrode, electrically connected to a potentiostat. The current at the working electrode is measured as the potential applied across the working electrode is varied with time. When electroactive species are present in the tested sample, they undergo oxidation (or reduction) when the potential on the working electrode is sufficiently positive (or negative). The oxidation/reduction electrochemical reactions are indicated by an increase in the current (anodic or cathodic) measured; that is, the creation of an electrochemical signal with position and magnitude characteristic of a given analyte.

Hydroxyurea ($H_2N-C(O)NHOH$; an orally administrable medicine approved in the USA and Europe for Sickle cell anemia and treatment of certain types of cancer) is an example of a drug, which is potentially detectable electrochemically in plasma or blood samples. Nonetheless, current standard methods for testing hydroxyurea blood levels are based on chromatographic analysis, and little has been reported on the electrochemical oxidation of hydroxyurea. For example, Naik et al. studied the process at carbon paste surface [Anal. Methods. 2013, 5, 6947-6953]. The same research group also reported the electroanalysis of hydroxyurea at glassy carbon and gold surface electrodes [J. Electrochem. Sci. Eng. 4 (3), 111-121 (2014) and graphite electrodes [J. Electroanal. Chem (2015), 755, 109-114]. Another report showing the electrochemical activity of hydroxyurea is by Cheuqupán et al. [Electrochim. Acta 2017, 246, 951-962].

To gain commercial acceptance, an electrochemical sensor of hydroxyurea must solve the problem of interfering signals generated by other electro-active species present in the blood, to enable determination of hydroxyurea concentrations in human plasma with acceptable limit of detection. For example, redox active molecules such as uric acid and ascorbic acid may generate electrochemical signals that mask the signature of hydroxyurea. For this reason, working electrodes showing high specificity toward hydroxyurea are needed.

Another approach involves the use of an electrochemical sensors in which, instead of a single, highly selective working electrode, an array consisting of distinct working electrodes is utilized. Such an approach was shown in US 2003/011933 and WO 2007/096849, i.e., an array based on working electrodes made of different noble metals, and in US 2015/0025678 and co-assigned WO 2018/225058, where a few working electrodes, surface-modified by different types of coatings, were assembled to create an electrochemical sensor (e.g., a working electrode coated with chitosan, optionally with carbon nanotubes in the coating, and reduced graphene oxide-coated working electrode). Coupled with a processor adapted for machine learning and chemometrics, a device is provided for detecting analytes of interest, by resolving a complex electrochemical signal assigned to the analyte of interest and interfering substances.

THE INVENTION

We have found that the electrochemical detectability of hydroxyurea is greatly improved, e.g., by voltammetry measurements, with the aid of a surface modified working electrode that is coated with transition metal dichalcogenide (TMDC). TMDCs are of the formula $MX_2$, in which M is a transition metal (such as molybdenum and tungsten) and X is S or Se.

Experimental results reported below show the benefits received from the use of TDMC-coated working electrodes, e.g., the ability of $MoS_2$-coated gold electrode to quantify hydroxyurea over a broad potential range, including at <0 $V_{Ag/AgCl}$, and overall increased sensitivity across the potential range through which the voltammetry technique was tested, compared to the corresponding bare (non-coated) gold electrode. The limit of detection (LOD) for hydroxyurea at the $MoS_2$-modified electrode is also improved, compared to the bare gold electrode. Unlike the bare electrode, the TMDC-modified electrode enables accurate quantification of hydroxyurea at two different potentials within the relevant clinical concentration range (e.g., ranging from 50 to 500 µM, corresponding to 3.8 mg/L to 38 mg/L).

Accordingly, one aspect of the invention is an electrochemical analysis method, comprising determining the concentration of hydroxyurea in a sample by voltammetry over transition metal dichalcogenide-coated working electrode. More specifically, an electrochemical analysis method of determining hydroxyurea in a biofluid is provided, comprising placing a biofluid sample in a cell which contains at least one working electrode, a counter electrode and optionally a reference electrode, wherein the working electrode is coated with a transition metal dichalcogenide, applying one or more voltammetry techniques to record one or more voltammogram(s), and acquiring the concentration of hydroxyurea from said voltammogram(s).

Coating of an electrode surface (e.g., gold electrode) with transition metal dichalcogenide such as $MoS_2$ can be achieved by electrodeposition. We have found that assembly of two or more TMDCs-modified working electrodes in an electrochemical sensor, where the TMDC films are produced in a different fashion, i.e., under different electrodeposition conditions, alongside a bare working electrode, enables even better detection of hydroxyurea. Experimental results reported below indicate that with the aid of the novel sensor and application of voltammetry techniques such as differential pulse voltammetry (DPV), cyclic voltammetry (CV) and chronoamperometry (CA), in combination with chemometrics tools, utilizing mathematical procedures such as principal component analysis and multivariable partial least square regression (MVLRA), the electrochemical data generated by the voltammetry techniques at the bare and the TMDC-modified electrodes could be processed, to enable quantification of hydroxyurea in human serum.

The general approach underlying the invention is shown schematically in FIG. 1A. The concentration of hydroxyurea is determined from one or more electro-analytical techniques mentioned above, using multivariate analytical tools. FIG. 1A also illustrates the basic sensor of the invention, consisting of one bare working electrode (e.g., made of gold), and two TMDC-coated working electrode, where $\psi_A$ and $\psi_B$ and indicate that TMDC-coated working electrodes (e.g., $MoS_2$-coated gold electrodes) were created using different waveform polarization $\psi_A$ and $\psi_B$, which correspond to electrodeposition of $MoS_2$ from a deposition solution onto the surface of the electrode by cycling the potential (cyclic voltammetry) over potential range A and potential range B as defined below, employing suitable scanning rates.

Potential range A corresponds to the electrochemical double layer (EDL) potential region of the working electrode. Potential range B extends to more positive potentials than potential range A. For gold electrode, potential range A is above −0.4 V, e.g., from −0.3 to +0.7 V (vs Ag/AgCl) and potential range B is above −0.4 V and extends up to +1.3 V or up to +1.4 V (vs Ag/AgCl), e.g., from 0 to +1.4 V (vs Ag/AgCl).

By $TMDC^A$ and $TMDC^B$, for example, $MoS_2^A$ and $MoS_2^B$, we indicate TMDC coatings electrodeposited on an electrode surface by cycling the potential range A (EDL) at a scanning rate of at least 0.05 V·s$^{-1}$, e.g., from 1.0 to 10.0 V·s$^{-1}$, and potential range B (extended EDL) at a scanning rate of at least 0.05 V·s$^{-1}$, e.g., from 0.05 to 2.0 V·s$^{-1}$. Comparative data provided in the experimental section below indicate a that previously reported electrodeposition protocol of $MoS_2$ on gold electrodes [Sun, H. et al. RSC Adv. 2014, 4, 27625-27629], which consisted of cycling the potential 10 times at 50 mV s$^{-1}$ between −1.0 and +1.0 $V_{Ag/AgCl}$, has led to the formation of $MoS_2$-coated gold electrodes that are different from the $MoS_2^A$ and $MoS_2^B$-coated gold electrodes, e.g., creation of sulfur defects at E<−0.5 $V_{Ag/AgCl}$. The TMDC-coated electrodes of the invention are devoid of such defects.

Experimental results reported below show that working electrodes which were coated with $TMDC^A$ and $TMDC^B$ layers differ from one another is several respects, as indicated by FIG. 1B and the data tabulated in Table 1 below.

One way to differentiate between $TMDC^A$-coated electrodes and $TMDC^B$-coated electrodes is that the latter type show the presence of hydroxide or oxide species associated with the metal electrode, e.g., for gold electrode, concomitant formation of a gold hydroxide adduct and the formation of a gold oxide layer occur (at +0.8 V vs Ag/AgCl and at +1.3 V vs Ag/AgCl in the extended EDL region, respectively), as determined, for example, by Raman spectroscopy or X-ray photon spectroscopy.

Another way to differentiate between $TMDC^A$-coated electrodes and $TMDC^B$-coated electrodes is that the former type show lower capacitive currents (e.g., at least two-fold lower) and higher charge transfer resistance (e.g., at least ten fold-higher) than the latter type, as measured by electrochemical impedance spectroscopy (EIS) acquired by a solution the of ferrocyanide/ferricyanide redox couple $[Fe(CN)_6^{3-} \leftrightarrow Fe(CN)_6^{4-}]$ by the technique described in detail Example 2 in reference to FIG. 3.

Accordingly, another aspect of the invention relates to electrochemical sensor comprising an array of working electrodes made of noble metals, wherein the array includes:
one or more bare working electrode(s); and
a first set of working electrodes coated with a first transition metal dichalcogenide, the first set comprises at least subset A and subset B, wherein working electrodes of subset B show the presence of hydroxide form(s) and/or high oxidation state oxide forms(s) of the noble metal, whereas working electrodes of subset A are free of such forms; and/or working electrodes of subset B show higher capacitive currents and lower charge transfer resistance compared to working electrodes of subset A, as determined by electrochemical impedance spectroscopy.

Another aspect of the invention relates to an electrochemical sensor comprising an array of working electrodes made of noble metals, wherein the array includes:
one or more bare working electrode(s); and
a first set of working electrodes coated with a first transition metal dichalcogenide, the first set comprises at least subset A and subset B, wherein the transition metal dichalcogenide coatings of subsets A and B are obtainable by electrodeposition of the first transition metal dichalcogenide onto the surfaces of the working electrodes across potential ranges A and B, respectively, wherein potential range A corresponds to the double layer potential region of the noble metal working electrode and potential range B extends to more positive potentials than potential range A.

The noble metals of which the working electrodes are made include, for example, gold, platinum, rhodium and iridium. Gold is generally preferred, both for use as bare microelectrode and surface-coated electrodes.

We have also prepared and tested a modification of the general design described above, incorporating into the electrochemical senor a second set of working electrodes coated with a second transition metal dichalcogenide (i.e., that is different from the first transition metal dichalcogenide). The second set of TMDC-coated working electrodes comprises at least subset A and subset B, akin to the subsets A and B of the first set of TMDC-coated working electrodes. For example, the first transition metal dichalcogenide is molybdenum disulfide ($MoS_2$) and the second transition metal dichalcogenide is tungsten disulfide ($WS_2$). That is, the electrochemical sensor includes one or more $MoS_2^A$-coated electrodes, one or more $MoS_2^B$-coated electrodes, one or more $WS_2^A$-coated electrodes and one or more $WS_2^B$-coated microelectrodes.

In addition to TMDC-coated electrodes, the electrochemical sensor of the invention could benefit from the incorporation of other types surface-modified working electrodes, to enhance sensitivity toward the analyte in question, e.g., one or more polysaccharide (e.g., chitosan)-coated electrodes and one or more reduced graphene oxide-coated electrodes. Coatings made of chitosan and reduced graphene oxide can be created by electrodeposition, as illustrated below. Part of the coatings that modify the surface of the working electrodes used to sense hydroxyurea are in the form of thin films and others are in the form of thick films. By "thin film" and "thick film" we mean that the thickness of the film is in the range from 1 to 3,000 nm and 3 to 100 µm, respectively. Transition metal dichalcogenide and reduced graphene oxide are electrodeposited in the form of thin films whereas polysaccharide such as chitosan create thick films when deposited from their solutions onto electrode surface. Thickness of the coatings can be measured using atomic force microscopy (thin films) and profilometry (thick films).

In operation, the working electrodes of the electrochemical sensor are electrically connected to a potentiostat or a galvanostat which control the potential or current of the working electrodes, respectively (the counter electrode and one or more reference electrodes are preferably incorporated into the sensor, but external electrodes could be used as well), to create a data set of electrochemical signals when the electrodes are in contact with the test sample. The data set of electrochemical signals is analyzed by a processor applying one or more chemometric techniques.

The invention further relates to microfabrication-based configurations for the electrochemical sensor, i.e., microsensors. Miniature electrochemical sensors are especially needed for medical applications, because the volumes of blood samples available for measurements are very small (finger-prick blood samples, e.g., 10 to 30 μm, ~ 20 μm).

With a microsensor design, a counter electrode and one or more reference electrodes are integrated in the microsensor, i.e., a gold counter electrode and one or more Ag/AgCl reference electrodes are deployed on the microsensor, e.g., a chip that is illustrated in detail below.

One preferred electrochemical microsensor comprises:
1) one or more bare microelectrodes;
2) one or more $MoS_2^A$-coated microelectrodes;
3) one or more $MoS_2^B$-coated microelectrodes;
and optionally
4) one or more $WS_2^A$-coated microelectrodes;
5) one or more $WS_2^B$-coated microelectrodes;
6) one or more polysaccharide-coated microelectrodes;
7) one or more reduced graphene oxide-coated microelectrodes; and
8) one or more reference microelectrodes; and
9) a counter microelectrode.

The total number of microelectrodes in the microsensor is designated by the capital letter N. The number of microelectrodes in each of the nine subsets set out above is indicated by $n_1$, $n_2$, $n_3$, $n_4$, $n_5$, $n_6$, $n_7$, $n_8$ and $n_9$, respectively. For example: $N=\{1 \leq n_1 \leq 5;\ 1 \leq n_2 \leq 5;\ 1 \leq n_3 \leq 5;\ 1 \leq n_4 < 5;\ 1 \leq n_5 \leq 5;\ 1 \leq n_6 \leq 5;\ 1 \leq n_7 \leq 5;\ 1 \leq n_8 \leq 3;\ n_9 = 1\}$.

Preferred design of the microsensor of the invention and its method of preparation are now described in reference to FIGS. 9 and 10.

In the microsensor of the invention, the working microelectrodes and the one or more reference microelectrode(s) are in the form of microstructures (1) placed on a base substrate (2), wherein a microstructure comprises an electrode layer (3), optionally disposed atop of an adhesion layer (4) attached to the substrate, wherein the microstructures are spaced apart from each other, with a wall (5) encircling each microstructure, said wall protruding from the surface of the substrate and made of electrically insulating polymer. The working microelectrodes are surface modified by the coatings described above.

A preferred design shown in FIG. 10 and in FIG. 9C consists of the working microelectrodes (WE) and the one or more reference electrodes (RE) being placed around a circular-shaped counter electrode (CE), equidistantly from the perimeter of the counter electrode, wherein the counter electrode (CE) is encircled by a wall (5) protruding from the surface of the substrate and made of electrically insulating polymer.

Each of the N−1 working and reference microelectrodes (WE/RE) and also the counter electrode (CE) is individually confined within a microchamber, defined by the wall (5) encircling the microstructure, which corresponds in shape and size to the microelectrode (there is a very small gap (6) between the wall (5) surrounding the microstructure and the microstructure), leaving the upper surface of the microelectrode accessible to a solution/liquid sample. The entire set of N electrodes is encircled by a wall (7) defining a larger microchamber, i.e., receptable for holding a solution/liquid sample. The volume of the receptable is about 10 to 30 μL.

For example, the working microelectrodes, reference electrode(s) and counter electrode and all are patterned on a base substrate made of glass or silicon/silicon oxide, the adhesion layer (4) is made of titanium and the electrode layer (3) is made of gold, with the working microelectrodes being modified by $MoS_2^A$ coatings, $MoS_2^B$ coatings, $WS_2^A$ coatings, $WS_2^B$ coatings, polysaccharide (e.g., chitosan) coatings and reduced graphene oxide coatings.

One especially preferred microsensor of the invention is illustrated in FIG. 10, with $N=24$; $n_1=n_2=n_3=n_4=n_5=n_6=n_7=3$; $n_8=2$; $n_9=1$. Experimental results reported below indicate that with the aid of this specific design of FIG. 10, hydroxyurea was accurately determined in clinical blood samples obtained from children affected with sickle cell disease.

The disc-shaped counter electrode is, e.g., of diameter in the range from 200 to 1000 μm. The diameter of each individual working (or reference) microelectrode, is from 10 to 150 μm. Thus, as shown in FIGS. 9 and 10, there is one big bare gold electrode in the center to be used as a counter electrode, surrounded by a total of twenty one working microelectrodes and two reference microelectrode; the two reference microelectrodes are Ag/AgCl electroplated reference microelectrode. The surface area of the counter electrode is preferably higher than the total surface area of all the twenty-one working electrodes, to ensure that the half-cell reaction occurring at the counter electrode is fast enough so that it will not affect the process at working electrodes.

As explained above, the microstructures (microelectrodes, wall defining microchambers encompassing the microelectrodes, all confined within a recessed zone that serves as a receptable for holding the liquid sample) can be created at the desired sites over the substrate by techniques such as etching and photolithography. The latter technique is preferred and is illustrated in detail in the experimental work reported below, in reference to FIG. 9.

Briefly, as can be seen from FIG. 9, microelectrodes (1) are patterned on a substrate (2), e.g., a wafer made of oxidized silicon, e.g., a glass substrate or silicon/silicon oxide. The fabrication consists of the following steps. The substrate is cleaned (A(i)). A first photoresist is applied (either negative, positive or image reversal resist), e.g., by spin coating, spray coating or dip coating, to produce a thin uniform layer on the substrate, followed by soft baking. A first mask $M_1$ is aligned, to transfer the pattern corresponding to electrodes' sites onto the surface of the substrate. The photoresist is exposed through the pattern on the mask with UV light, followed by a development step (A(ii)-A(iii)).

Next (A(iv)), bare microelectrodes are deposited in the intended sites, e.g., first titanium which serves as an adhesion layer (4) and then gold (3). Deposition of an adhesion layer (4), e.g., a titanium layer or chromium layer (which adheres strongly to the glass substrate) onto the cleaned substrate is by electron beam evaporation or magnetron sputtering, to create 20 to 30 nm thick adhesion layer), followed by deposition of the electrode active metal, e.g., 180 to 300 nm thick gold layer, onto the adhesion layer, also by the same techniques). However, the adhesion layer is optional. This is followed by lift off procedure (A(v)) that results in creation of individual gold microelectrodes on glass substrate.

As explained above, each of the titanium/gold microstructures need to be encircled by a wall (5), defining chambers occupied by the microelectrodes, and a large recessed area for receiving the 10-30 μL liquid sample should also be patterned. This is accomplished again by photolithography, as shown in B(i)-B(ii) in FIG. 9 and explained in detail in the experimental part below. After spin coating of a negative photoresist (e.g., SU8 3005) and soft baking step, a suitably designed mask $M_2$ is applied, masking the areas which are atop of the electrode surface, such that on exposure to UV light and development, the unexposed part of the negative photoresist could be dissolved and removed. As a result, the top faces of the electrodes are uncovered, to be accessible to the electrolyte solution. The exposed areas of the negative photoresist remain on the substrate, creating the walls (5) surrounding the titanium/gold electrodes, as shown in FIG. 9, step (B(ii)). The developed wafer is washed and dried before it undergoes a hot baking step, followed by cleaning (oxygen plasma). The height of the walls defining the chambers enclosing the electrodes is about 5 to 100 microns. Then, a third photolithography step is carried out (Biii)-B (iv)), (e.g., thick SU-8 resist, e.g., SU8 3050), to provide the chamber for receiving the solution i.e., creating a wall surrounding the entire set of N electrodes (best seen as numeral 7 in 9C(iii). An optical image of the whole microfabricated electrochemical chamber patterned is shown in FIG. 9C.

FIG. 9 shows just one approach to the structuring of electrodes on a wafer. The application of positive, negative or image reversal photoresists is often a matter of choice and convenience. Also, structuring via etching (i.e., wet etching/dry etching) could be used in place of lift-off procedures.

Having patterned the microstructures on the substrate, the desired coatings are applied on the gold microelectrodes, for example, by electrodeposition. In general, formation of a coating onto the surface of a microelectrode can be accomplished from a deposition solution by the following electrodeposition techniques:
  (i) galvanostatic electrodeposition (chronopotentiometry), in which a constant current is passed through the microelectrode(s) to be coated;
  (ii) potentiostatic electrodeposition (chronoamperometry), in which a constant potential is applied on the working microelectrode(s) to be coated; or
  (iii) cyclic voltammetry electrodeposition.

When on-chip reference Ag/AgCl microelectrode(s) are desired, then it is better to start the surface modification of the multielectrode array with the production of these reference microelectrodes, i.e., by creation of Ag/AgCl coatings onto one or more microelectrodes. This is achieved via a twostep process; 1) Ag electroplating, and 2) 1 Ag anodization in a chloride solution.

In the first step, a suitable Ag electrodeposition solution is prepared by dissolving in water a silver source (e.g., $AgNO_3$ or $Ag_2SO_4$, at a concentration from 3 to 10% by weight). Stabilizers such as piperazine which prevent the silver ions from forming nanoparticles can also be added. The solution is made somewhat alkaline (e.g., $8 \leq pH \leq 10$) by addition of a weak base such as ammonium hydroxide. The electrodeposition is driven effectively in a continuously stirred $Ag^+$ deposition solution (agitation rate is from 50 to 400 RPM), using a two-electrode cell configuration, with the application of a constant current from a DC source or a galvanostat. A cathodic current, fixed in the range from 0.1 to 100 A m$^{-2}$, is passed between the electrodes. In case that more than one reference microelectrode is sought to be included in the array, these are then microelectrodes connected simultaneously to the counter electrode to become electroplated with silver ($Ag^0$) layer by the reduction of $Ag^+$ from the solution. In general, the electroplating lasts a few minutes, usually not more than fifteen minutes, depending on the concentration of the deposition solution, agitation rate, etc.

In the second step, about quarter to third of the amount electrodeposited metallic silver on the microelectrode is converted into AgCl(s) through electrochemical anodization of the silver-coated microelectrodes in a continuously stirred aqueous chloride solution such as hydrochloric acid or sodium chloride, at a constant voltage. A three-electrode configuration can be used, which includes the silver-coated microelectrodes as working electrode(s), Ag/AgCl as reference electrode, and a ring or wire Pt counter electrode. A fixed voltage in the range from 0 to 0.5 V, for example, about 0.2V (vs Ag/AgCl) is applied to the Ag-coated microelectrodes over five to fifteen minutes. Through this twostep process, two or more Ag/AgCl reference microelectrodes are incorporated into the multielectrode array.

Next, the working microelectrodes (divided into subgroups, as explained above) are modified to create the desired coatings onto their surface (each subgroup of working microelectrodes possesses the same coating). The microelectrode coatings were done in the order of lowest pH coating solution to highest pH coating solution. A reverse order of coatings' formation is undesired because strongly acidic (low pH) coating solutions may affect previously prepared coatings.

One type of film-forming material that is applied to create film-coated microelectrode(s) in the microsensor device of the invention is reduced graphene oxide. The deposition solution is prepared by known methods, e.g., the Hummers' method, where oxidation of graphite flakes or powder takes place upon adding the graphite to a cold solution of sulfuric acid (e.g., 0° C.) followed by gradual addition of sodium nitrate and potassium permanganate under continuous stirring. For example, on a laboratory scale, the addition time of each of the successively added $NaNO_3$ and $KMNO_4$ reagents is not less than ten to fifteen minutes. On completion of reagent's addition, the reaction mixture is heated to about 35-45° C. and kept under stirring for a couple of hours, e.g., not less than two hours. The reaction is terminated by addition of water and hydrogen peroxide which removes excess permanganate. The graphene oxide is recovered by centrifugation and freeze dried and used to prepare deposition solution with concentrations in the range from 0.1 to 0.9 mg/ml GO. A deposition solution can also be prepared by a modified Hammers procedure, which consists of adding the graphite powder (or flakes) to a mixed sulfuric acid/phosphoric acid solution (e.g., proportioned about 9:1 by volume), followed by the slow addition of $KMnO_4$. The mixture is kept under stirring for couple of hours at a slightly elevated temperature (at 30-35° C.) until the mixture acquires a dark green color. Termination of the reaction is achieved by slow addition of $H_2O_2$ aqueous solution (e.g., the commercial 30% w/w solution). Graphene oxide is recovered through acidification of the mixture by hydrochloric acid (e.g., addition of commercial 32% HCl solution and DI), centrifugation of the resulting solution, washing of the supernatant with HCl/water, drying of the washed solution (e.g., at 90° C. in an oven) and collecting the GO powder. The dried GO powder is dissolved in DI, usually up to concentration of 0.5 g/L GO concentration. Addition of an electrolyte to the GO solution affords the GO electrodeposition solution. Next, r-GO is obtained electrochemically from the GO solution onto the microelectrode (Au) surface, using cyclic voltammetry electrodeposition, in a three-electrode cell configuration consisting of the microelectrode(s) as working electrode(s); an externally applied Pt wire as counter electrode and Ag/AgCl as reference electrode. The GO solution is added to the chamber; a potential window, for example from −1.4. to 1.4V (versus Ag/AgCl) is scanned at rate of in the range of to 50 to 500 mV/s, with number of cycles varying from 1 to 5.

Next, electrodeposition of $MOS_2^A$, $MOS_2^B$, $WS_2^A$ and $WS_2^B$ films on the surface of one or more microelectrode(s) are carried out by cyclic voltammetry, using a three-electrode configuration, which includes the microelectrode(s) to be coated as working electrode(s), Ag/AgCl as reference electrode and a ring or wire Pt counter electrode, by scanning the potential window A of −0.3 to 0.7 V (versus Ag/AgCl) at rate of 0.05 to 5 V/s, with number of cycles varying from 100 to 800; and by scanning the potential window B of 0 to +1.4 V (versus Ag/AgCl) at rate of 0.05 to 5 V/s, with number of cycles varying from 100 to 800. Suitable deposition solutions include 0.1-2 mg/mL $MoS_2$ or $WS_2$ in 0.1M sulfuric acid solution.

Electrodeposited chitosan film-coated microelectrode can be prepared with the aid of a deposition solution with chitosan concentration in the range from 0.5 to 2 wt %, preferably from 0.8 to 1.2 wt %, prepared by dissolving chitosan in a strongly acidic environment, whereby the amino groups undergo protonation to reach a slightly acidic pH (5-6). Conductive additives can be included in the deposition solution; these additives will co-deposit and affect the film properties. The concentration of the additives in the deposition solution (e.g., carbon nanotubes (abbreviated herein CNT), gold nanoparticles and platinum nanoparticles) is in the range from 0.1 to 2%, preferably from 0.8 to 1.8 wt %. For example, chitosan-CNT electrodeposition solution can be prepared by mixing a chitosan solution as previously described with CNTs, followed by ultra-sonication. The arrayed chip is immersed in the chitosan deposition solution (or chitosan/CNT solution) and electrodeposition is achieved by the chronopotentiometry technique, i.e., selected microelectrodes to be coated are biased to the negative potential against a counter electrode with constant (cathodic) current being applied between the electrodes for a period of time of 0.5 to 5 min, supplied by a DC current source; typically the current is set in the range from 3 to 6 $\mu A/cm^2$. A two-electrode configuration can be used, i.e., the counter electrode is shorted to reference terminal. Weakly bound chitosan is removed from the microelectrode surface, by immersing the device in a buffer solution.

Upon completion of the surface modification of the whole set of microelectrodes, the microchip device is rinsed to remove non-deposited material and is ready for use.

Thus, the invention also relates to a process of preparing an electrochemical microsensor, comprising:

creating microstructures on a base substrate, wherein the microstructure comprises an electrode material, optionally disposed atop of an adhesion layer attached to the substrate, wherein the microstructures are spaced apart from each other by walls encircling each microstructure and protruding from the surface of the substrate; and applying Ag/AgCl coating on the electrode material of at least one microstructure, to provide at least one reference electrode; electrodepositing a first transition metal dichalcogenide on the electrode material of at least one microstructure by cycling over potential range A, which corresponds to an electrochemical double layer potential region of said electrode material; and electrodepositing a first transition metal dichalcogenide on the electrode material of at least one microstructure by cycling over a potential range B, wherein potential range B extends to more positive potentials than potential range A.

The microstructures and the walls encircling them are created by photolithography, etching or both. The process of the invention may further comprise additional electrodeposition step, to coat some working electrodes with a transition metal dichalcogenide as previously explained (A and B type), and optionally with reduced graphene oxide (r-GO) and chitosan.

As mentioned above, a specific aspect of the invention is a chip comprising a base substrate (e.g., made of oxidized silicon, e.g., a glass substrate or silicone/silicone oxide), the chip having a recessed region on its surface, defined by a wall made of electrically insulating polymer which is elevated in respect of said recessed region, such that the recessed region can serve as a receptable for a liquid sample (e.g., for 10 to 30 µl of a blood sample), with discrete microstructures placed inside said recessed region, wherein a microstructure consists of a microelectrode deposited atop of an adhesion layer attached to the base substrate, or directly deposited onto the base substrate, wherein each microstructure is encircled by a wall made of electrically insulating polymer, thereby defining a plurality of microchambers, the interior of which is occupied by the microstructures, and wherein the microelectrodes are surface-modified by the coatings described above, i.e., both $MOS_2^A$ and $MOS_2^B$ coatings, and/or both $WS_2^A$ and $WS_2^B$ coatings, and optionally polysaccharide (e.g., chitosan) coatings and reduced graphene oxide coatings, with one or more Ag/AgCl electroplated reference microelectrodes and microstructure large in diameter to serve as counter electrode.

FIG. 11 provides a schematic illustration of the chip design according to the invention, incorporated into a detection device, i.e., either a portable device or a fixed device placed in a lab etc. That is, an electrochemical microsensor in the form of a microfabricated 0.1-3.0 cm×0.1-3.0 cm chip (11) on a glass substrate. The chip dimensions are compatible with the conventional microfabrication techniques where the diameter of the working microelectrodes (14) are ~100 micrometer and the diameter of counter electrode (13) is ~500 micrometer. The chamber (15) is designed to hold small volume samples (10-30 microliter—sample volumes available are quite low). Reference electrode (12) can be integrated into the array by electroplating one or two microelectrodes with Ag/AgCl as previously described. There are two kinds of chambers, a small chamber for each microelectrode opening (14 and 13) and a bigger chamber to carry the fluid (15). The chambers are made of insulating polymer, e.g., SU-8 polymer (16). The contacts pads (17) can be connected via pogo pins (18) and then to the multichannel connection (19) of the potentiostat or galvanostat unit (22). The device may be powered (21) by a battery or alternatively, can be connected to a main power supply. The control unit (20) is designed to serve several purposes, chiefly controlling the potential of the working electrodes or the current flowing through the cell, respectively, according to the chosen electrochemical technique.

Preferred design employs the abovementioned epoxy-based photoresist SU-8 as the electrically insulating polymer providing the walls of the sample holder, i.e., the receptable (also named herein 'the large chamber') and of the individual chambers surrounding the microelectrodes. Preferred geometry involves a disc-shaped counter electrode concentrically located inside the recessed region, which is circular in shape, with the microstructures placed along the perimeter of the recessed region as previously described.

In operation, 10 to 30 µl of a biofluid sample, e.g., a blood sample (from a conventional blood sample collection and transfer device used to collect blood samples by touching the fingertips of the patient, e.g., medical sticks and the like) is dropped onto the receptable, i.e., chamber (15), to cover the electrodes (12, 13 and 14) in the array and create an electrochemical cell to conduct the measurements. Another, more complicated design (not shown) may include a microfluidic channel patterned on the substrate (16), to deliver, with the aid of a pump, the blood sample from a feed point located on the chip to chamber (15). In that case, the supply of the blood sample to chamber (15) would be controlled by controller (20).

The device may further include a data storage unit or a data transmitting unit (23), i.e., wired transmitter or a wireless network transmitting unit with conventional communication ports to deliver the data to an externally located data storage unit.

A data storage unit may be the memory of the data processing unit or any computer readable media. In FIG. 11, personal instruments (25) are shown and also a cloud-based data storage system (26).

The device further comprises a processor (24) for analyzing a data set of electrochemical signals by one or more chemometric techniques, e.g., multivariate methods such as a supervised machine learning model (artificial neural network (ANN)), or a regression model, e.g. partial least square regression (PLSR).

Briefly, PLSR is a linear regression method and PLSR algorithms are available (for example, MatLab, which is mentioned herein as an example; any appropriate software to manage the data can be used). As to ANN, a neural network model is generated with the aid of a training set. To this end, a matrix consisting of a large number of samples with known concentrations of the analyte and with known outputs is collected. As explained in more detail below, the data set is split to create a training set, optionally a cross-validation set and a test set. In the training process, the error between the outputs predicted by the neural network and the known outputs is calculated; this process continues, with the algorithm adjusting the parameters iteratively to minimize the error, i.e., to reduce the error below an acceptable level. Once created, the model is saved and can be used for future measurements of test samples.

It should be noted that raw test data collected by the electrochemical sensor (e.g., a biofluid taken from a patient) undergoes pre-processing with the aid of known techniques before it is fed to the algorithm. Then methods such as principal component analysis (PCA), Fast Fourier Transform (FFT), and selection of important electrochemical signal features, can be used to reduce the dimensions of the data fed to the model. Features selected (e.g., from the voltammograms) include peak current, peak potential, maximum slopes of the I vs. E function (for the increasing and decreasing parts of the function).

That is, to make a measurement of a test sample—using voltammetry for example—the sample is placed in the sample holder in contact with the electrochemical sensor in the device of the invention, as described above, varied voltage is applied by the potentiostat between the reference electrode and working electrode, currents generated are measured and the measurements are stored, and the test data collected (readings from all working electrodes) is preprocessed, reduced and scaled, fed to the algorithm and the concentration of analyte is quantified.

A raw test data collected from a biofluid (i.e., from patients) can be used to calibrate the ANN trained model (that was previously trained using non-biofluid samples, e.g., samples prepared in buffer solutions).

The two approaches for model building—PLSR and ANN are now discussed in more detail; the major steps are outlined below. In both cases, data reduction can be based on signal features.

Model Building Process-Based Signal Samples (PLSR)

1. Organization of data in a cell structure—with the aid of MATLAB software reading csv files, all experimental data is arranged in one type of structure (e.g., cell type).

2. Signal smoothing—by using the signal processing toolbox, e.g., MATLAB software, a built-in function (e.g. 'filter') was used to filter the signals by employing a moving average window in order to reduce signal fluctuations and noisy behavior which is not originated by the electrochemical properties of the tested solution. A varied filter order in the range of $5<M<8$, (M-filter order), depending on the noise level in the recorded data, can be used. In order to keep this parameter unbiased for all the recorded signals in each experiment, it is kept fixed and equal to a specific value for each experimental data.

3. Baseline subtraction—In an electrochemical analysis, the main interest is the faradaic current that is generated owing to the electron transfer from the analyte to the electrode surface in a specific electric potential (oxidation potential). In order to improve the signal to noise ratio (SNR), the Asymmetric least squares spline regression (AsLSSR) can be used. With the aid of MATLAB software, a function is built to estimate the baseline signal by getting two constant values parameters, $\lambda$ the smoothing parameter ($10^2<\lambda<10^9$) and p the asymmetry parameter ($0.001<p<0.1$). These two parameters take part in the numerical optimization of the cost function of the algorithm.

4. Organization of signals in a matrix structure—the signals are arranged in a matrix form, with each row corresponding to a specific array response. Signals were put in the matrix one after the other, to produce a super row vector structure for each solution, while the target was defined as the concentration matrix, each column describing specific analyte concentration used through the experiments. This has been achieved by building a MATLAB script.

5. Dividing the data set into distinct subsets—The data is separated into two or three distinct sets. The first set is a training set, that is used for the training and the design of the model. All optimization procedures for finding the optimal solution are performed on the training set. It should be noted that the training set could be sub-divided to create a small cross-validation set. The other set is the test set. This set is used to check the model's generalization capabilities, by using the trained model in order to evaluate the ability of the model to predict the concentrations in the "unseen" samples. The data is usually divided as follows: 70-85% of the samples are assigned to the training set (including ~10% that may be used for cross-validation) and 10-30% for testing. The samples are divided randomly, but the computer's random generation is fixed to assure that the same subdivision could be reproduced.

6. Signals centering—In order to focus on the variability of each specific potential, data is centered, checking the average features value for the all set, and subtracting it from the all signal, resulting in features with mean value equal to 0. The average value of the training set is saved for future use for centering the test set.

7. Choosing a regression model for prediction analysis— the partial least square regression (PLSR) model, a linear technique, is used. It is especially suitable for cases where there is a high correlation between the different features and when there is a limited number of samples (e.g., solutions). The 'plsregress' MATLAB function toolbox is used for model building and testing.

8. Choose optimal model parameters (k-fold cross validation)—In order to choose wisely different digital (e.g., number of latent variables in a PLSR model) and physical parameters (e.g., electrode combination), the CV method (LOOCV and 10-fold CV) was used. With the aid of a code that is able to give all the possible configurations without repetition, the CV is implemented in the MATLAB software, using the 'cvpartition' function from the statistical toolbox, for random divisions into k sets. By dividing the train set and using it also for validation it is possible to take advantage of most of the information hidden in the data. Model parameters minimizing the cross-validation error were chosen.

9. Model training—The best number of latent variables and best electrode combinations were chosen for training the model on all the training set. A PLSR model using the 'plsregeress' function from the MATLAB statistics toolbox is built.

10. Test Data pre-processing—The test signals were centered according to the mean average value of the training set.

11. Model predictability—The trained model was used to test and evaluate the performance on unseen data set, i.e., the test set, which was preprocessed and was ready for use as the model input.

12. Evaluate model performance—The quality of the model is assessed with the root mean square error between the known concentrations and those that were estimated by the model.

$$RMSE_{test} = \sqrt{\frac{1}{N_{test}} \sum_{i=1}^{N_{test}} (c_{expected} - c_{calculated})^2}$$

(N is the number of samples; $C_{expected}$ is the real actual value and $C_{calculated}$ is the predicted value).

Model Building Process-Based Direct Electrochemical Features (ANN)

1. organization of data in a cell structure—with the aid of MATLAB software, csv files are read, in order to arrange all the experimental data in one type of structure (e.g., cell type).

2. Signal smoothing—by using the signal processing toolbox, MATLAB software, a built-in function (e.g., 'filter') is used to filter the signals by employing a moving average window in order to reduce signal fluctuations and noisy behavior which is not originated by the electrochemical properties of the tested solution. A varied filter order in the range of 5<M<8, (M-filter order), depending on the noise level in the recorded data, is used. In order to keep this parameter unbiased for all the recorded signals in each experiment, it was kept fixed and equal to a specific value for each experimental data.

3. Feature extraction-specific electrochemical signal features were extracted, i.e., features which are indicative of the identity of the redox-active molecule and its concentration in the solution. The extracted features include: peak potential, peak current, the maximum slope of the signal, and current value at specific potentials (potentials which are known as the standard oxidation-reduction potential of specific analyte—good evaluation when the peak is not visible). All features are extracted automatically using MATLAB software built-in functions and by customary-built specific functions for each feature.

4. Organize features in a matrix structure—The extracted features were arranged in a matrix form, with each row corresponding to a specific array response, whereas each column describes specific analyte concentration through the experiment. This has been done by building a MATLAB script.

5. Dividing the data set into distinct subsets—The data is separated into two or three distinct sets. The first set is a training set, that is used for the training and the design of the model. All optimization procedures for finding the optimal solution are performed on the training set. It should be noted that the training set could be sub-divided to create a small cross-validation set. The other set is the test set. This set is used to check the model's generalization capabilities, by using the trained model in order to evaluate the ability of the model to predict the concentrations in the "unseen" samples. The data is usually divided as follows: 70-85% of the samples are assigned to the training set (including ~10% that may be used for cross-validation) and 10-30% for testing. The samples are divided randomly, but the computer's random generation is fixed to assure that the same subdivision could be reproduced.

6. Feature normalization—Features were standardized using the z-score transformation (subtracting the mean value of each feature, and scaling it by dividing the value by the standard deviation). Scaling was preformed because the features were in different scales, such as peak currents [μA] and peak potentials [V]. The data transformation can be achieved with the aid of MATLAB software. The transformation is performed on the training set, when the moments' values were saved for future scaling of the test data.

7. Feature selection—The strategy employed for data reduction to decrease computational complexity is ten-fold cross-validation forward selection based linear regression. The criterion for the selection is the root mean square error between the "real" concentration and those estimated for the validation set. This is achieved with the aid of the statistical toolbox of MATLAB software. In each of the experiments a different initial number of features is used, depending on the technique that is chosen to extract data features.

8. Choosing regression model for prediction analysis—In order to perform multivariate analysis (not only one target value), artificial neural network (ANN) models are used—nonlinear techniques—to explore the relation between the extracted features to the analytes concentration. The ANN MATLAB toolbox is used to explore different network architectures.

9. ANN model optimization (based k-fold cross-validation)—Simple ANN architectures, such as 1-hidden layer with a limited number of neurons, are used in order to reduce the chance for overfitting—the lesser number of neurons in use, the lower network complexity. The best architecture is chosen with the aid of a cross-validation test: the number of neurons in the hidden layer is varied to test the network performance on a validation set. The upper bound of the number of neurons is set such that it is smaller than the number of the model weights. Then the number of neurons with the best score (in terms of the root mean square error between the known concentration and those who were estimated on the validation set) was chosen. The test is repeated with different initial conditions different weight initializations) because ANN models are significantly affected by their initial conditions; but in each individual test the parameters are fixed in order to make unbiased and robust decision.

10. Model training—having determined the best architecture, it is now used for training the model across the entire training set. The number of training iterations is limited (early stopping) according to a specific error value that is set to stop the training procedure after reaching at least 99% of the target variance. Hence a trained network that minimizes the performance on the training data is created, ready for future testing.

11. Test data pre-processing—Based on the selected features in the feature selection procedure, the test features were loaded and standardized according to the training moments. For each feature, the training mean value was subtracted, and the result divided by the training standard deviation (this procedure is based on the fact that the two sets sampled from the same data population), creating a scaled data set.

12. ANN predictability—The trained model is used to test and evaluate the performance on unseen data set, i.e., on the test set which was preprocessed and is ready for use as the model input. Calculations are performed in MATLAB software, using the ANN toolbox function and aid function coded for specific tasks.

13. Evaluation of model performance—The quality of the model is assessed with the root mean square error:

$$RMSE_{test} = \sqrt{\frac{1}{N_{test}} \sum_{i=1}^{N_{test}} (c_{expected} - c_{calculated})^2}$$

(as previously defined) and the Pearson correlation coefficient (PCC):

$$PCC = \frac{E[C_{expected} - \mu_{expected}]E[C_{estimated} - \mu_{estimated}]}{\sigma^2_{ecpected}\sigma^2_{estimated}}$$

As mentioned above, one aspect of the invention is an electrochemical analysis method, comprising determining the concentration of hydroxyurea in a biofluid sample by voltammetry over transition metal dichalcogenide-coated working electrode. Voltammetry techniques include DPV, CV and CA.

The electrochemical detection method could be used for measuring the concentration of hydroxyurea in any liquid biological sample (a biofluid), including blood, serum, plasma, urine, breastmilk, saliva, tears, spinal fluid, etc. For example, collection of could be a finger prick or a venipuncture and could use "whole" liquid blood or after processing and separation into serum/plasma.

To improve sensitivity and accuracy, determination of hydroxyurea may be accomplished using any of the arrays of working electrodes described above, e.g., with the aid of a microsensor (e.g., the chip previously described), wherein the microsensor comprises:
  one or more bare microelectrodes ($1 \leq n_1 \leq 5$);
  one or more $MoS_2^A$-coated microelectrodes of subset A ($1 \leq n_2 \leq 5$);
  one or more $MoS_2^B$-coated microelectrodes of subset B ($1 \leq n_3 \leq 5$); and optionally,
  one or more $WS_2^A$-coated microelectrodes of subset A ($1 \leq n_4 \leq 5$);
  one or more $WS_2^B$-coated microelectrodes of subset B ($1 \leq n_5 \leq 5$);
  one or more polysaccharide-coated microelectrodes ($1 \leq n_6 \leq 5$);
  one or more r-GO-coated microelectrodes ($1 \leq n_7 \leq 5$);
  one or more reference microelectrode; and
  a counter microelectrode.

The electrochemical analysis method of the invention comprises obtaining a raw data set consisting of a plurality of electrochemical signals from the voltammograms recorded by one or voltammetry techniques;
  preprocessing the raw dataset; and
  applying chemometric model(s) to the processed data, to quantify hydroxyurea in the sample.

For example, preprocessing includes the steps of:
  signal smoothing; removal of signals originating from malfunctioning electrodes; and for each group of electrodes (i.e., electrodes which have the same surface modification define a group), a step of calculating, for each possible pair of electrodes that belong to the same group, the absolute value of difference between the signals produced by that pair of electrodes, determining a pair of electrodes with a minimal difference between their signals, and averaging the signal, as shown below:

$$E_A, E_B = \underset{E_1, E_2, E_3}{\operatorname{argmin}} \left( \Sigma_{\substack{m,n=1,2,3 \\ m \neq n}} \left| \operatorname{Signal}_{E_m} - \operatorname{Signal}_{E_n} \right| \right)$$

$$\operatorname{Signal}_{Final} = \frac{E_A + E_B}{2}$$

In this way, the inner variance noise is reduced by removing the electrochemical signal with considerable dissimilarity to the other signal while using the electrochemical data from more than one microelectrode. After the preprocessing steps, the number of electrochemical signals in the reduced electrochemical dataset assigned to each patient corresponds to the number of groups of electrodes in the sensor used to generate the voltammograms.

As shown below, creation of a trained chemometric model involves feature extraction. Feature extraction can be accomplished by 1) selection of electrochemical features and 2) principal component analysis; the model can be trained in both ways, such that the concentration of hydroxyurea in a blood sample may be estimated by two chemometric models.

An electrochemical peak is an electrical description of the electrochemical active biomarkers' presence, concentration, and more. Therefore, detecting the electrochemical peak and using the signal's peak descriptions as features can indicate the amount of specific electroactive biomarkers, including hydroxyurea, an electroactive molecule, in the examined sample. In the peak detection process, each electrochemical signal is treated individually, but the number of peaks extracted would be the same, for example, from 3 to 7 peaks, e.g., five peaks. Following the initial signal preprocessing that was described above, an electrochemical baseline estimation algorithm is performed. Then, MATLAB's peak finder built-in function (or other suitable software) can be used to extract the electrochemical peaks. After the peak's detection, the peak's voltage will be used to find the corresponding current intensity from the original signal. After applying the peak detection on all the signals that originated from a specific surface electrode modification, peak's histogram plot is created, to determine the most dominant peaks for all the patients ("peaks' anchors"). If the number of the detected peaks is greater than five, we will remove the peaks with the largest distance from the "peaks' anchors" determined by the histogram. If the number of the detected peak is lower than five, we will use the "peaks' anchors" to select the missing peak voltage and will read the current intensity in this position. After implementing the electrochemical peak detection process, we had a feature matrix with five electrochemical peaks for each modification, for each patient. Next, the two-dimensional feature (voltage/current) is reduced to a one-dimensional feature that fits the algorithm, e.g., by injective transformation—the tangent of the ratio between the peak current and peak potential multiple by their radial distance.

$$\text{Electrochemical Peak Feature} = tg\left(\frac{I_p}{E_p}\right) \times \sqrt{I_p^2 + E_p^2}$$

Turning now to principal component analysis (PCA), it is widely used in chemometric models to reduce the dimensionality of the dataset. The PCA algorithm uses mathematical transformations based on the eigenvalues and eigenvectors of the data's covariance matrix to create a new set of orthonormal coordinates which maximize the data's variance. PCA algorithm can be implemented using "pca" MATLAB's built-in function with moving average specification.

After the PCA implementation, the dataset is represented by a new set of coordinates. The values in the dominant PCs have the highest variance in the dataset. Hence, using them as features can describe the clinical samples while increasing the variance between samples and preserving the original electrochemical knowledge from the examined sample.

The method of the invention involves the use of a novel approach that generates a data matrix by merging the signals based on their modification type (i.e., the type of coating), and not by their sample's source. In the case of the sensor illustrated above, which consists of seven distinct types of working electrodes, the result is seven data matrices for the seven different modifications containing one representative signal for each patient, as explained in the experimental section below.

Thus, the method of the present invention includes the application of a chemometric model that was trained by extracting features from the preprocessed data using principal component analysis, to create a plurality of data matrices, wherein each data matrix is associated with one type of working (micro) electrode, the data matrix comprising M electrochemical signals, generated by the corresponding type of working electrode, for the M samples collected to train the model, respectively.

IN THE DRAWINGS

Figure 7A:
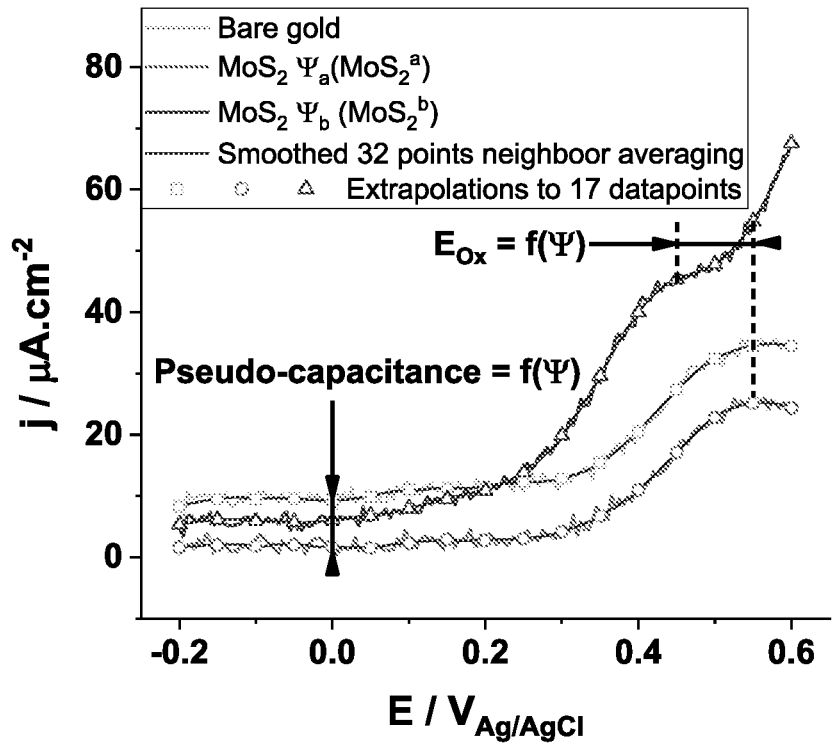
FIG. 7A shows DPV analysis of undiluted human serum for the three different electrodes.
Figure 7B:
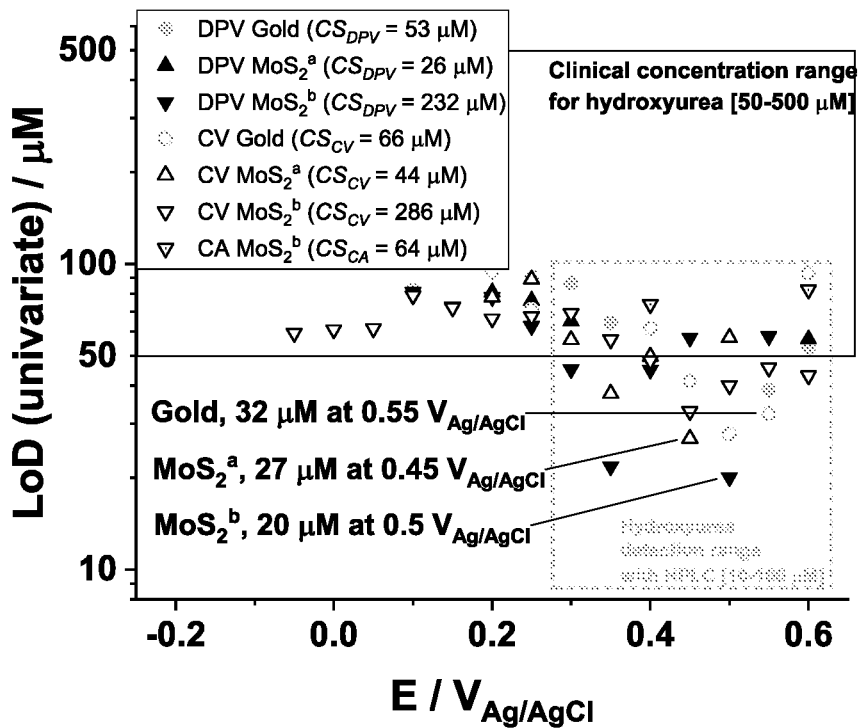
FIG. 7B shows Limit of detection calculated form linear regression analysis of current vs concentration plots for differential pulse voltammetry (DPV), cyclic voltammetry (CV) and chronoamperometry (CA) for each of the three different electrodes.
Figure 7C:
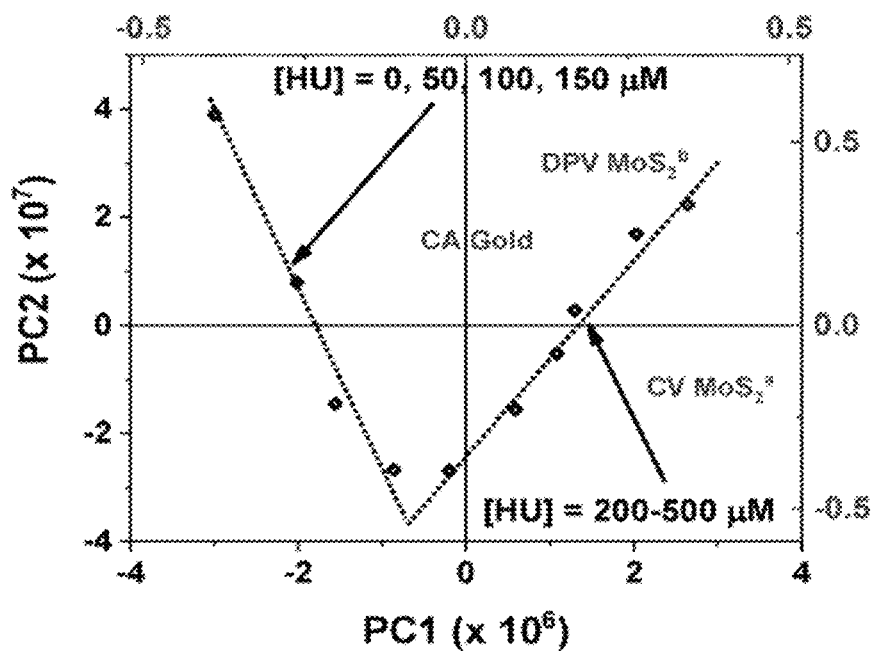

FIG. 7C shows PCA analysis results of the datasets acquired for 10 hydroxyurea concentrations using 3 electrodes and 3 electrochemical technics. The loading plot (red) emphasize that each of the technics (DPV, CV, CA) and electrodes constructs (Gold, $MoS_2^a$, $MoS_2^b$) are used to build the multivariate regression model.

Figure 7D:
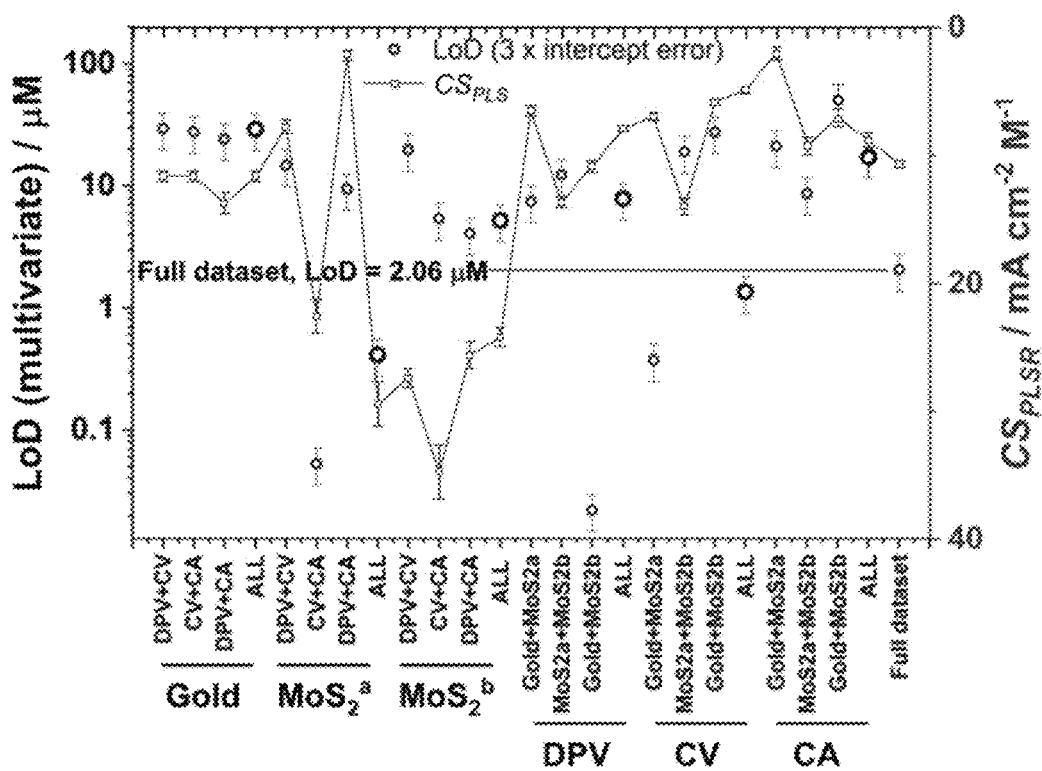

FIG. 7D shows limit of detection (black) and combined selectivity of the PLSR analysis ($CS_{PLSR}$, red) calculated for different arrays configurations.

Figure 8:
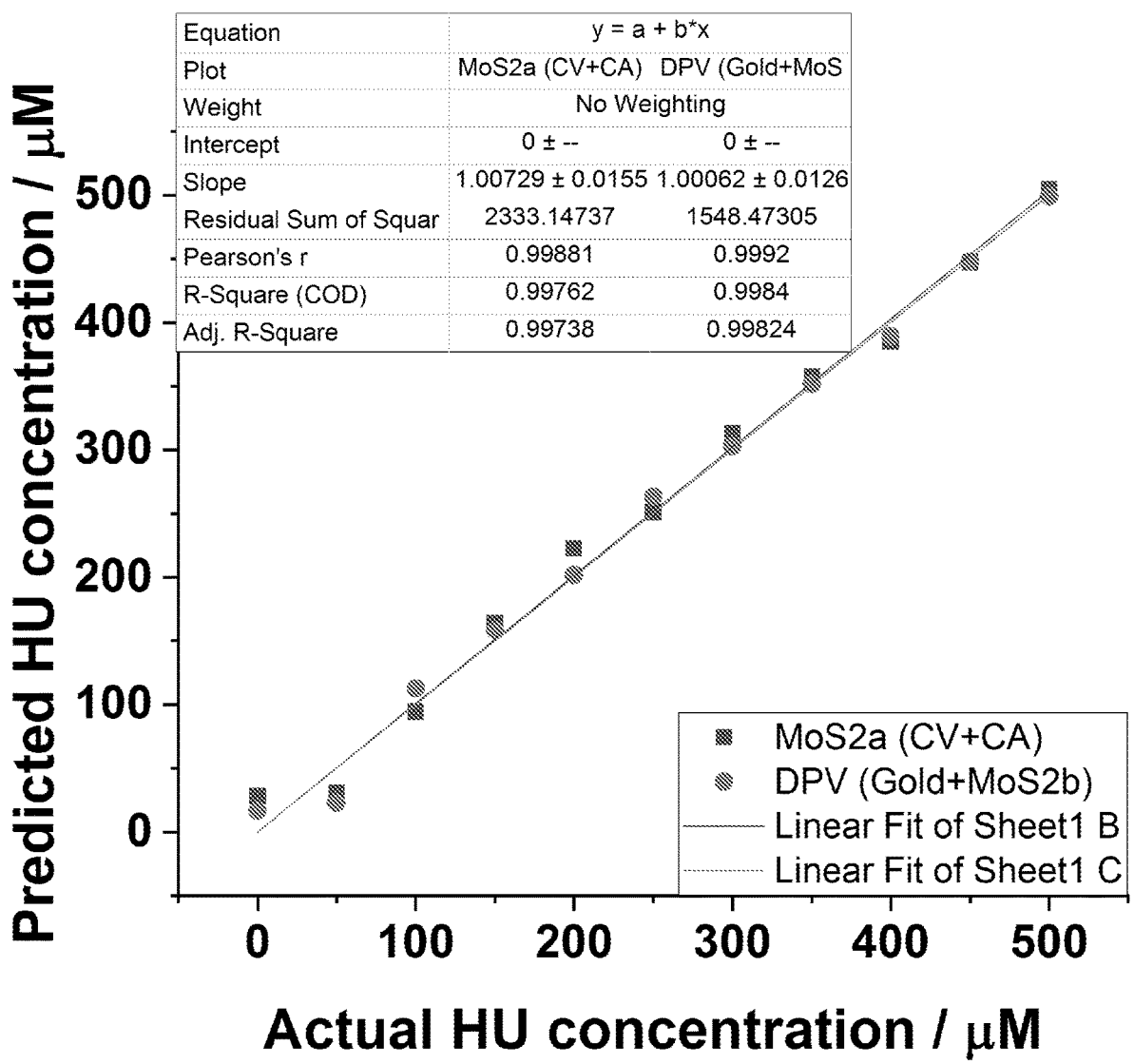

FIG. 8 shows predicted vs actual HU concentration plot derived from multivariable linear regression models was calculated from the datasets CV+CA analysis with $MoS_2^a$ (black squares) and DPV analysis of gold+$MoS_2^b$ (red circles).

FIGS. 9A and 9B illustrate the fabrication of a microsensor.

Figure 9C:
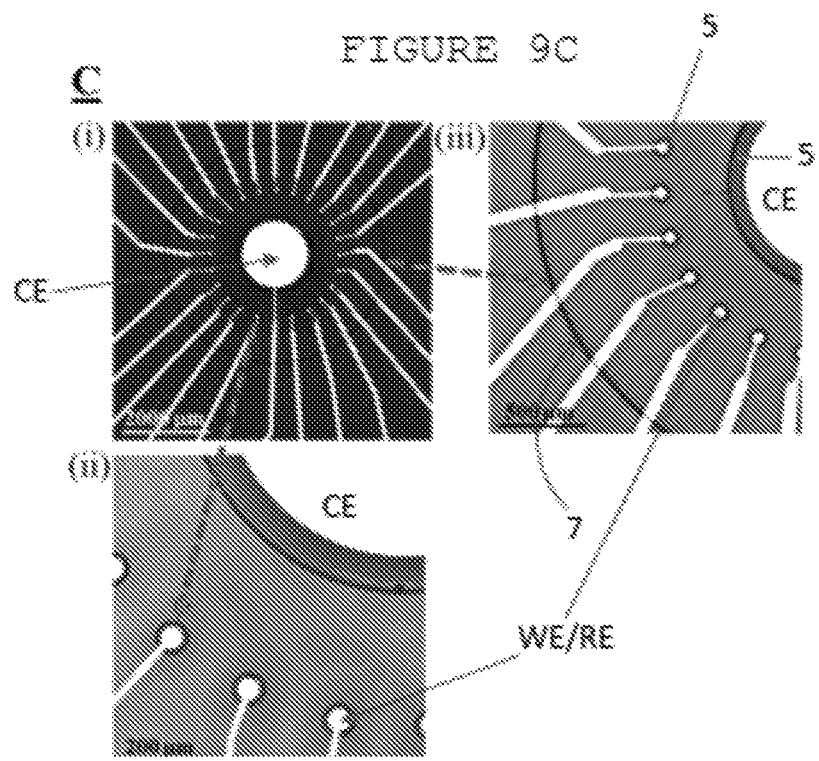
Figure 10:
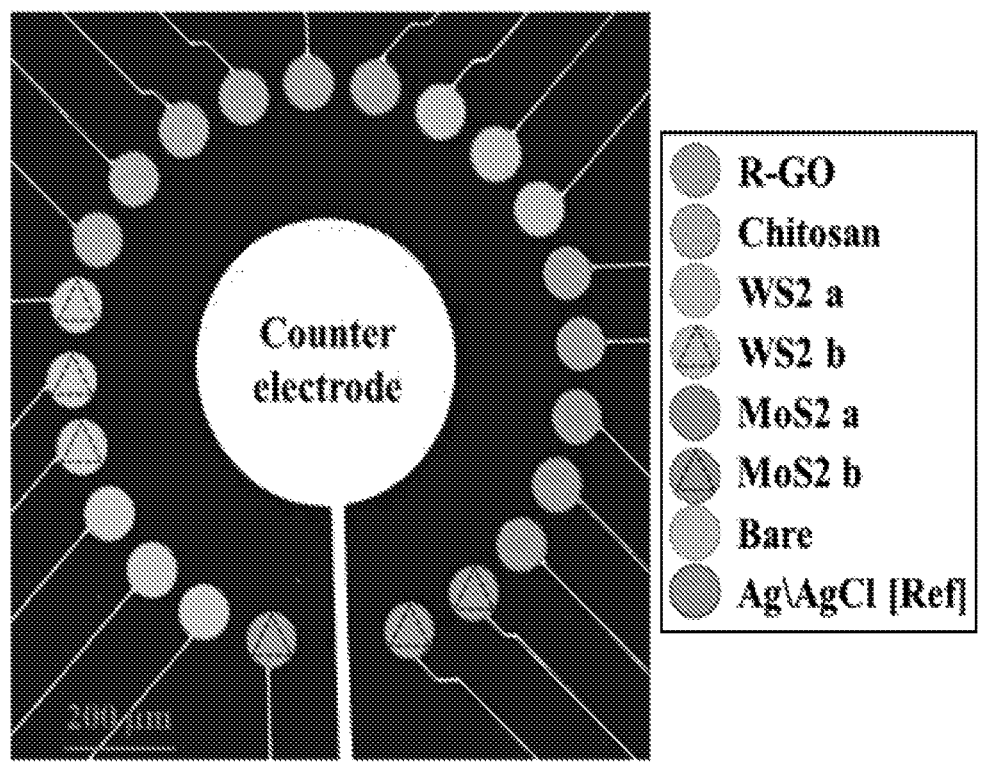

FIGS. 9C and 10 show the arrangement of microelectrodes in a microsensor.

Figure 11:
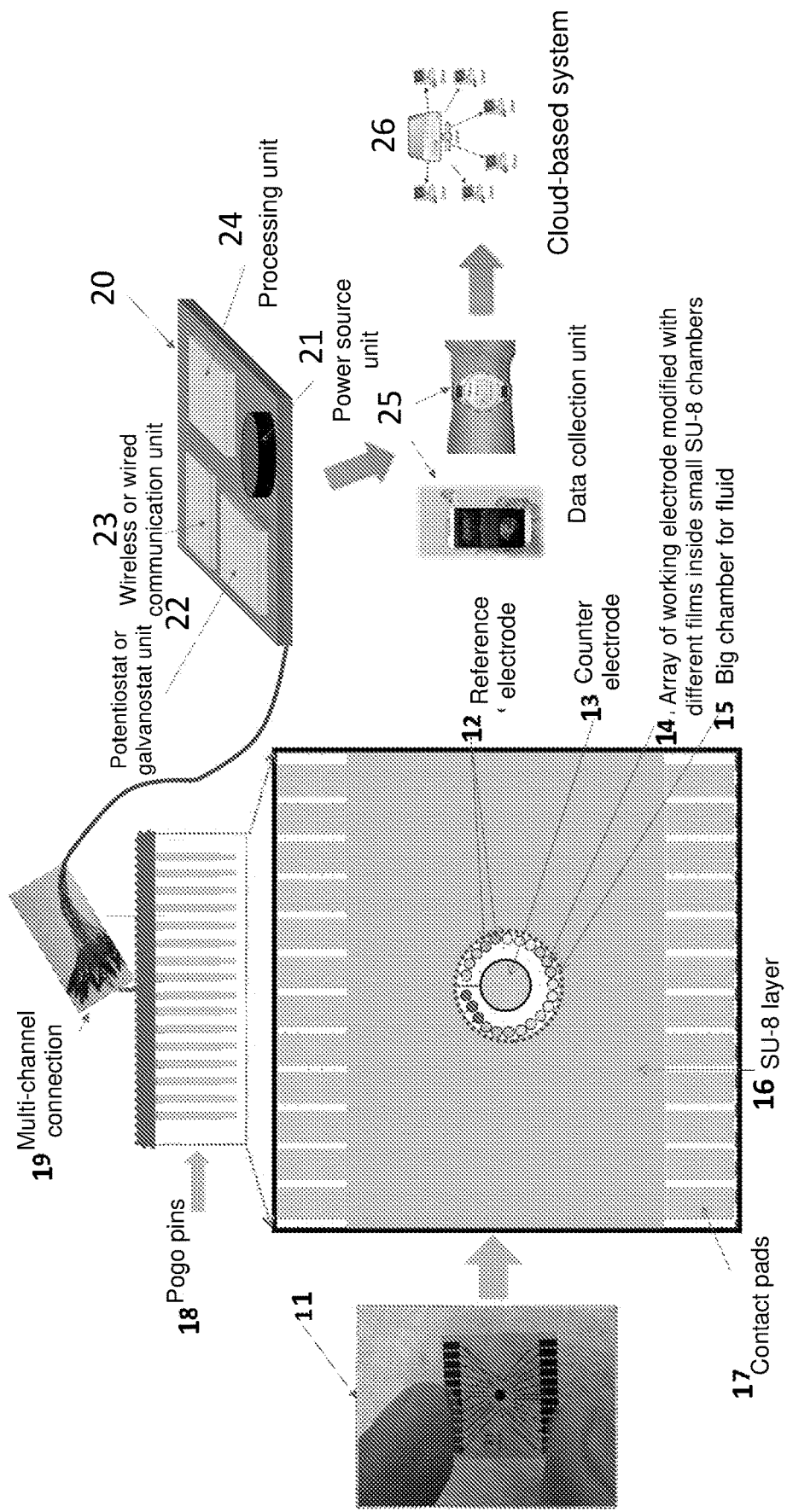

FIG. 11 shows a device incorporating the microsensor of the invention.

Figure 12:
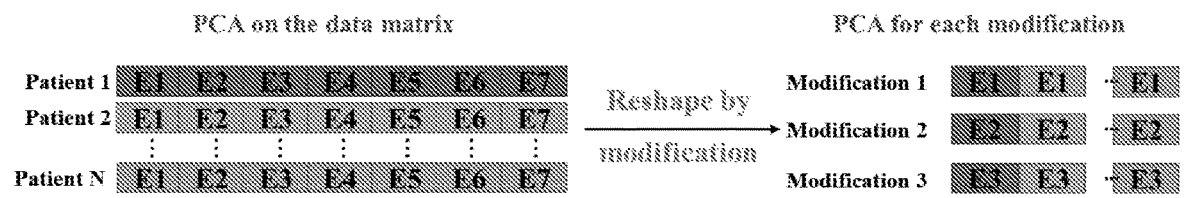

FIG. 12 shows two types of data matrices for the PCA feature extraction phase—PCA for concatenated signals and PCA for sub-data matrices divided by modification.

Figure 13:
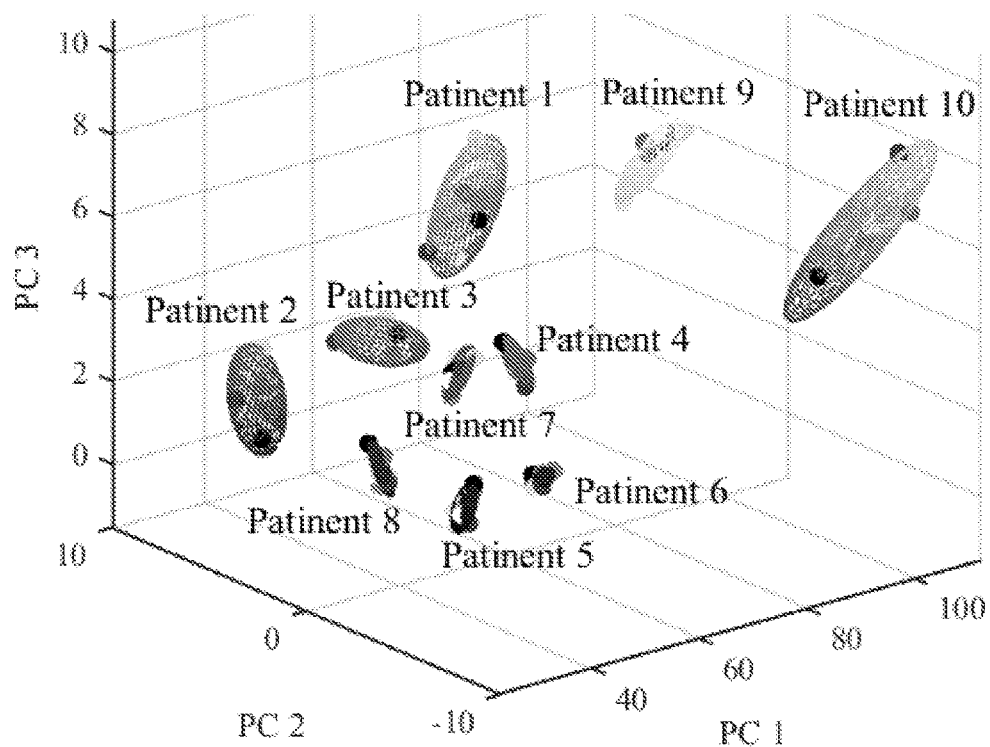

FIG. 13 shows the three most dominant PCs using PCA by modification method.

FIGS. 14A and 14B are current versus potential plots.

FIGS. 15A and 15B are current versus potential plots.

Figure 16A:
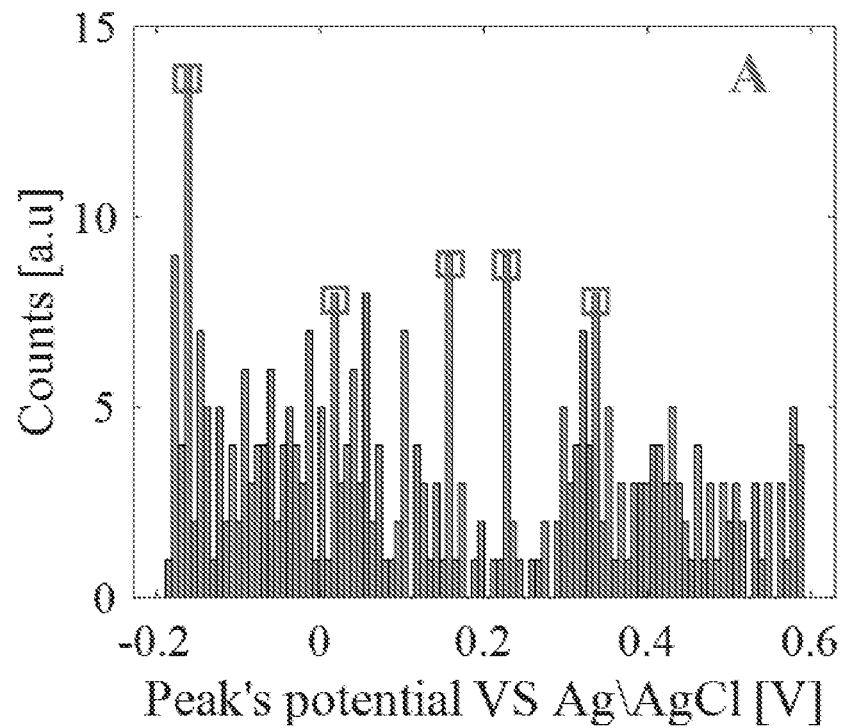
Figure 16B:
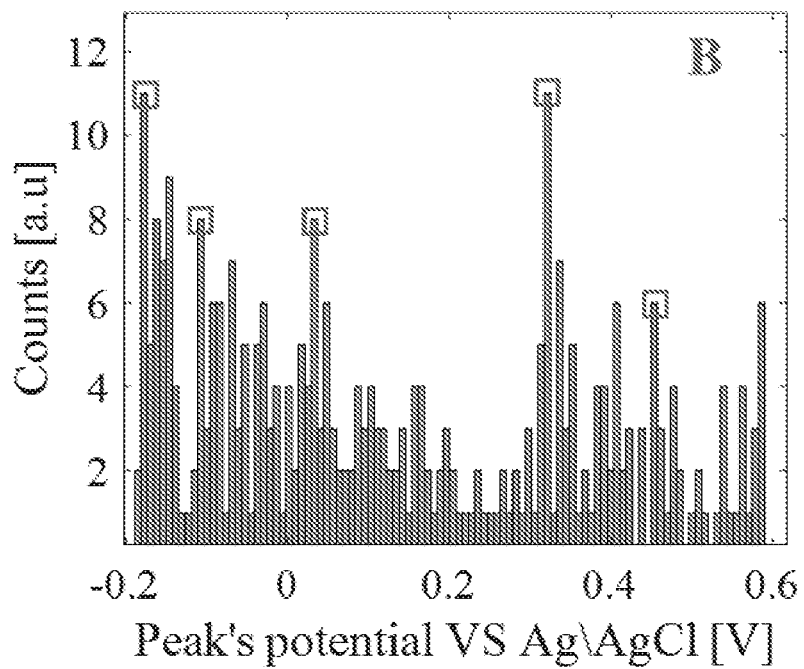

FIGS. 16A and 16B show peaks histograms for two types of coatings, the $MoS_2$-A modified microelectrode (16A) and chitosan modified microelectrode (16B).

EXAMPLES

Materials and Instruments

Hydroxyurea (98%, H8627, Sigma-Aldrich, Ltd.), molybdenum sulfite (GLMSWOA1, ACS Material LLC), uric acid (≥99%, 01935, CHEM IMPEX, Inc.), ascorbic acid (>99.5%, BIA0602, Apollo Scientific Ltd.), D-glucose (99%, A16828, Alfa Aesar), dopamine (99%, A11136, Alfa Aesar), methanol (>99.8%, 001368052100, Bio-Lab, Ltd.), L-homocysteine (BIB6065, Apollo Scientific, Ltd.), magnesium sulfate (>99%, 931255, STREM Chemicals, Inc.), ammonium carbonate (1716477, Fisher Scientific), calcium chloride (97%, 10195054 Alfa Aesar), iron sulfate hydrate (97%, 307718, Sigma-Aldrich), hydrochloric acid (32%, 00846050100, Bio-Lab Ltd.), sulfuric acid (95-98%, 001955050100, Bio-Lab, Ltd.), phosphoric acid (858, 65324100, Daejung Chemicals & Metals Co., Ltd.), potassium permanganate (299%, 36675, Alfa Aesar), disodium hydrogen phosphate dihydrate (299.5%, 1.06580.1000, Merck), sodium dihydrogen phosphate dehydrate (299%, 1.06342.0250, Merck), sodium chloride (299.5%, 1259991, Merck), potassium hexacyanoferrate (II) trihydrate ('ferrocyanide', 99%, 1.04984.0100, Merck), potassium hexacyanoferrate (III) ('ferricyanide', 299.0%, 1.04973.0100, Merck), acetone (99.8%, 010376, Bio-Lab, Ltd.), hydrogen peroxide (30%, 1.07210.1000, Merck), potassium chloride (99%, 11595, Alfa Aesar), and 2-propanol (>99.8%, 1301221, Bio-Lab, Ltd.) were used without further purification. Deionized water was obtained from a Super Q water system (Millipore resistivity>18MΩ, MQ water).

VSP potentiostat (Bio-Logic, Ltd., was used for the electrodeposition and the characterization of the electrodes. Origin™ Pro software (2018, SR1 edition) was used for all data analyses and figure plots.

Preparations 1-5

Electrodeposition Solutions

1) $MoS_2$ Electrodeposition Solution 0.1 mg/mL $MoS_2$ solution was prepared from 1 mg/mL stock monolayer $MoS_2$ solution in 0.1 M $H_2SO_4$ solution and DI water. The solution was sonicated for 10 minutes. 0.1M $H_2SO_4$ solution was prepared from 18.4 M stock $H_2SO_4$ solution.

2) $WS_2$ Electrodeposition Solution 0.1 mg/mL $WS_2$ solution was prepared from 1 mg/mL stock monolayer $WS_2$ solution in 0.1 M $H_2SO_4$ solution and DI water. The solution was sonicated for 10 minutes before electrodeposition.

3) Ag and HCl Solutions

Silver nitrate, Ammonium carbonate, 5-Sulfosalicylic Acid Dihydrate, and Piperazine were mixed in the ratio of 2:1:6:2 in DI water. The solution was stirred at 400 rpm for 10 minutes. The pH was adjusted to 9.5 by adding 0.25 M ammonium hydroxide solution in several steps. 0.1 M HCl solution was prepared from 10.2 M HCl stock solution which was used to chlorinate the Ag to Ag/AgCl surface.

4) Graphene Oxide Electrodeposition Solution

Graphene oxide (GO) solution was prepared using a modified Hummers' method. A 9:1 ratio of sulfuric acid and phosphoric acid (100 mL) was prepared and stirred for several minutes. A graphite powder (7.5 g/L, 1 wt. eq.) was added to the mixture under stirring conditions. Potassium permanganate (45 g/L, 6 wt. eq.) was slowly added to the solution and the mixture was stirred for 6 h at 30-35° C. until the color turned to dark green. To eliminate the excess of potassium permanganate, hydrogen peroxide 30% w/w (2.5 mL) was added slowly and the mixture was stirred for 10 min, resulting in an exothermic reaction that was left to cool at room temperature. Concentrated 32% hydrochloric acid and DI were sequentially added at a 1:3 volume ratio and the resulting solution was centrifuged at 7000 RPM for 5 min. Residuals of the centrifuged solution were washed 3 times with hydrochloric acid and DI (1:3 v/v). The washed GO solution was dried at 90° C. in an oven (Binder-9010-0082) overnight, yielding the GO powder. Dried GO powder was dissolved in DI, resulting in an electrodeposition solution with 0.5 g/L GO concentration. Next, 100 mM sodium chloride solution was added as an electrolyte to the GO solution, resulting in a final GO electrodeposition solution. At higher GO concentrations, rapid precipitation was observed that prevented the efficient electrodeposition of r-GO.

5) Chitosan Electrodeposition Solution

A concentrated chitosan solution (1.8%, pH 5.5) was prepared by dissolving chitosan flakes in HCl (2 M) to achieve a final pH of 5-6. Then, the concentrated chitosan solution was diluted with Mili-Q water to obtain a chitosan solution (1%).

Example 1

Modifying Gold Electrodes by Electrodeposition of $MoS_2$

Electrodeposition of $MoS_2$ films on the surface of gold electrodes was accomplished by cyclic voltammetry, using a three-electrode configuration (VSP potentiostat (Bio-Logic, Ltd.). The three-electrode cell configuration consisted of a commercial gold electrode (932-00023, Gamry; working electrode; 'WE' with a surface area of 0.07 $cm^2$), an externally applied commercial Pt wire with an approximate surface area of 3.6 $cm^2$ (CHI115, CH Instruments; counter electrode; 'CE'), and an Ag/AgCl 3 M NaCl reference electrode (CHI111, CH Instruments; reference electrode; 'RE', $E_{SHE}=0.210+E_{Ag/AgCl}$). All electrochemical potential values are versus Ag/AgCl half-cell potential.

Prior to the electrodeposition, the commercial gold electrodes were polished with 0.3 and 0.05 μm alumina slurry and subsequently sonicated in MQ water. The electrodes were further electro-chemically cleaned using CV in a 0.5 M $H_2SO_4$ electrolyte (10 mL) by cycling the potential from 1.0 V to 1.5 V and back to −0.4 V for 5 to 10 cycles until a steady voltammogram representative of a clean substrate was obtained (note that it is often necessary to renew the $H_2SO_4$ solution).

The clean gold WE was dipped in 1 g $L^{-1}$ $MOS_2$ solution dispersed in 0.1 M sulfuric acid (10 mL). The conditions of the electrodeposition were varied to create different $MoS_2$ films on gold electrodes (all samples were prepared over the same deposition time of 800 seconds):

A first $MoS_2$-coated gold electrode was prepared according to a previously published procedure by cycling the potential range from −1.0 to 1.0 $V_{Ag/AgCl}$ at 50 mV $s^{-1}$ for 10 cycles [Sun, H. et al. supra].

A second $MoS_2$-coated gold electrode was prepared by cycling the potential interval corresponding to gold electrochemical double layer formation region from −0.3 to 0.7 $V_{Ag/AgCl}$ at 50 mV $s^{-1}$ for 20 cycles.

A third $MoS_2$-coated gold electrode was prepared by cycling the potential interval from −0.3 to 0.7 $V_{Ag/AgCl}$ at 1 V $s^{-1}$ for 400 cycles.

A fourth MoS$_2$-coated gold electrode was prepared by cycling the potential interval from −0.3 to 0.7 V$_{Ag/AgCl}$ at 10 V s$^{-1}$ for 4000 cycles.

A fifth MoS$_2$-coated gold electrode was prepared by cycling the an extended potential window from 0 to 1.4 V$_{Ag/AgCl}$ at 1 V s$^{-1}$ for 400 cycles.

Example 2

Characterization of MOS$_2$-Modified Gold Electrodes of the Invention and Comparison to the Electrodeposition Protocol According to Sun et al. (Supra)

EDX and SEM Characterization

The deposition of MoS$_2$ on the gold substrate was confirmed by scanning electron microscopy and energy-dispersive X-ray spectroscopy analysis (FIG. 1C), indicating that the elemental composition corresponds to a molar ratio of two sulfur atoms per molybdenum atom (Mo$_1$S$_{2.02}$).

Electrochemical Characterization

Figure 1A:
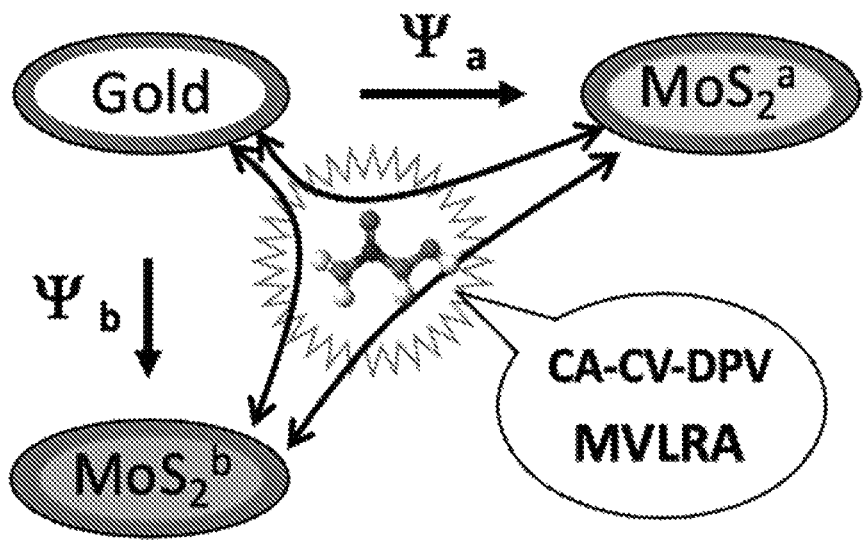
FIG. 1A illustrates the modification of gold electrodes by $MOS_2$, the application of voltammetry and MVLRA to determine concentration hydroxyurea.
Figure 1B:
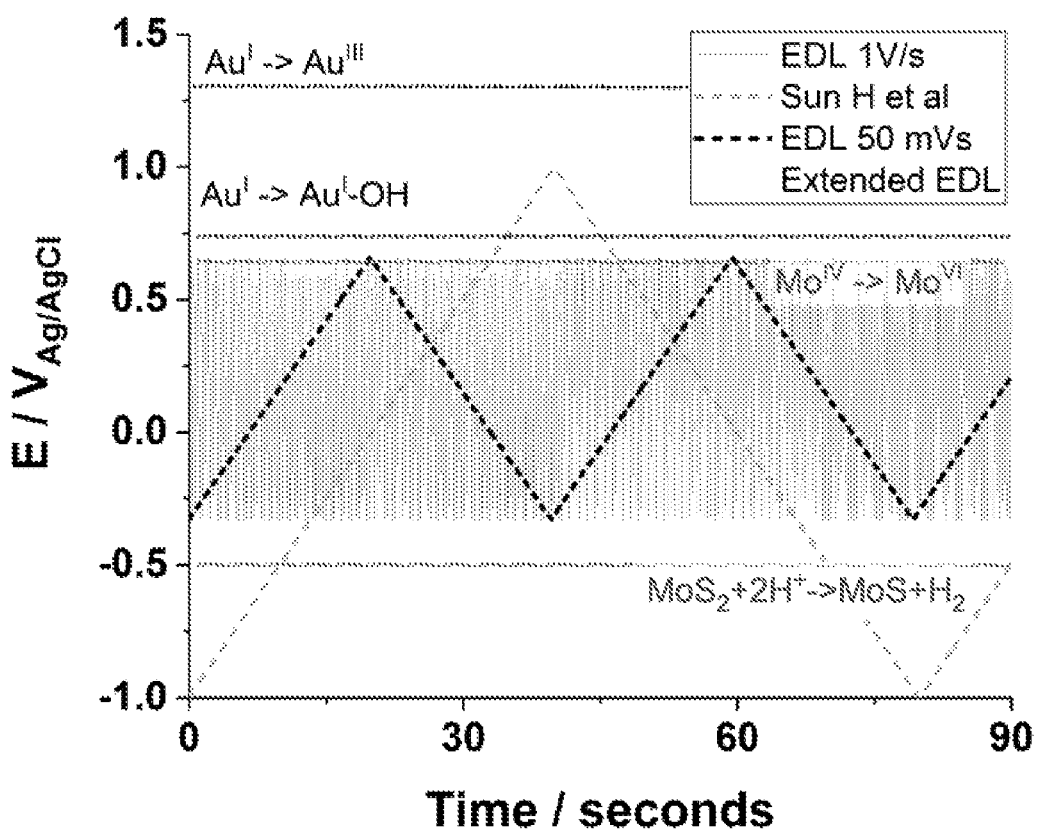
FIG. 1B is E versus time plot showing modification of gold with $MoS_2$ under different conditions.
Figure 1C:
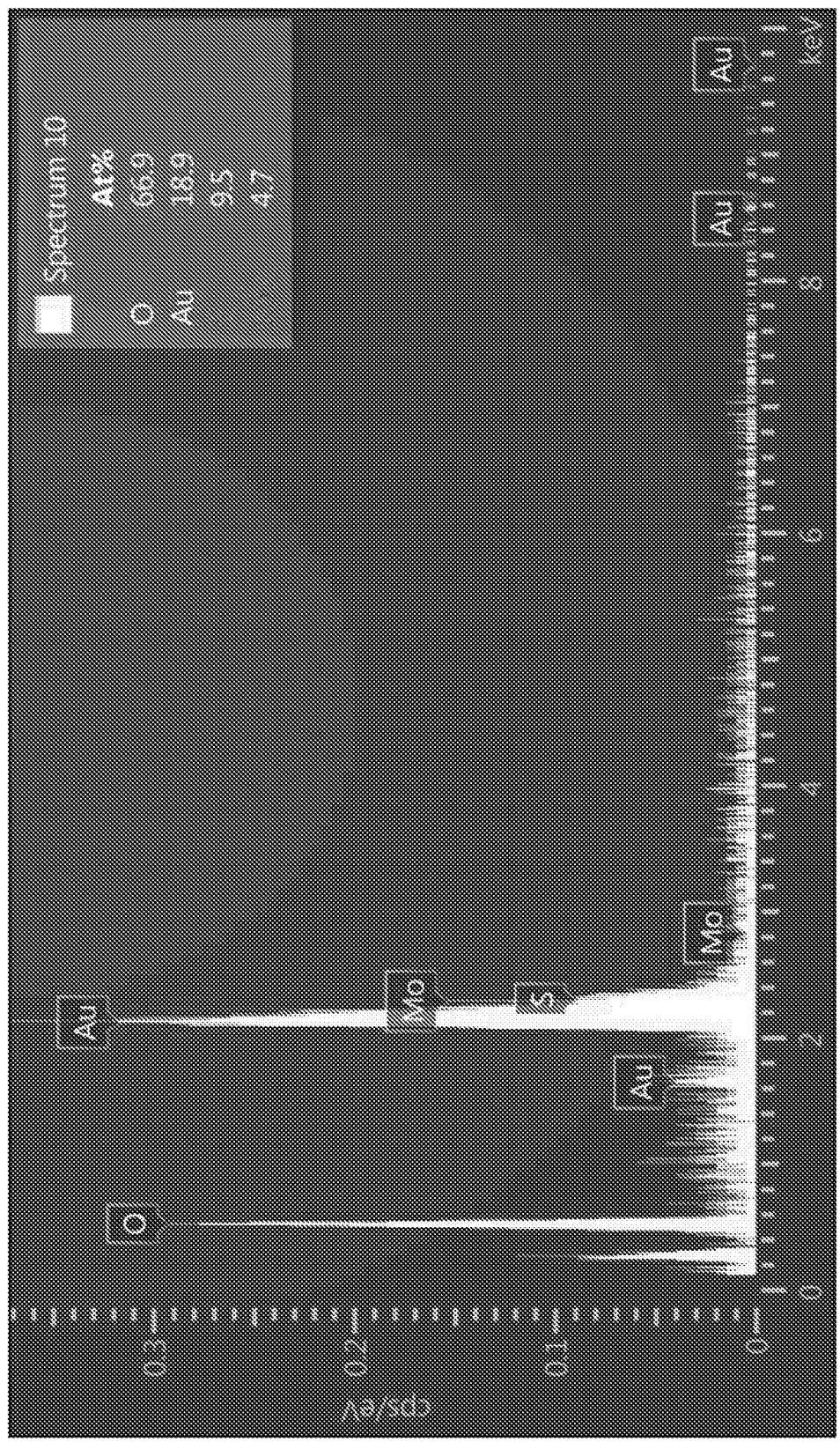
FIG. 1C is energy-dispersive X-ray spectrum showing the elemental composition of the coating.

Looking at FIG. 1B, it is seen that the MoS$_2$ material was electrodeposited with cyclic voltammetry (CV), as reported by Sun et al. (FIG. 1B, grey dashed trace), and by using a smaller potential window limited to the gold electrochemical double layer (EDL) formation region. The black traces correspond to the electrodeposition of the TMDC material in the EDL region at different scan rates. The gold EDL region exists between −0.3 and 0.7 V$_{Ag/AgCl}$. At these potentials the pseudo-capacitive currents emerging from the reversible adsorption of the electrolytes' ions dominate. The potential window for the electrodeposition of MoS$_2$ was later increased (FIG. 1B, grey dotted trace), leading to the concomitant formation of a gold hydroxide adduct (+0.8 V$_{Ag/AgCl}$) and the formation of a gold oxide layer (+1.3 V$_{Ag/AgCl}$). The deposition of MoS$_2$ with CV at high polarization potentials, as reported by Sun et al. (from −1 to +1 V$_{Ag/AgCl}$), involves the consecutive oxidation/reduction of molybdenum atoms within the lattice (E (Mo$^{IV}$/Mo$^{VI}$)=0.7 V$_{Ag/AgCl}$), and the creation of sulfur defects at E<−0.5 V$_{Ag/AgCl}$ (FIG. 1B).

Figure 1D:
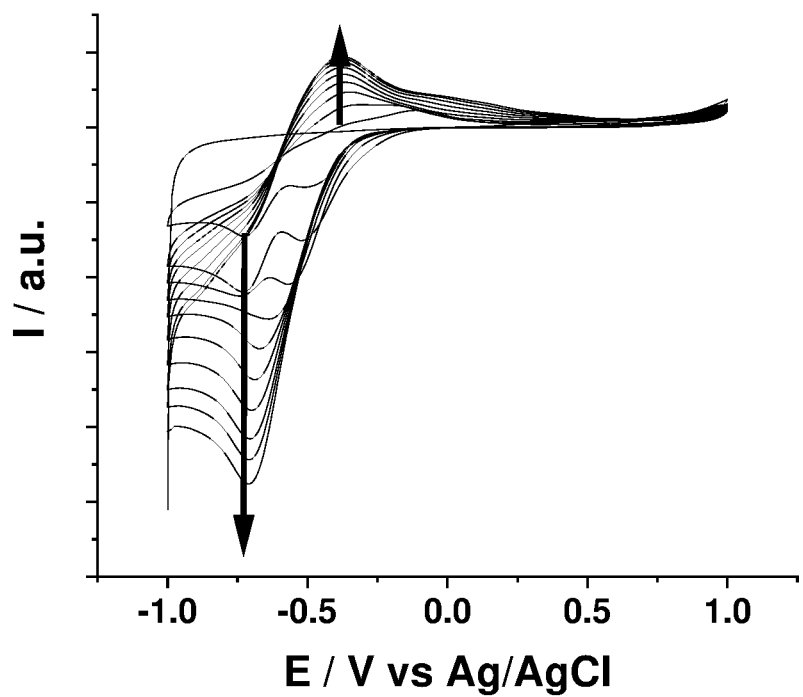
FIGS. 1D and 1E are current versus potential CV plots.
Figure 1E:
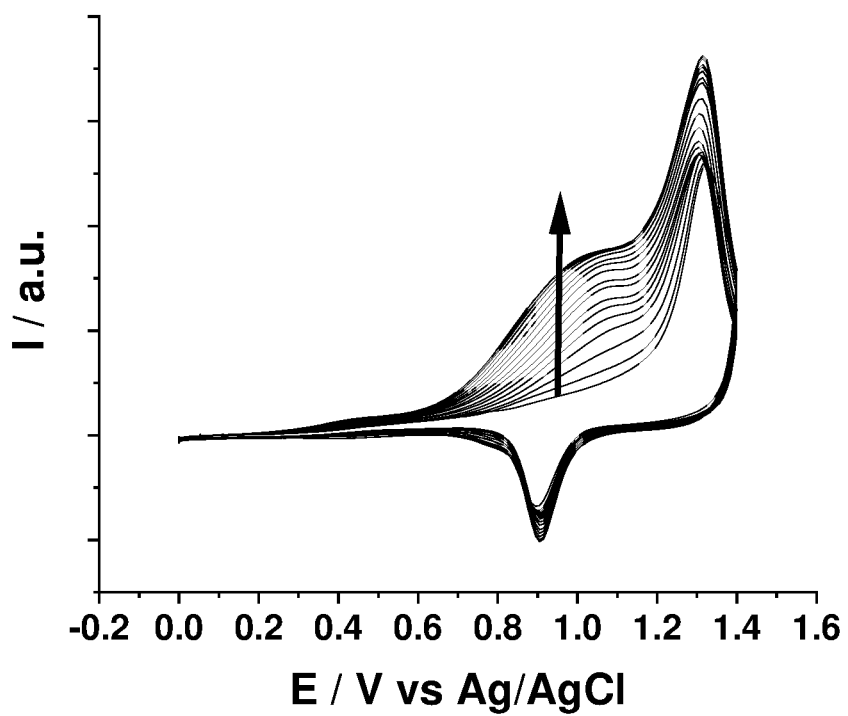
Figure 1F:
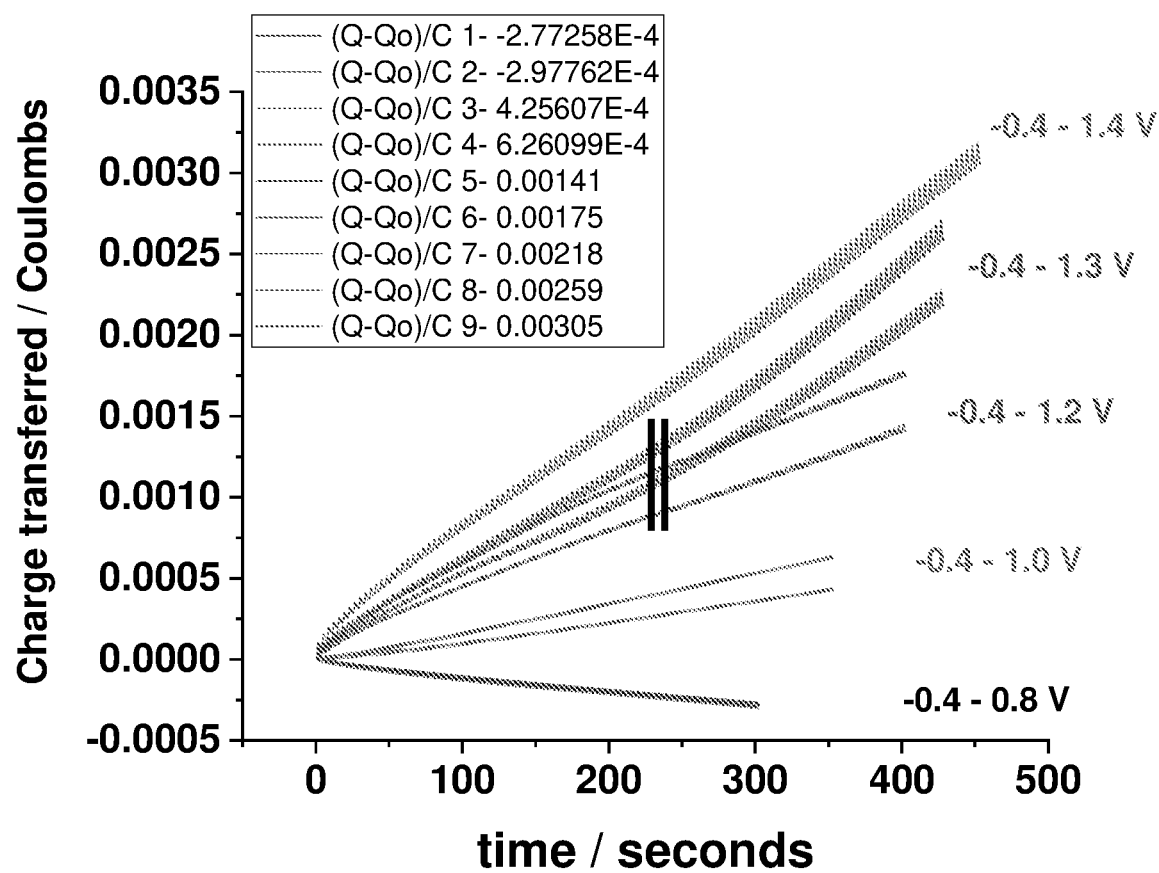
FIG. 1F is charge transferred versus time plot corresponding to deposition at different potential intervals.

As a result, the quantity of charge transferred during the electrodeposition is negative, with an increase in the reduction peak at −0.5 V$_{Ag/AgCl}$ (FIG. 1D). When MoS$_2$ is deposited within the gold's EDL, the quantity of charge transferred is positive and the cyclic voltammograms show a gradual decrease in the capacitive currents, whereas the oxidation wave at 1.3 V$_{Ag/AgCl}$ is increased when the extended EDL electrochemical windows is used (FIG. 1E). The cyclic voltammogram of 10 mg L$^{-1}$ MoS$_2$ in 0.1 M sulfuric acid solution displays 3 oxidation waves (0.8, 1.4, and 1.6 V$_{Ag/AgCl}$) associated with the piecewise oxidation of lattice Mo atom, —SS—, and Mo—S$^-$ bond oxidation as well as the total conversion of MoS$_2$ to Mods. The creation of partially oxidized Mo sites for a deposition potential >1.0 V$_{Ag/AgCl}$ leads to increased charge transferred (Q-Q$_0$ in Coulomb, FIG. 1F). The creation of defects on the surface of the electrodeposited MoS$_2$ allows one to increase the number of catalytic sites or the number of defects in the material's 2D structure.

CV and electrochemical impedance spectroscopy (EIS) in the presence of ferrocyanide/ferricyanide as a redox probe were used to characterize the faradaic and capacitive features of the gold electrodes modified with MoS$_2$.

Figure 2A:
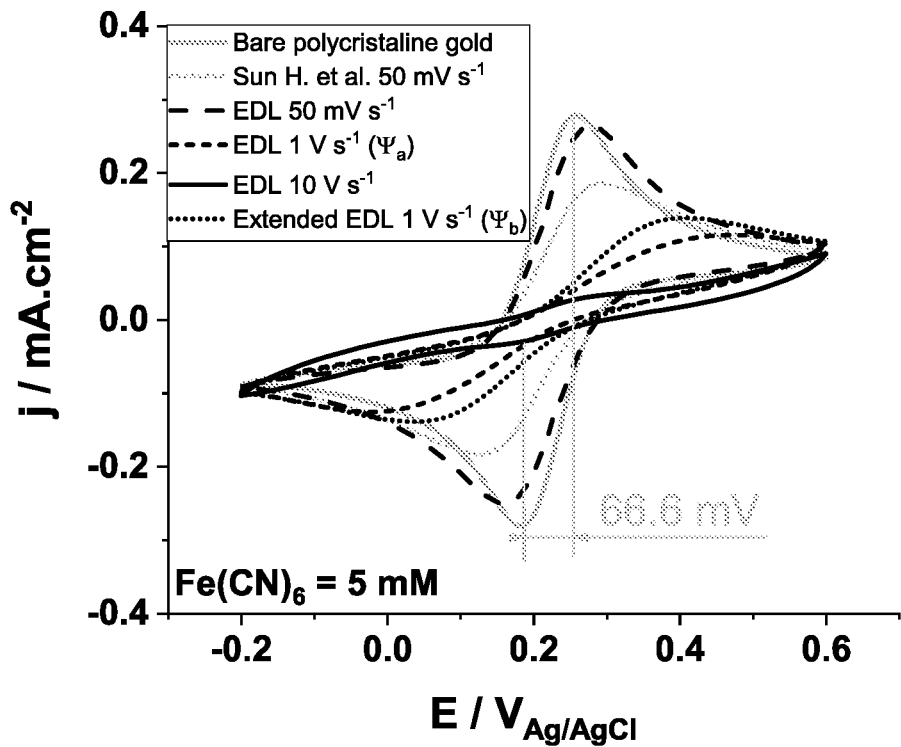
FIGS. 2A and 2B are current density versus potential plots in ferrocyanide/ferricyanide redox probe and uric acid for bare and coated electrodes.

Starting with the cyclic voltammograms of the electrodes in the presence of 5 mM ferrocyanide/ferricyanide redox couple solution, it is seen that the bare electrode displays the narrowest peak-to-peak potential with the highest current density (FIG. 2A, yellow, I$_{anodic}$=I$_{cathodic}$=0.28 mA cm$^{-2}$, ΔE=66.6 mV vs 59 mV for fully reversible systems). For electrodes modified with Sun H. et al protocol (CV between −1/+1 V$_{Ag/AgCl}$, dotted gray trace), a small decrease of anodic and cathodic currents was observed compared to those at the bare electrode, which correlates with the observations shown in FIG. 2B (i.e., (i) the decrease of capacitive currents or (ii) the anodic oxidation peak shift of UA in the differential pulse voltammetry (DPV) analysis in the presence of 400 mM UA). For the gold EDL-based electrodepositions, the effective modification of MoS$_2$ induces a gradual decrease of the peaks' currents densities for both the anodic and cathodic peaks (I$_{anodic}$=I$_{cathodic}$=0.26, 0.14 and 0.03 mA cm$^{-2}$ for deposition at 0.05, 1 and 10 V s$^{-1}$, respectively) and an increase of the peak-to-peak potentials (FIG. 2A, ΔE=150 mV at 50 mV s$^{-1}$, ΔE=450 mV at 1 V s$^{-1}$).

Figure 3:
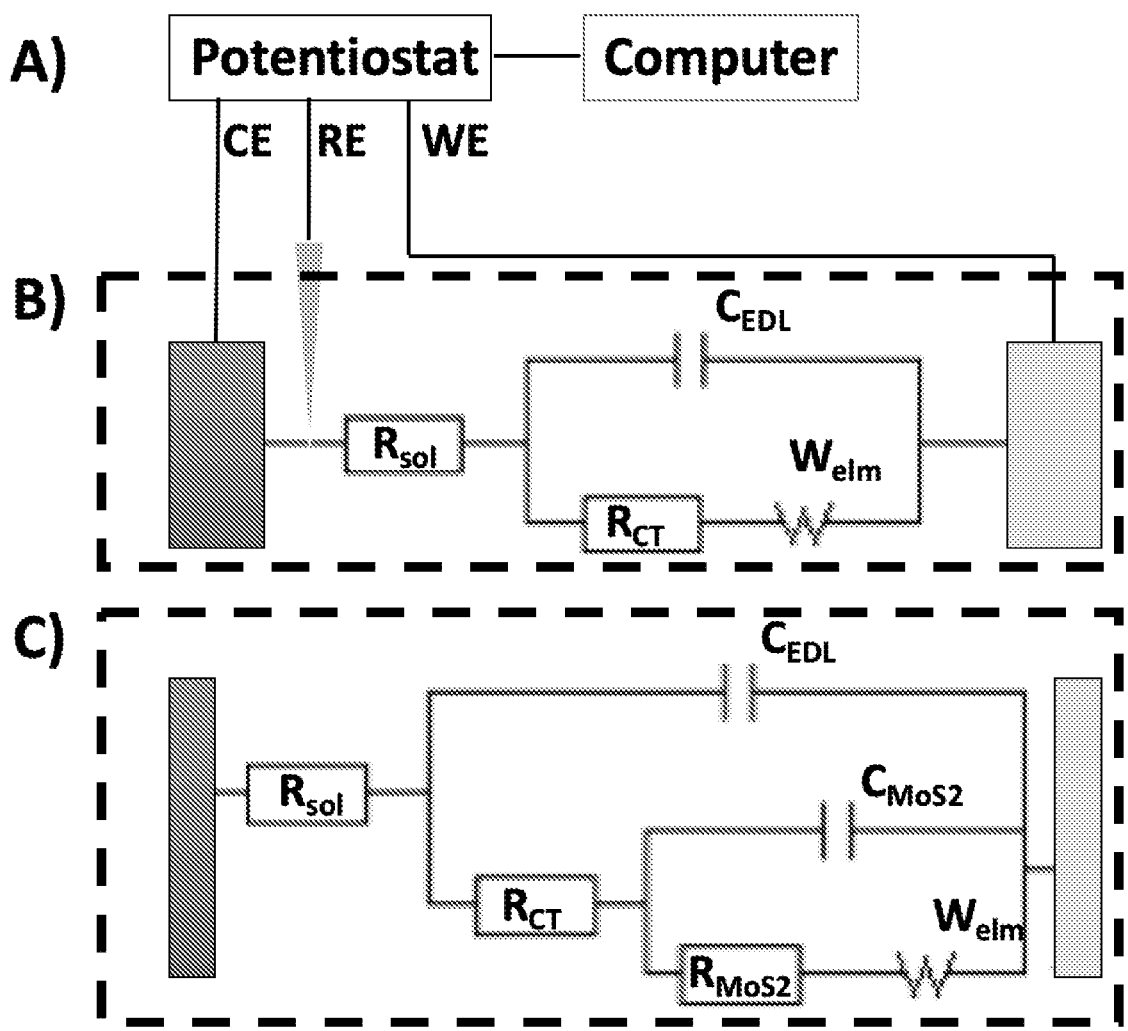
FIG. 3 shows the electrical circuit used for fitting the Nyquist plots of the EIS analysis.

Turning now to the EIS analysis, the specific capacitance and resistance values of each of the electrodes were calculated by fitting of the Nyquist plots of the EIS analysis. The plots were fitted with the circuit shown in FIG. 3. We used a three-electrode setup (A) and a solution containing a ferro/ferricyanide solution (5 mM) to acquire the EIS data. The EIS measurements were recorded at an open circuit potential (0.20±0.05 VAg/AgCl) from 10 kHz to 0.1 Hz with 8 points per decade and with a sine-wave amplitude of 12 mV. The fitting of the EIS spectra was done via BioLogic EC-Lab software; two different equivalent electronic circuits were used. The first Randles Sevick equivalent electronic circuit used to fit the data acquired with the bare electrode (B) comprises the solution resistance (R$_{sol}$), the resistance to charge transfer (R$_{CT}$), the capacitance of the gold electrical double layer (C$_{EDL}$), and a Warburg element. The circuit used to fit the data acquired with the MoS$_2$-modified electrodes (C) comprises a supplementary resistance (R$_{MoS2}$) and capacitance (C$_{MoS2}$) corresponding to the electrodeposited material. The result of resistance and capacitance values are summarized in Table 1.

TABLE 1

| Sample | R$_{sol}$ [Ohm] | R$_{MoS2}$ [Ohm] | C$_{MoS2}$ [F] | R$_{CT}$ [Ohm] | C$_{EDL}$ [F] | W$_{elm}$ [Ohm s$^{-1/2}$] |
|---|---|---|---|---|---|---|
| Bare | 155 ± 5 | N/A | N/A | 175 ± 55 | 0.6 ± 0.1 × 10$^{-6}$ | 2.2 × 10$^3$ |
| Sun et al. | 157 ± 6 | 333 ± 67 | 0.5 × 10$^{-6}$ | 2600 ± 154 | 0.4 ± 0.1 × 10$^{-6}$ | 6.3 × 10$^3$ |
| EDL 50 mV s$^{-1}$ | 155 ± 5 | 478 ± 43 | 0.56 × 10$^{-6}$ | 750 ± 162 | 0.7 ± 0.1 × 10$^{-6}$ | 3.6 × 10$^3$ |
| EDL 1 V s$^{-1}$ | 158 ± 6 | 521 ± 10 | 0.2 × 10$^{-6}$ | 12900 ± 429 | 0.2 ± 0.05 × 10$^{-6}$ | 45.9 × 10$^3$ |
| EDL 10 V s$^{-1}$ | 156 ± 4 | 1200 ± 23 | 0.1 × 10$^{-6}$ | 24500 ± 625 | 0.9 ± 0.1 × 10$^{-6}$ | 155 × 10$^3$ |
| Large EDL 1 V s$^{-1}$ | 157 ± 5 | 220 ± 510 | 0.5 × 10$^{-6}$ | 820 ± 172 | 0.7 ± 0.1 × 10$^{-6}$ | 7.2 × 10$^3$ |

Figure 2B:
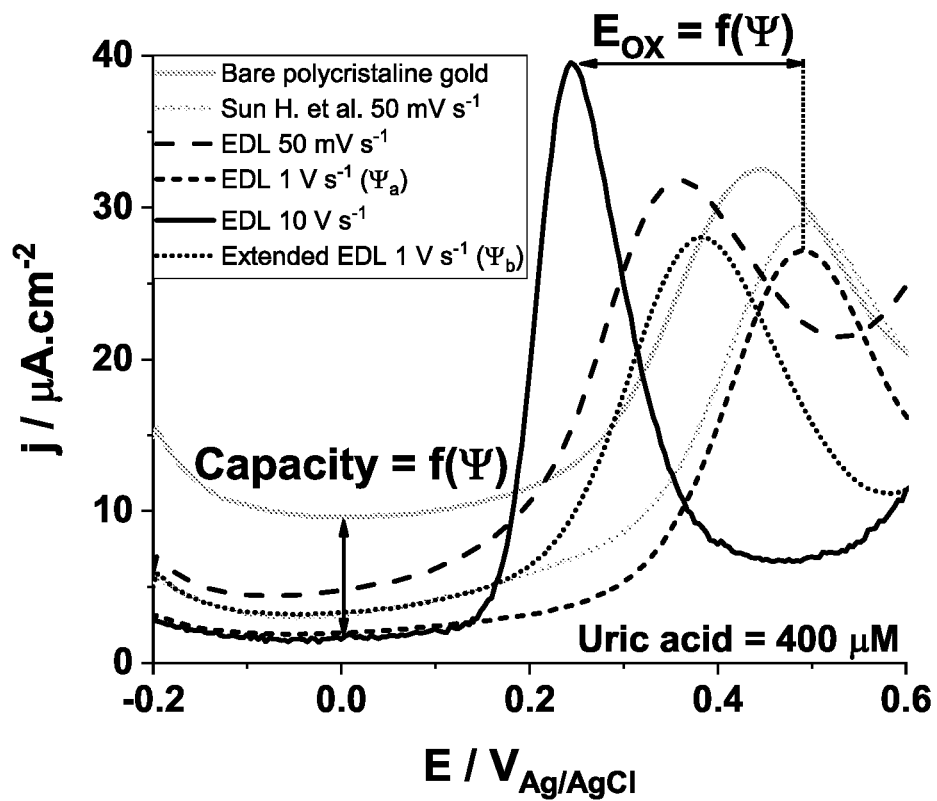

The increase of the number of cycles via increasing the scan rate leads to an increase of electron transfer resistance by 146-fold (from 175Ω for bare gold to 25700Ω for two resistances added in series and corresponding to the gold and to the MoS$_2$ layer). The decrease of the capacitance observed by EIS (from 0.6 to 0.2 µF), due to the MoS$_2$ add-layer, is consistent with the decrease of capacitive current observed in the DPV analysis in the presence of UA, chosen as a natural redox active analyte (FIG. 2B). The decrease of capacitance in the range −0.2 to 0.1 V$_{Ag/AgCl}$ is more pronounced for those samples modified at higher scan rates (having a greater number of deposition cycles). The shift in the UA oxidation peak is correlated with the capacitance change in the gold electrical double layer (C$_{EDL}$, see Table 1). A higher capacitance (C$_{EDL}$>0.6 µF) shifts the oxidation peak of UA toward a more oxidative potential (ΔE=80 mV), and a lower capacitance shift UA oxidation peak shifts it to lower potentials (ΔE=230 mV for C$_{EDL}$=0.2 µF). The modification of the electrode using the protocol published by Sun H et al. affects only slightly the oxidation peak of UA; the electro deposition of MoS$_2$ at 10 V s$^{-1}$ decreases the oxidation potential of UA by 230 mV. The electrodeposition of MoS$_2$ within the gold EDL region is more effective at high scan rates due to the larger number of polarization cycles. By combining both the CV and EIS results, there is identified a large electrochemical window involving a complex redox reaction for both the material (MOS$_2$/MOS, Mo$^{IV/VI}$) and the polycrystalline gold substrate (Au/Au—OH, Au$^{I/III}$), leading to the deposition of the MoS$_2$ material. The decrease in the capacitive current in the range of −0.2 to 0.1 V$_{Ag/AgCl}$, observed in the DPV analysis for the MoS$_2$-modified electrodes, are correlated with the decrease in C$_{EDL}$ obtained from the EIS analysis.

Example 3

Electrochemical Sensing of Hydroxyurea, Uric Acid and L-Ascorbic Acid in PBS

Preparation

Phosphate-buffered saline was prepared as a 10× stock solution and was diluted daily for the purpose of the experiments reported herein. The 10×PBS pH 7.4 solution was prepared by adding 1.37 M NaCl (40 g), 27 mM KCl (1 g), 1 M Na$_2$HPO$_4$ (7.2 g), and 18 mM KH$_2$PO$_4$ (1.2 g) in MQ water (0.5 L). A ferrocyanide/ferricyanide electrochemical characterization solution was prepared with an equimolar quantity of ferrocyanide (105.5 mg) and ferricyanide (82.5 mg) dispersed in 1×PBS solution (100 mL). HU standard solutions of 50, 100, 150, 200, 250, 300, 350, 400, 450, and 500 µM were prepared daily by successive dilution of a 10 mM HU (15.2 mg) stock solution (20 mL).

Electrochemical Measurements

HU containing PBS samples 5 mL) were characterized by differential pulse voltammetry (DPV) on a Biologic VSP potentiostat. The initial potential was-0.2 V, the vertex potential was 0.6 V, the pulse height was 0.1 V, the pulse width was 0.01 s, the step height was 5 mV, and the step time was 0.1 s (equivalent scan rate: 50 mV s$^{-1}$). The calibration curve of HU, UA, and AA in PBS were acquired within their pharmaceutical and biological relevant concentrations ranges (0-500 µM, 0-400 µM, and 0-250 µM, respectively). Triplicates were recorded and averaged using the multiple curve average tool available from Origin™ Pro software. The sensitivity was calculated as the slope of the linear regression analysis plot; the errors bars for the sensitivity were determined by linear regression analysis. IUPAC guidelines were used to calculate the limit of detection (LoD), taken as 3 times the intercept error divided by the slope with the error on the limit of detection calculated as the intercept error divided by the slope, a method used for comparisons purpose.

Results

Figure 4A:
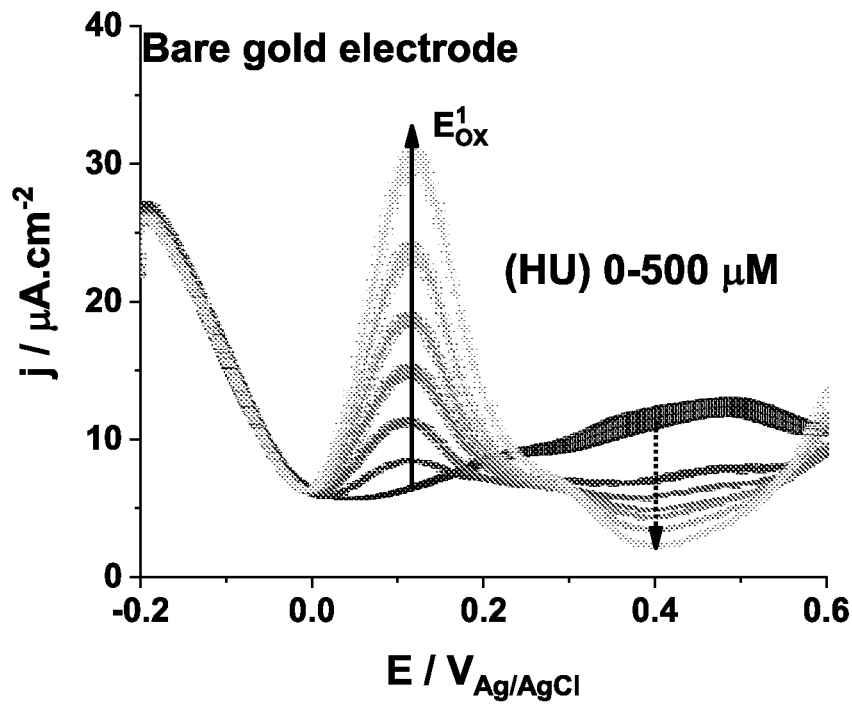
FIGS. 4A and 4B are current density versus potential plots generated by bare gold and $MOS_2$ modified electrodes, respectively.
Figure 4B:
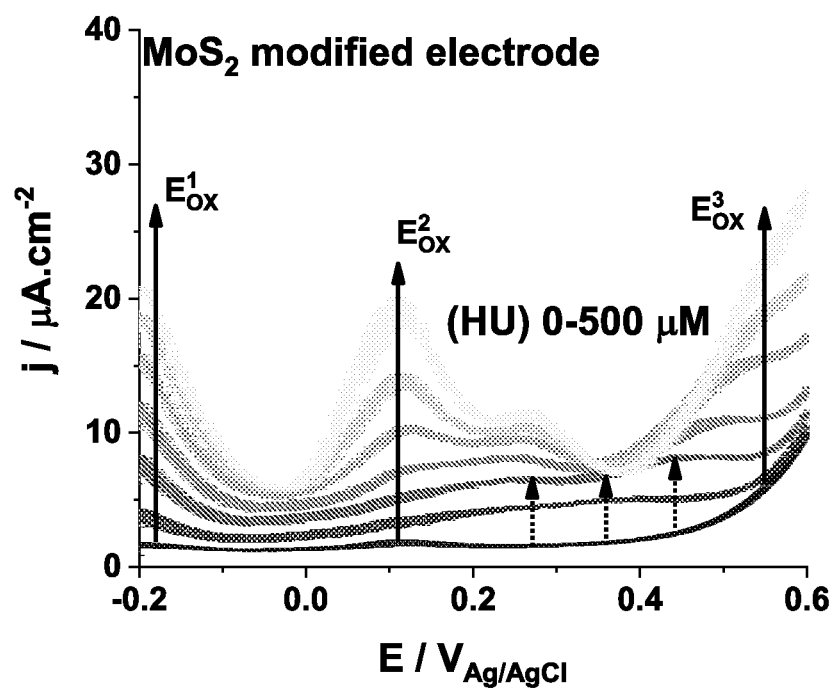
Figure 4C:
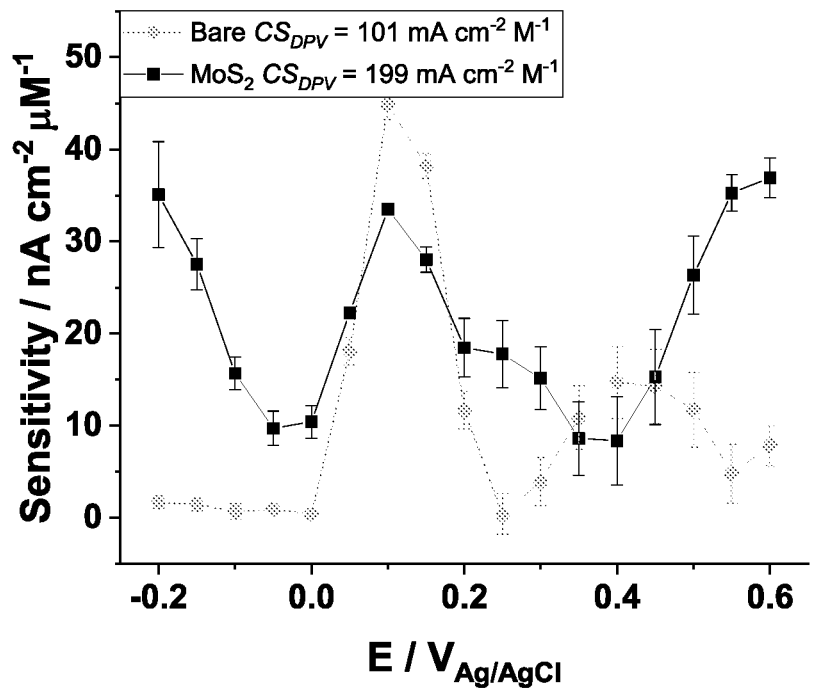
FIG. 4C is sensitivity versus potential plot, comparing between a bare gold electrode and $MoS_2$ modified electrode.
Figure 4D:
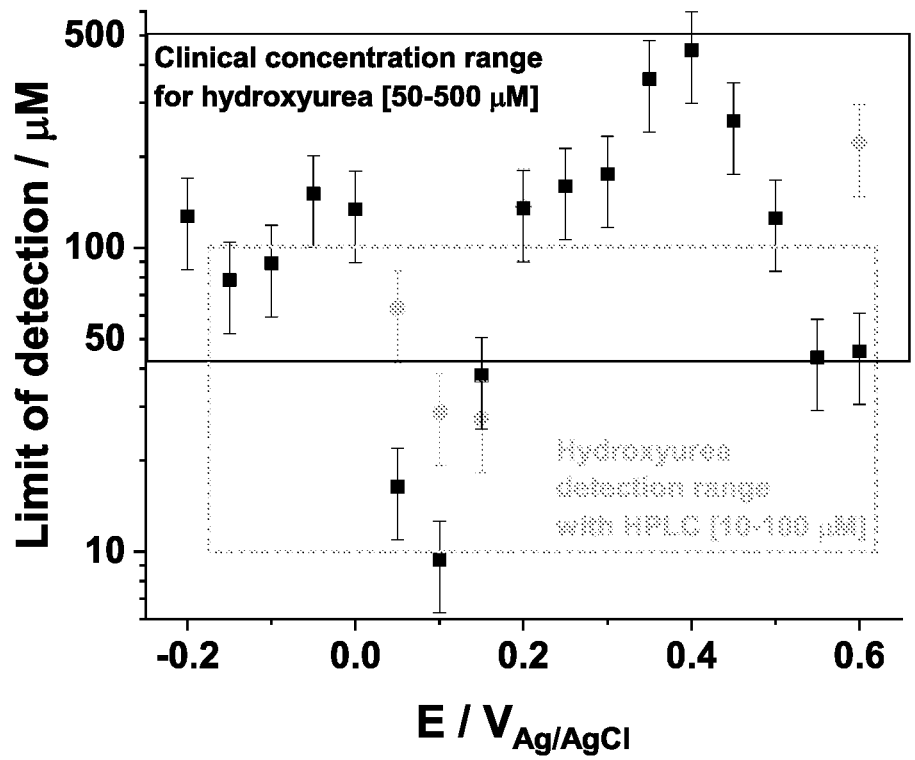
FIG. 4D is LOD versus potential plot for hydroxyurea.

FIG. 4A-4B show differential pulse voltammograms (DPV) at increasing hydroxyurea concentration (HU: 0, 50, 100, 150, 250, 350, 500 µM) in the phosphate buffer saline solution pH 7.4 recorded on a bare polycrystalline gold electrode (4A) and the MoS$_2$ modified gold electrodes (4B). Faradaic (plain black arrow) and capacitive (dotted black arrow) currents synergistically contribute to the dose-response characteristics of the calibration curves. The electrochemical sensor sensitivities at each potential are calculated from regression analysis in the concentration range 0-500 µM (FIG. 4C). The limit of detection for HU at the bare (gray) and the MoS$_2$ modified electrode (black) are within the biological concentration range (FIG. 4D).

Starting with FIG. 4A, the electrochemical signature of HU, on a bare polycrystalline gold electrode and in phosphate-buffered saline (PBS) at pH 7.4, presents a positive dose-response peak at 0.1 V$_{Ag/AgCl}$, attributed to the oxidation of HU, and a negative dose-response feature centered at 0.4 V$_{Ag/AgCl}$, attributed to the decrease of the electrode pseudo-capacitance. The background voltammogram recorded at the clean bare gold electrode presents two pseudo-capacitive waves centered at −0.2 V$_{Ag/AgCl}$ and 0.4 V$_{Ag/AgCl}$ due to the adsorption of the buffer's anions at gold adatom sites (c.a. phosphate and chlorine). Gold adatoms are inherently present on commercial polycrystalline gold electrodes; they present enhanced electrochemical activity due to their partial oxidation state, namely, AuTads. The electrochemical determination of HU at low potentials is possible due to its concomitant adsorption and oxidation following a sequential path (Equations 1, 2, 3):

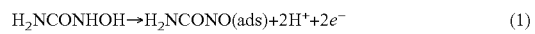

$$H_2NCONHOH \rightarrow H_2NCONO(ads)+2H^++2e^- \quad (1)$$

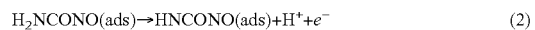

$$H_2NCONO(ads) \rightarrow HNCONO(ads)+H^++e^- \quad (2)$$

$$HNCONO(ads) \rightarrow 2NCO+H^++e^- \quad (3)$$

Upon the addition of HU (ca. 50 µM), the pseudo-capacitive current observed at the bare gold between 0.1 and 0.6 V$_{Ag/AgCl}$ vanishes, due to the irreversible adsorption of HU oxidation products (Equation 1), hindering the reversible adsorption of the chlorine buffer's anions. The further oxidation of HU on gold (E$_{Ox1}$≥0.25 V$_{Ag/AgCl}$) is linked to the formation of new partially oxidized adsorbate species, thus explaining the dose response-dependent decrease of a pseudo-capacitive currents centered at 0.4 V$_{Ag/AgCl}$ with increasing HU concentration (FIG. 4A).

Turning now to FIG. 4B, it is seen that the MoS$_2$-modified electrode allows the first oxidation step of HU to be decreased by 300 mV. The DPV presents both a capacitive and faradaic positive dose-response distributed over the full (−0.2-0.6 V$_{Ag/AgCl}$) potential range. The background voltammogram acquired in a PBS solution pH 7.4 (FIG. 4B, black trace) is linear until the onset of lattice molybdenum atoms oxidation (E$_{on}$=0.5 V$_{Ag/AgCl}$) [35]. The pseudo-capacitive wave observed at the bare gold electrode and linked to the buffer ions' reversible adsorption is completely suppressed at the MoS$_2$-modified electrode. Instead, capacitive current over an extended potential range emerges upon the addition of HU (ca. 50 µM). The oxidation mechanism underlying HU determination is ambiguous at concentrations below 150 µM until a clear oxidation pattern is centered at −0.2, 0.1, and 0.6 VAg/AgCl. It emerges with similar dose response sensitivities of 35±3 mA cm$^{-2}$ M$^{-1}$. The two first oxidation peaks, located at −0.2 V$_{Ag/AgCl}$ and 0.1 V$_{Ag/AgCl}$, correspond to the partial oxidation of HU (Equations 1&2). The second peak's duplicity tends to disappear at high concentrations (e.g., >350 µM); this is attributed to the absorption of oxidation byproducts. The total oxidation of HU on the MoS$_2$-modified gold occurs at 0.6 V$_{Ag/AgCl}$, which is 200 mV lower than that of a bare electrode. It corresponds to the concomitant deprotonation and oxidation of the adsorbed oxidation by-products (Equation 3). The ability of the MoS$_2$-modified gold electrode to sense HU at a potential <0 V$_{Ag/AgCl}$ is most likely associated with the hydronium adsorption properties of TMDC materials, favoring the electrochemical oxidation deprotonation step.

The sensitivity of each electrode construct was calculated from linear regression analysis over the full DPV potential range (FIG. 4C). Capacitive and faradaic currents contribute synergistically to the dose-response features of each electrode; the sensitivities are 44.9±1.7 mA cm$^{-2}$ M$^{-1}$ and 35.5±0.4 mA cm$^{-2}$ M$^{-1}$ at 0.1 V$_{Ag/AgCl}$ for bare gold and MoS$_2$ electrodes, respectively. The MoS$_2$ electrode presents 2 supplementary features at −0.2 and 0.6 V$_{Ag/AgCl}$ with a sensitivity of 35±6 mA cm$^{-2}$ M$^{-1}$ and 37±2 mA cm 2 M$^{-1}$, respectively. The coefficient of determination resulting from linear regression at those potentials is >0.9. Given the opportunity to quantify HU on a broad range of potentials, we defined the combined sensitivity (CS) of the DPV analysis for a given electrode in the potential range (Equation 4):

$$CS_{DPV}\{-0.2 < V_{Ag/AgCl} < 0.6\} = \Sigma S_v, \text{ for } R^2_{(Sn)} > 0.9 \quad (4)$$

As shown in FIG. 4C, the CS of the DPV analysis for bare gold ($CS_{DPV}$=101±2 mA cm$^{-2}$ nM$^{-1}$) is significantly lower than that of the MoS$_2$-modified electrode ($CS_{DPV}$=199±3 mA cm$^{-2}$ nM$^{-1}$), attesting for the advantages of the TMDC in determining the HU concentration in PBS.

The LOD for HU (FIG. 4D) at the MoS$_2$-modified electrode (LOD$_{(E=0.1V)}$=9.4±3.1 µM) is improved, compared to the bare gold electrode (LOD (E=0.1V)=28.8±9.6 µM). Whereas the bare gold electrode fails to accurately quantify HU below its biological range (Limit of quantification=3× LoD>50 µM), the MoS$_2$-modified electrode allows to accurately quantify HU within its biological concentration range at 2 different potentials, with thresholds as low as for HPLC analytical techniques (10-100 µM, FIG. 4D).

Next, specificity of the electrodes toward the oxidation of two major interfering species (uric acid and L-ascorbic acid) consistently encountered in biofluids, was studied, and the results are shown in FIG. 5.

Figure 5A:
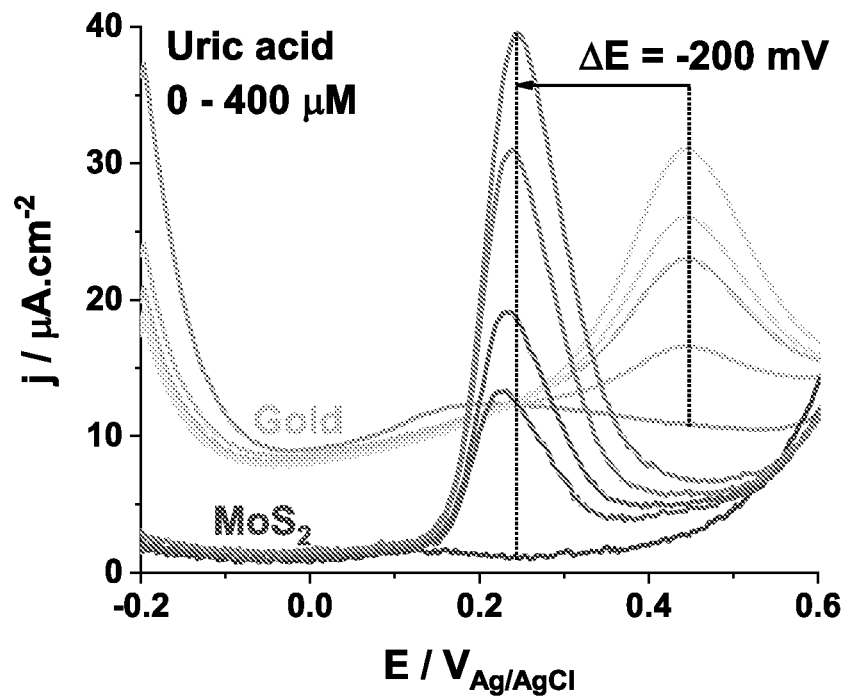
FIGS. 5A and 5B are current density versus potential plots measured at the $MoS_2$-coated electrode.
Figure 5B:
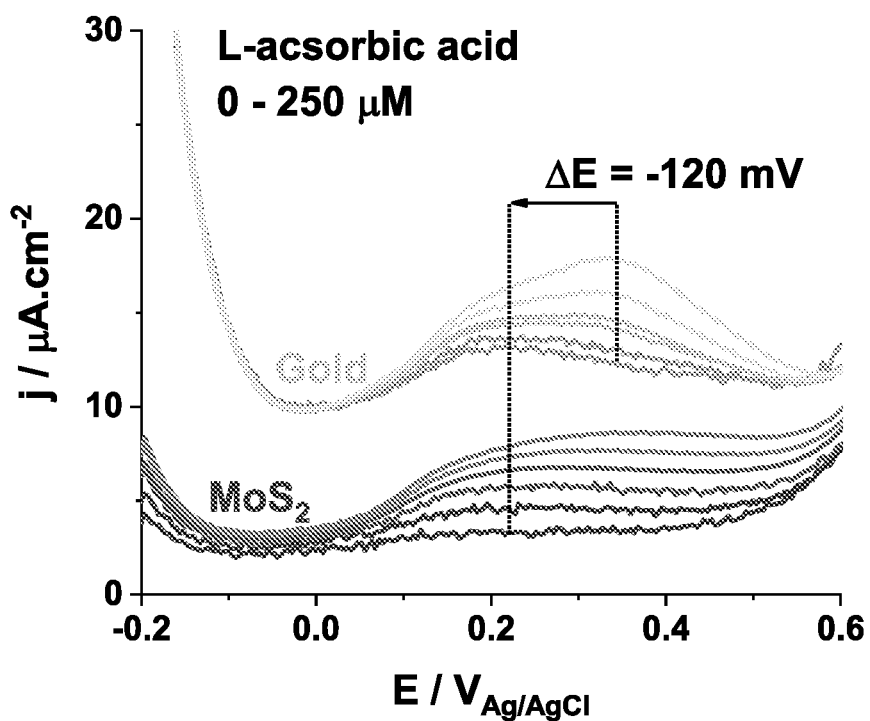
Figure 5C:
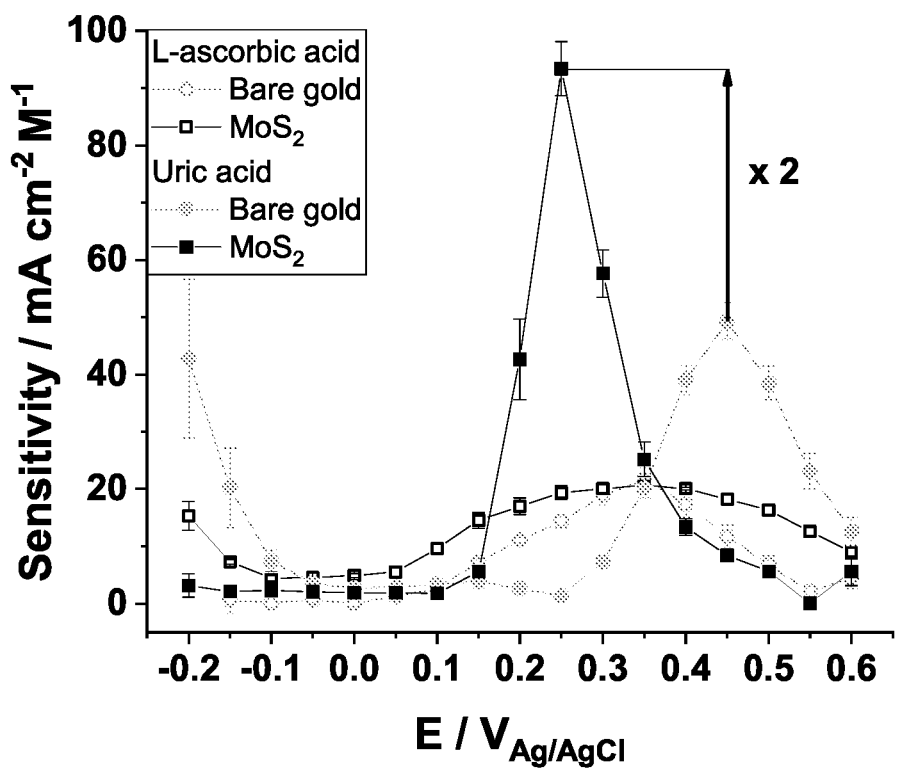
FIG. 5C is sensitivity versus potential plots measured at the bare gold electrode and the $MoS_2$-modified coated electrode for ascorbic acid and uric acid.
Figure 5D:
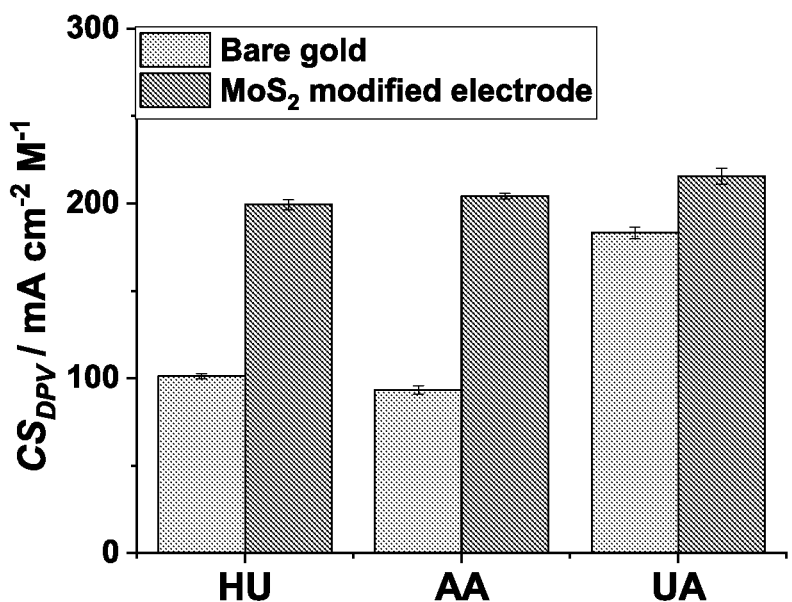
FIG. 5D is a bar diagram showing the advantage of the $MoS_2$-coated electrode versus bare golf electrode.

FIGS. 5A and 5B show differential pulse voltammograms (DPV) recorded for uric acid and L-ascorbic acid at the bare (grey) and the MoS$_2$ (black) modified electrodes. FIG. 5C shows the sensitivities over the DPV analysis potential range for uric acid (squares) and L-ascorbic acid (circles) at the Bare (grey) and the MoS$_2$ (black) modified electrode. FIG. 5D is a bar diagram showing the combined selectivity of the DPV analysis ($CS_{DPV}$) over the full potential range for hydroxyurea (HU), L-ascorbic acid (AA) and uric acid (UA).

FIG. 5A shows the effect of electrodeposited MoS$_2$ on the oxidation peak potential of UA: it decreased from 0.45 to 0.25 V$_{Ag/AgCl}$. A smaller half peak width at the MoS$_2$ electrode (112 mV vs 168 mV at the bare gold) indicates a greater electrochemical reversibility of UA oxidation due to the enhanced mass transport. The LoD values are above the biological concentration range of the analyte with the bare electrode and are within the biological concentration range of the analyte for the MoS$_2$-modified electrode.

FIG. 5B shows that the oxidation peak of AA is shifted to a lower potential at the MoS$_2$ electrode (from 0.35 to 0.23 V$_{Ag/AgCl}$). In addition to the decrease of capacitive currents from 10 to 3 µA cm$^{-2}$ at 0 V$_{Ag/AgCl}$, the modification of the electrode slightly widens the electrochemical signature of AA.

The sensitivity of each electrode toward UA and AA over the potential range of −0.2 to 0.6 V$_{Ag/AgCl}$ was calculated, at increasing concentrations of analytes in PBS at pH 7.4 (FIG. 5C). Owing to the electrodeposited MoS$_2$, the electrochemical sensitivity is increased toward UA oxidation by 2-fold (from 49±3 to 93±5 mA cm$^{-2}$ M$^{-1}$). A slight increase of the sensitivity toward AA is observed at 0.4 V$_{Ag/ACl}$ (from 17±2 to 20±0 mA cm$^{-2}$ M$^{-1}$). It is possible to increase the sensitivity toward UA 7-fold at 0.3 V$_{Ag/AgCl}$ and 3.5-fold toward AA at 0.1 V$_{Ag/AgCl}$ with the MoS$_2$ modified electrode.

FIG. 5D shows the cumulative selectivity of the DPV analyses ($CS_{DPV}$) in the form of bar diagrams, emphasizing that the MoS$_2$-modified electrode generates twice as many features for the electrochemical determination of HU and AA. The $CS_{DPV}$ toward AA increases from 93±2 to 204±1 mA cm$^{-2}$ M$^{-1}$ and from 184±3 to 216±5 mA cm$^{-2}$ M$^{-1}$ toward UA. The decrease of the oxidation potential for the three analytes and the two-fold increase of sensitivity for UA on the MoS$_2$ modified electrode may be explained by the relative hydrophobicity of the analytes (Log P$_{UA}$<Log P$_{HU}$<Log P$_{AA}$<Log P$_{H2O}$) favoring Van der Walls interactions with the electrodeposited material.

Example 4

Electrochemical Sensing of Hydroxyurea in Simulated Serum Using Chemometrics

Preparation of Samples

The simulated serum was prepared by adding each salt in MQ water under stirring at 600 rpm (800 mL). Each compound concentration lies in its maximum biological concentration in order to exacerbate the synergic effects. Specifically, the simulated serum contains 0.6 nM dopamine (dilution 1:1000 v/v from 0.6 mM stock solution), 110 µM ascorbic acid (19.9 mg), 400 µM uric acid (67.2 mg), 12 µM oxalic acid (1.1 mg), 400 µM tri-sodium citrate (645.1 mg), 9 mM urea (540.5 mg), 1 mM ATP (551.1 mg), 170 µM acetone (12.6 mL), 58 µM methanol (2.3 mL), 670 µM L-glutamine (97.9 mg), 63 µM L-cysteine (7.6 mg), 6.1 mM D-glucose (1.1 g), 276 µM L-valine (32.3 mg), 38 µM L-methionine (5.7 mg), 217 µM L-lysine (31.7 mg), 2.4 mM L-lactic acid (216 mg), 150 µM L-Glutamic acid (22.1 mg), 407 µM L-Alanine (36.2 mg), 140 µM L-arginine (24.5 mg), 282 µM Glycine (21.2 mg), 800 M magnesium sulfate (96.3 mg), 25 mM ammonium carbonate (2.4 g), 2.5 mM calcium chloride (277 mg), 9 mM iron sulfate (1.36 g), 10 mM disodium phosphate (1.42 g), 4.5 mM potassium chloride (335 mg), and 144 mM sodium chlorine (8.18 g instead of 8.41 g to compensate for chlorine ions already added as counter ions with previous compounds). Care must be taken to specifically choose salts whose counter ion concentrations are integrated into the overall concentration, calculating each of the simulated serum components. After its preparation, the simulated serum can be stored at 4° C. up to 1 month unless visible signs of bacterial contamination appear.

Electrochemical Measurements and Chemometric Analysis

Electrochemical measurements included differential pulse voltammetry (DPV) on a Biologic VSP potentiostat. The initial potential was −0.2 V, the vertex potential was 0.6 V, the pulse height was 0.1 V, the pulse width was 0.01 s, the step height was 5 mV, and the step time was 0.1 s (equivalent scan rate: 50 mV s$^{-1}$).

Origin software (OriginPro 2018 (64-bit) SR1; b9.5.1.195) was used to perform the linear regression analysis, allowing the extraction of the slopes (e.g., sensitivities) and the intercepts (e.g., to calculate the LoD) from the calibration datasets. Multivariate analyses such as PCA and PLSR analysis were carried out. Smoothing of raw data was performed using the Savitzky-Golay method with 32 points of window, no boundary conditions, and with polynomial order 2. We used the cubic spline interpolation method to reduce the 160 datapoints of the DPV analysis in human serum to the 17 specific potentials (−0.2, −0.15, −0.1, −0.05, 0, 0.05, 0.1, 0.15, 0.2, 0.25, 0.3, 0.35, 0.4, 0.45, 0.5, 0.55, and 0.6 $V_{Ag/AgCl}$).

Results

In this study, a simulated human serum matrix was prepared, which contained twenty-eight interfering molecules in their upper physiological range buffered at physiological pH. That is, alongside the commonly encountered interfering molecules AA and UA, there were present twenty-six additional redox active components, susceptible to disrupt the electrochemical determination of HU.

Figure 6A:
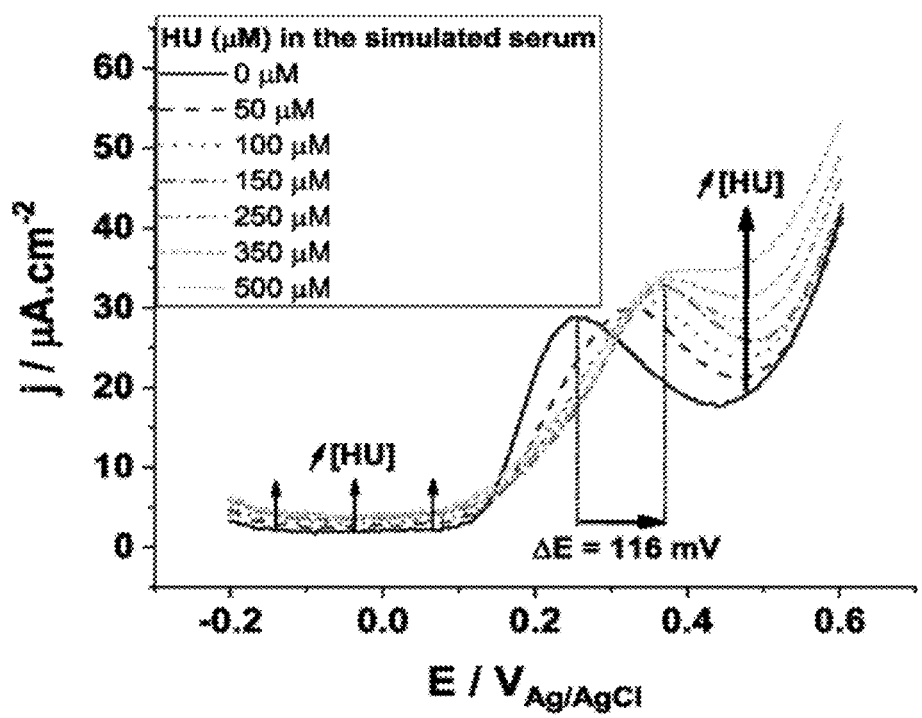
FIG. 6A shows differential pulse voltammograms corresponding to the gradual increase of hydroxyurea (HU: 0, 50, 100, 150, 250, 350, 500 μM) in a buffered simulated serum composed of 28 redox active molecules in their physiological concentration range acquired with the $MoS_2$ modified electrode.

The background voltammogram of the simulated serum, recorded with the $MoS_2$-modified electrode (FIG. 6A, plain black trace), presents a major oxidation peak at the same potential of UA in PBS (29 μA cm$^{-2}$ at 0.25 $V_{Ag/AgCl}$), generating roughly ¾ of the current density of that of a 400 μM UA solution (see FIG. 6A). At the bare electrode, the simulated serum produces a similar oxidation peak that is shifted by 100 mV toward a cathodic potential, compared to the electrochemical signature of 400 μM UA in PBS.

The evolution of the DPV traces at increasing HU concentrations is rather complex in the presence of biological concentration of UA, AA and twenty-six other redox active molecules (FIG. 6A). The peak potential corresponding to UA oxidation is shifted to anodic values and pseudo-capacitive current increases at a low potential (−0.2-0.1 VAg/AgCl), indicating a change of the interfacial equilibrium between the electrode, HU and the 28 molecules composing the simulated serum. At HU concentrations >150 μM, the DPV traces are characterized by an increase in the peak current located between 0.4 and 0.6 $V_{Ag/AgCl}$. The linear regression analysis, and $CS_{DPV}$ analysis of calibration curves over the full potential range, confirms the advantage of the $MoS_2$ modified electrode in determining HU in a synthetic serum ($LOD_{E=0.5V}$=13±4 μM and $CS_{DPV}$=102±4 mA cm$^{-2}$ M$^{-1}$ for $MoS_2$ VS $LOD_{E=0.5V}$=24±8 μM and $CS_{DPV}$=89±2 mA cm$^{-2}$ M$^{-1}$ for the bare gold electrode).

Figure 6B:
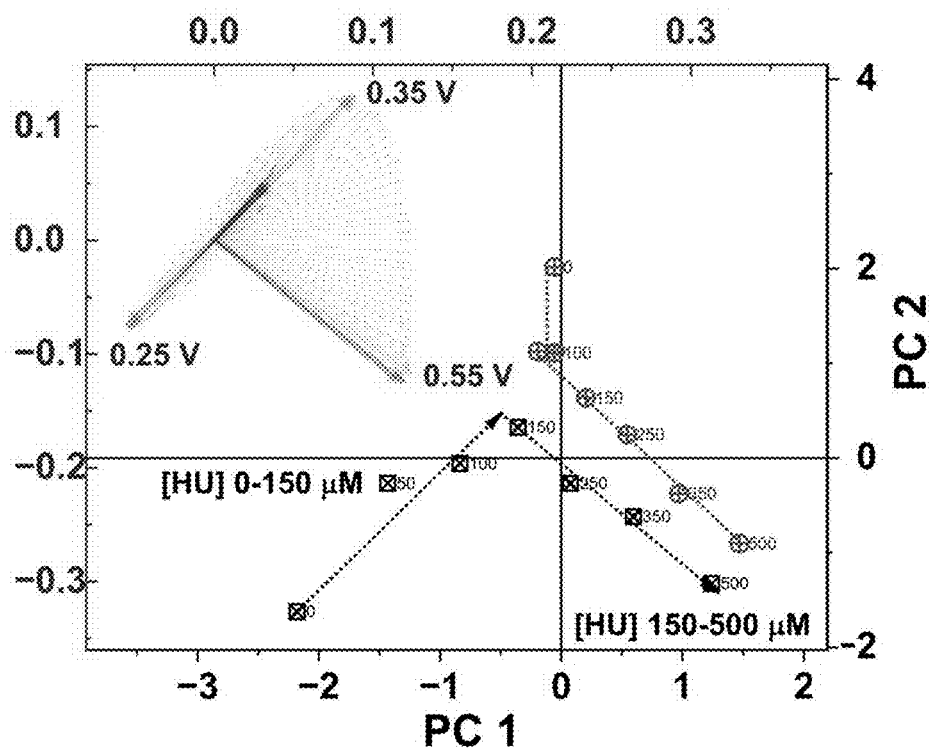
FIG. 6B shows principal component analysis of the DPV datasets for HU calibration within its clinical concentration range (0-500 μM) using both the bare (grey) and the $MoS_2$ modified (black) electrodes dataset. The loading plot (red) displays the covariance of variables with HU concentration variation.

Among chemometric algorithms, PCA can be used to condense large DPV datasets into a smaller set of new composite dimensions. The PCA can explain the variance-covariance structure of the HU calibrations curves over the full range of potentials, through a linear combination (the principal components, PC1 and PC2) that provide a maximized variance for the dataset (FIG. 6B, $MoS_2$-modified electrode in black; bare gold in light gray). The PCA exemplifies the piecewise variation of the DPV traces centered at 150 μM of HU. The loading plots (i.e., the red vector in FIG. 6B) emphasize the positive dose-response relationship at 0.35 $V_{Ag/AgCl}$, and the inverse dose response correlation at 0.25 $V_{Ag/AgCl}$ at low HU concentration (0-150 μM), whereas this tendency is inverted for the bare gold electrode. For HU>150 μM, it is the current variations in the 0.45-0.55 $V_{Ag/AgCl}$ range that correlates directly with the increased HU concentrations for both electrodes.

Figure 6C:
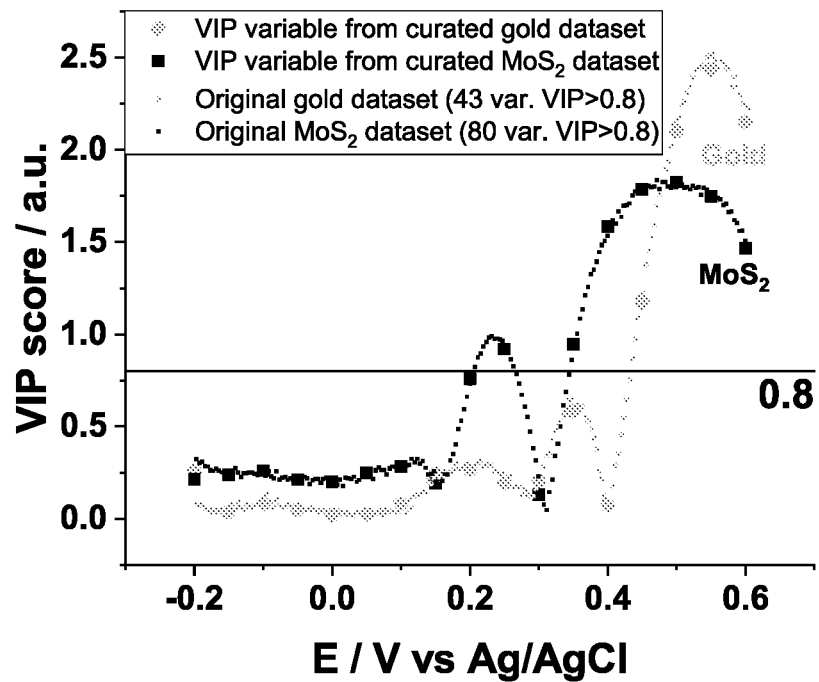
FIG. 6C shows important variable (VIP) score plot resulting from the partial least square analysis of each DPV dataset for increasing HU concentrations.

Partial least squares regression analysis (PLSR) combines the features of PCA and multiple regression analysis that allow predicting HU concentration using the decomposition of the DPV's current vs potential variables. The variable importance plot (VIP) is a measure of the most significant variables that contribute to the DPVs' profile variation for different HU concentrations (FIG. 6C). The variables with scores >0.8 are considered important and may be chosen to generate the multivariate model, whose X and Y axes are a linear combination of current vs potential vectors. The $MoS_2$-modified electrode accumulates 80 variables with VIP scores >0.8 centered around two sets of potential at 0.25 and 0.5 $V_{Ag/AgCl}$, whereas the bare gold electrode's 43 variables are centered at 0.55 $V_{Ag/AgCl}$. We curated the original dataset from 202 to 17 main variables for computational economy needs, the two VIP analysis results superpose (FIG. 6C), the VIP profiles for low and high HU concentrations differs significantly.

Figure 6D:
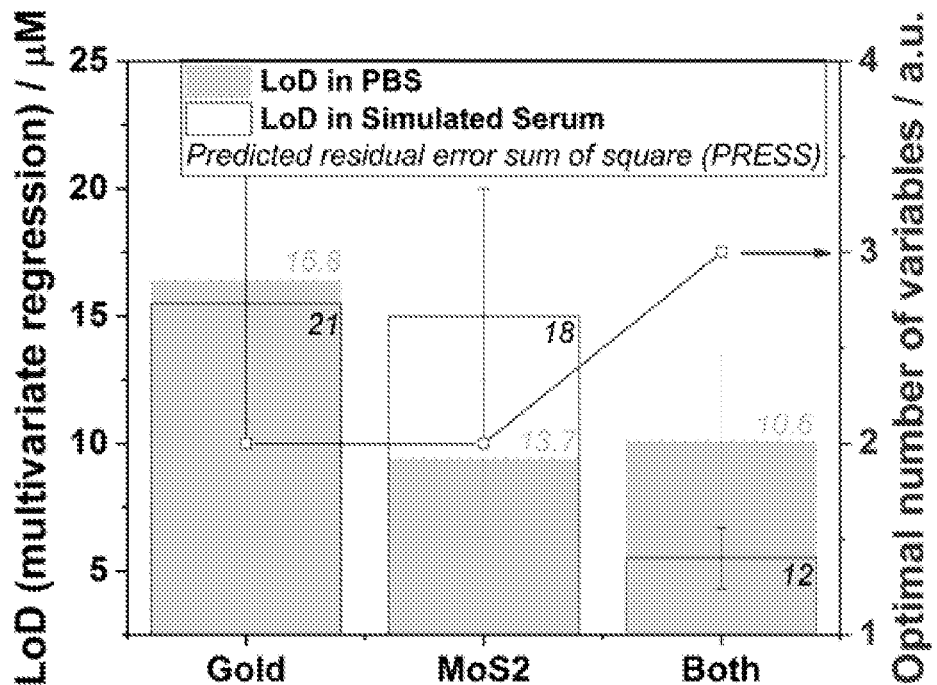
FIG. 6D shows the limit of detection calculated with the multivariate regression model for the isolated and combined electrodes datasets.

The PLSR analysis was used to predict the HU concentration over its full clinical range (0-500 μm, 0-37 ng ml-1), in PBS solution and in a simulated serum composed of 28 interfering molecules at their biological concentration (FIG. 6D). The best multivariate model comprises the dataset of both electrodes, and a limit of detection 5.5±1.8 μM is calculated (taken as 3 times the intercept error). The multivariate model uses the current vs potential relationship at 0.55 $V_{Ag/AgCl}$ for the gold electrode and at 0.45 and 0.5 $V_{Ag/AgCl}$ for the $MoS_2$ modified electrode, those variables present the highest VIP scores (2.04, 2.06 and 2.06, respectively). The limit of detection is lower than any univariate regression models. The predicted residual error sum of squares (PRESS) was used as a statistical measure of model accuracy. The number of variables used by the model depends on the combination of the datasets.

Example 5

Electrochemical Sensing of Hydroxyurea in Real Human Serum with an Electrode Array Comprising Three Working Electrodes Preparation and Electrochemical Measurements Serum samples were collected from a 38-year-old healthy volunteer (15 mL tubes, BD Vacutainer® SST™ II Advance, Fisher Scientific, Ltd.); blood is let to clot at room temperature for 30 min. The clotted blood is centrifuged (1200 rpm for 10 min) and the supernatant is collected and stored in new tubes. The supernatant is collected following another centrifugation step (1200 rpm for 10 min) and aliquots (0.5 mL) are stored in Eppendorf tubes at −20° C. Ethical approval was obtained from the Ben-Gurion University of the Negev Human Subjects Research Committee.

The simultaneous analysis of HU samples in undiluted human serum was carried out with a multi-channel potentiostat (CompactStat.h; Ivium Technologies B.V.), using an array consisting of three different working electrodes (a bare gold electrode, and the $MoS_2$-coated electrodes of Example 1, identified in example 1 as the third and fifth electrodes). The serum samples were spiked with HU stock concentrations (1, 2, 3, 4, 5, 6, 7, 8, 9, and 10 mM in PBS) to achieve physiological range of HU (50-500 μM) in the serum samples, and the three electrochemical methods were then applied (DPV, CV, and CA). DPV analysis conditions were the same as described earlier ($E_{ini}$=−0.2 V, $E_{fin}$=0.6 V, pulse height=0.1 V, pulse width=0.01 s, step height=5 mV, step time=0.1 s). The CV analysis was carried out at 500 V s$^{-1}$ in the potential range of −0.2 to 0.6 $V_{Ag/AgCl}$ and the CA analysis was carried out at 7 different potentials (−0.2, −0.1, 0, 0.1, 0.2, 0.3, 0.4, 0.5, and 0.6 $V_{Ag/AgCl}$) for 0.5 seconds with a sampling of 0.01 seconds.

Results

As pointed out above, the purpose of the study was to test the detectability of hydroxyurea with the aid of an array consisting three working electrodes: a bare polycrystalline gold electrode and two electrodes that were modified with MoS$_2$ (see the notation in FIG. 1; $\Psi_a$ corresponds to potential cycling at 1 V s$^{-1}$ in the gold double layer region, and $\Psi_b$ involves the concomitant oxidation of MoS$_2$ due to potential cycling at E>0.8 $V_{Ag/AgCl}$, i.e., from 0 to 1.4 $V_{Ag/AgCl}$; see Example 1). Three electrochemical technics were used to predict HU concentrations in human serum: DPV, CV and CA.

The pseudo-capacitive currents densities observed in the DPV analysis at 0 $V_{Ag/AgCl}$ decrease after modification with MOS$_2$ ($I_{MoS2-\psi a}$=1.8 µA cm$^{-2}$<$I_{MoS2-\psi b}$=6.0 µA cm$^{-2}$< $I_{Gold}$=9.2 µA cm$^{-2}$) and a cathodic potential shift of the main oxidation peak is observed when the TMDC material is deposited with $\Psi_b$ ($E_{MoS2-b}$=0.45 $V_{Ag/AgCl}$< $E_{MoS2-a}$=$E_{Gold}$=0.55 $V_{Ag/AgCl}$, FIG. 7A). The simultaneous acquisition of three electrochemical signals for the analysis of undiluted serum samples inherently generates an electrochemical noise due to the presence of plasma proteins. We reduced the electrochemical noise by smoothing and we curated the dataset to 17 main variables by extrapolation; this does not change the result of the PLSR analysis (FIG. 7A). The PCA analysis of the datasets before and after data curation display the same piecewise variation for low and high HU concentrations; hence, the synergic mixture of the redox active component present in the undiluted serum inducing a piecewise variation of the datasets was adequately reproduced by our simulated serum. We calculated the LoD for HU using either DPV, CV or CA for each of the electrode from univariate linear regression analysis with $R^2$>0.9 (FIG. 7B). The cumulative sensitivity parameter for each technique ($CS_{Technique}$) are in the same order of magnitude of those calculated for the simulated serum. The lowest achievable LoD from univariate regression analysis is 20±5 µM at the MoS$_2^b$ electrode using the DPV analysis with a sensitivity of 36.1±0.8 mA cm$^{-2}$ M$^{-1}$. Those values are also comparable to that in the simulated serum (FIG. 6D) and are suitable for clinical applications (ca. LoD<50 µM).

The PCA analysis carried out using the whole dataset comprising three electrodes and three electrochemical techniques also displays the characteristic piecewise variation for low and high HU concentrations (FIG. 7C). The vector parallel to the 200-500 µM HU concentration range in the loading plot corresponds to the current variation of the DPV analysis carried out with the MoS$_2^b$ electrode (FIG. 7C, red plot). The vectors corresponding to the CV analysis using MoS$_2^a$ and CA analysis using the bare gold electrode are also enlightened, they belong to the 10 variables with highest VIP scores explaining the variance of the HU calibration dataset in human serum.

Multivariate analysis was subsequently used to calculate the LoD value for HU in human serum with different electrode arrays and electroanalytical techniques array (FIG. 7D). The PLSR model with the whole dataset takes advantage of each analysis and electrode constructs (LoD=2.06±0.69 µM, PRESS=0.11 µM). The electroanalytical array is more sensitive (LoD=0.41±0.14 µM for the MoS$_2^a$ electrode, PRESS=0.10 µM), while the electrode array is more accurate (lowest PRESS=0.07 µM for DPV analysis, LOD=7.8±2.6 µM). The other two electrode arrays and two electroanalytical methods are less performant (FIG. 7D, large circles). Surprisingly, the array configurations that present the lowest LoD (22±7 nM, composed of the DPV technique with the gold and the MoS$_2^b$ electrode) exclude the variables corresponding to the most sensitive electroanalytical array (ca. the MoS$_2^a$ electrode). We used the combined selectivity of the PLSR analysis ($CS^{PLSR}$) as a tool to compare the performance of each array. The $CS_{PLSR}$ correspond to the average of sensitivities taken from univariate analysis and chosen from the variables selected by the multivariate model (FIG. 7D). Although the univariate analysis shows that the MoS$_2^b$ electrode is more sensitive, and correlate with highest $CS_{PLSR}$ values, the only array configuration that presents both low LOD and high $CS_{PLSR}$ corresponds to the electroanalytical array using the MoS$_2^a$ electrode construct (LOD=0.41±0.14 µM, $CS_{PLSR}$ 29.5±1.7 mA cm$^{-2}$ M$^{-1}$). The array configuration with the lowest LoD is relatively less sensitive; CV and CA datasets acquired with the MoS$_2^a$ electrode (LoD=53±17 nM with $CS_{PSVR}$=22.6±1.3 mA cm$^{-2}$ M$^{-1}$), Gold and MoS$_2$b datasets resulting from DPV analysis (LoD=22±7 nM with $CS_{PSV}$=13.7±0.6 mA cm$^{-2}$ M$^{-1}$) owning a maximum sensitivity from the DPV variables acquired at 0.55V with the MoS$_2$b electrode (S=37 mA cm$^{-2}$ M$^{-1}$). Test analysis was carried out for 2 datasets in FIG. 7D (CV+CA analysis with MoS$_2^a$ and DPV analysis of gold+MOS$_2$b) corresponding to the lowest achievable LoD values. Each HU concentration was calculated with the multivariable linear regression model from the dataset excluding the tested HU concentrations (FIG. 8). The linear regression analysis of predicted vs actual HU concentration shows that both models are accurate ($R^2$=0.99).

Example 6

Microfabrication of an Array Consisting of One Counter Electrode, Two Reference Electrode and Twenty-One Surface-Modified Gold Microelectrodes on Glass Substrate Step 1: Creating an Array of Bare Gold Microelectrodes A borosilicate glass substrate was cleaned with acetone, isopropanol, and DI water and then dried with nitrogen gas (FIG. 9A(i)). The photoresist (AZ 5214E) coating process started with spinning the wafer with the photoresist at 2200 RPM for 12 s, followed by a soft bake on a contact hot plate at 110° C. for 2 min and 30 s. Next, the electrode patterns were transferred from the mask using a hard contact of 7.6 mW/cm$^2$ for 65 s using a mask aligner (Karl Suss Mask Aligner MA6). The exposed wafer was then developed in AZ 726 MIF developer for 2 min, followed by rinsing in DI water for 5 min (FIG. 9A(ii-iii)). Next, 20 nm of titanium and 200 nm of gold were deposited using the E-gun deposition system (FIG. 9A(iv)). The wafer was then transferred to a beaker with acetone solution for a lift of process that resulted in the Au/Ti microelectrode patterns on a glass substrate (FIG. 9A (v)). The wafer was again rinsed in the DI water for 1 min to remove any residue from the wafer. SU8-3005 was used to define the microelectrode chamber; this allows cleaning the microelectrode with an AMI (acetone, methanol, and isopropanol) solution without destroying the chamber before using it. The process starts with spin coating SU8-3005 at 3000 RPM for 30 s, followed by a soft bake on a contact hot plate at 95° C. for 15 min. Next, the photoresist was exposed to light through the electrodes' mask using a hard contact of 7.6 mW/cm$^2$ for 50 s at a Mask Aligner (MA6, SUSS MicroTec). Post Exposer Bake (PEB) for 5 min at 95° C. was used, since this is a negative photoresist and the wafer was cooled down to room temperature. (FIG. 9B(i)). The exposed wafer was then developed in PGMA ERB developer solution for 8 min and washed in isopropanol solution for 10 s. The hard bake on a contact hot plate at 150° C. for 5 min was carried out to remove any hydration on the substrate, and oxygen plasma cleaning (30 W, 500 mTorr, 2 min, 3 sccm) was used after the hard bake to remove any residues or impurities on the substrate (FIG. 9B (ii)). The process of chamber microfabrication was repeated with same parameter but with new SU8 3050 to define the big chamber for solution (FIG. 9B (iii and iv)). The wafer was then coated with photoresist before dicing it into chips using a Dicing saw (ADT-7100). All chips were cleaned with AMI solution before use. The optical image was recorded using optical microscope.

Step 2: Surface Modification of the Microelectrodes

VSP potentiostat (Bio-Logic, Ltd.) was used for the modification of the microelectrodes to create different coatings on the gold surfaces in the multi-electrode array. Coating were electrodeposited using three-electrode cell arrangement or two-electrode cell arrangement.

The three-electrode cell configuration consisted of the microfabricated gold microelectrode(s) as working electrode, an externally applied commercial Pt ring counter electrode with an approximate surface area of 3.6 cm$^2$ (CHI115, CH Instruments; counter electrode; 'CE'), and an Ag/AgCl 3 M NaCl reference electrode (CHI111, CH Instruments; reference electrode; 'RE' $E_{SHE}$=0.210+$E_{Ag/AgCl}$).

For the two-electrode configuration (chronopotentiometry) reference electrode was shorted to the Pt ring electrode. All electrochemical potential values are versus Ag/AgCl half-cell potential.

Ag/AgCl Coated Reference Microelectrode ($n_{Ag/AgCl}$=2)

40 mL of Ag solution (Preparation 3) was used under continuous stirring at 200 rpm to electroplate gold microelectrode surface with Ag, applying the chronopotentiometry technique (cathodic current of 1.5 µA for 10 minutes) to selectively electroplate two microelectrodes simultaneously, by the two-electrode configuration, i.e., with reference electrode connected to ring counter electrode and two working microelectrodes from the chip.

After the Ag electroplating, ⅓ to ¼ of the Ag surface was converted to AgCl by chlorination in 0.1 M HCl solution. For this purpose, the total amount of charge, required to convert ⅓ to ¼ portion of electroplated Ag surface to Ag/Cl was calculated. A chronoamperometry technique was applied, at constant potential of 0.22 V under continuous stirring condition at 200 rpm for this purpose. Three electrode system, ring counter, Ag/AgCl reference and Ag electroplated as working microelectrodes were used (equation 1-4).

$$Q_{Ag} = I_{applied} \times \text{Time}, \quad (1)$$

$$Q_{req\_max} = Q_{Ag}(1/3) \text{ to } Q_{req\_min} = Q_{Ag}(1/4);$$

$$\text{Example: } Q_{Ag} = 1.570 \ \mu A \times 600 \ \text{Sec} = 942 \ \mu Q; \quad (2)$$

$$Q_{req\_max} = Q_{Ag}(1/3) = 942 \ \mu Q \times (1/3) = 314 \ \mu Q; \quad (3)$$

$$Q_{req\_min} = Q_{Ag}(1/4) = 942 \ \mu Q \times (1/4) = 235.5 \ \mu Q; \quad (4)$$

Hence, the amount of charge that needs to be transferred is between 235.5 and 314 µQ using chronoamperometry technique.

MoS$_2$-A coated working microelectrodes ($n_{MoS2-A}$=3)

Prior to the electrodeposition, the gold microelectrodes were electrochemically cleaned using CV in a 0.1 M H$_2$SO$_4$ electrolyte (10 ml) by cycling the potential from −0.4 to 1.4 $V_{Ag/AgCl}$ for 20 cycles until a steady voltammograms representative of a clean substrate is obtained. Next, the gold multi-microelectrode array chip was dipped in a 10 mL solution of MoS$_2$ (1 mg/mL) dispersed in 0.1 M sulfuric acid (see Preparation 1). The material was selectively deposited using CV technique: electrodeposition of MoS$_2$ was achieved in the gold electrochemical double layer potential range (−0.3 to +0.7 $V_{Ag/AgCl}$) at 100 mV/s for 20 cycles, in the three-cell configuration, on three Au microelectrodes.

MoS$_2$—B Coated Working Microelectrodes ($n_{MoS2-B}$=3)

Prior to the electrodeposition, the gold microelectrodes were electrochemically cleaned using CV in a 0.1 M H$_2$SO$_4$ electrolyte (10 ml) by cycling the potential from −0.4 to 1.4 $V_{Ag/AgCl}$ for 20 cycles until a steady voltammograms representative of a clean substrate is obtained. Next, the gold multi-microelectrode array chip was dipped in a 10 mL solution of MoS$_2$ (1 mg/mL) dispersed in 0.1 M sulfuric acid (see Preparation 1). The material was selectively deposited using CV technique: electrodeposition of MoS$_2$ was achieved in the gold electrochemical double layer potential range (0 to 1.4 $V_{Ag/AgCl}$) at 100 mV/s for 20 cycles, in the three-cell configuration, on three Au microelectrodes.

WS$_2$-A Coated Microelectrodes ($n_{WS2-A}$=3)

A protocol akin to the one described for the MoS$_2$-A electrodeposition was used to form WS$_2$-A coatings on three gold microelectrodes, which were simultaneously modified with the aid of the WS$_2$ electrodeposition solution of Preparation 2. The microelectrodes were first cleaned in 0.1 mM sulfuric acid solution (10 ml) in the voltage range from −0.4 to 1.4V for 20 cycles. Next, the gold multi-microelectrode array chip was dipped in a 10 mL solution of WS$_2$ (1 mg/ml) of Preparation 1). WS$_2$ films were then produced using cyclic voltammetry (20 cycles, 0.1V/s rate, on three Au electrodes.

WS$_2$—B Coated Microelectrodes ($n_{WS2-B}$=3)

A protocol akin to the one described for the MOS$_2$-B electrodeposition was used to form WS$_2$—B coatings on three gold microelectrodes, which were simultaneously modified with the aid of the WS$_2$ electrodeposition solution of Preparation 2. The microelectrodes were first cleaned in 0.1 mM sulfuric acid solution (10 ml) in the voltage range from −0.4 to 1.4V for 20 cycles. Next, WS$_2$—B films were produced using cyclic voltammetry (20 cycles, 0.1V/s rate, and voltage range: 0 to 1.4 $V_{Ag/AgCl}$).

Reduced Graphene Oxide-Coated Working Microelectrodes ($N_{r-GO}$=3)

50 ML of the GO electrodeposition solution (Preparation 4) was dropped on the chamber and the r-GO was selectively deposited using cyclic voltammetry (CV) technique (scanning initial potential $E_i$=−1.4 V vs RE, vertex #1 potential $E_1$=−1.4 V vs RE, vertex #2 potential $E_2$=1.4 V vs RE, scan rate=0.1 V/s, and the number of cycles=3). The electrodeposition process was optimized by varying the number of cycles (1, 2, 3, 4, and 5) and the scan rate (0.05, 0.1, 0.2, 0.3, and 0.5 V/s. Electrochemical modifications were performed using a VSP potentiostat (Bio-Logic, Ltd.) and in a three-electrode cell configuration consisting of the microfabricated microelectrode (working electrode; 'WE'), an externally applied commercial Pt wire (CHI115, CH Instruments; counter electrode; 'CE'), and a Tungsten needle (P/N H-20242, Quarter) coated with Ag/AgCl ink (011464, BAS Inc.; pseudo reference electrode; 'RE'). All electrochemical potential values are versus Ag/AgCl half-cell potential.

Chitosan-Coated Working Microelectrodes ($N_{chitosan}=3$)

The chronopotentiometry technique was used to modify three gold microelectrodes in the arrayed chip with time $t_s=3$ min and cathodic current $j_s=-4$ µA/cm². To this end, a two-electrode configuration was used, i.e., the counter electrode was shorted to reference terminal (see Preparation 5 for the electrodeposition solution). The electrodeposited microelectrodes were kept in buffer solution for 10 minutes to allow the weakly connected chitosan to be removed from the gold microelectrode surface.

Example 7

Electrochemical Sensing of Hydroxyurea in Real Human Serum with an Electrode Array Consisting of Twenty-One Working Electrodes Experimental Protocol Fifty clinical blood samples were taken from children affected with sickle cell disease [Cincinnati Children Hospital Medical Center (CCHMC)] and processed to recover the serum. All the patients were 2-11 years old, and the hydroxyurea concentration range in their blood was between 0-500 µM. The mean concentration of the hydroxyurea in the patient's blood was 256.6 µM, with a median of 261.8 µM, and the concentration's standard deviation was 122.3 µM (determined using HPLC method).

Electrochemical measurements were carried out according to the following protocol:

1. Take the one container of the patient's sample #1, out from the stock.
2. Put the containers on a bucket of ice for thawing to unfreeze the sample in liquid state for measurement.
3. Take 20 µL volume out from the container of 500 µL of patient sample #1, serum sample using micropipette, put it on the chamber of the microelectrode array chip #1.
4. Run the differential pulse voltammetry (DPV; potential sweep between Ei=−0.2V, EV=0.65V; pulse height PH=0.05 V; pulse width PW=0.009 s; step height SH=0.005V; step time ST=0.1 s).
5. Save the voltammograms with name and date of the ivium file.
6. Record three consecutive measurements with the same sample and save the file.
7. Remove the serum from the chamber with micropipette and clean it with PBS.
8. After cleaning with buffered solution, clean it with DI water and use fine wipes gently to completely dry the microchamber before proceeding to the next solution measurement.
9. Repeat step 1 to 8 for patient sample #2 and patient sample #3.
10. One modified sensor array chip was used to measure three patients' samples. After that a fresh modified sensor array chip was used for further sample measurements.

Results

Every patient has 21 electrochemical signals (collected from the 7×3 working electrodes), with 161 elements each (that describe the electrochemical response for the sample to the specific microelectrode), and the hydroxyurea concentration as gold standard measured with high-performance liquid chromatography (HLPC) technique. To develop the finest chemometric architecture, we applied signal and data processing methods to have valuable features for the algorithms creating the models.

A) Signal Preprocessing

The first step in the signal preprocessing phase is signal filtering using a moving average (MA) filter. The five samples window filtering was shown to preserve the electrochemical peak along with noise reduction.

The filtered electrochemical signals were the input for the outlier detection stage. The outlier detection uses an optimized amplitude threshold of 2.6 nA applied on the maximal amplitude value of the examined signal. 13.7% of the electrochemical signals were removed (144 out of 1050). The electrochemical signals of patient no. 14 have been found irrelevant, and the sample was deleted from the electrochemical dataset.

Next, a 'smart merging tool' was applied. The electrochemical multi-sensor array has seven types of working electrodes (bare gold and six different electrocatalytic modification) with three repeats each; that is, $n_1=n_2=n_3=n_4=n_5=n_6=n_7=3$. Those groups of three electrodes modified with the same electrocatalytic are expected to generate a similar electrochemical signal. However, the inner variance between the groups of the same modified electrodes need to be considered, to treat cases of considerable change in one of the modified microelectrodes. Therefore, the following approach was used:

$$E_A, E_B = \underset{E_1, E_2, E_3}{\mathrm{argmin}} \left( \Sigma_{m,n=1,2,3; m \neq n} \left| \mathrm{Signal}_{E_m} - \mathrm{Signal}_{E_n} \right| \right)$$

$$\mathrm{Signal}_{Final} = \frac{E_A + E_B}{2}$$

Namely, the absolute difference between every pair of electrodes of a given group is calculated, to find the couple with the minimal difference. Then, the average of the electrochemical signals of the two electrodes selected is calculated. This combination method can reduce the inner variance noise by removing the electrochemical signal with considerable dissimilarity to the other signal while using the electrochemical data from more than one microelectrode. The described outlier detection method was implemented by manually writing customized MATLAB functions to perform the mentioned algorithm.

After all the preprocessing steps, the updated electrochemical dataset contains seven electrochemical signals for each patient, with 49 patients remaining out of 50.

B) Feature Extraction

Every patient has seven different electrochemical signals labeled by their generated microelectrode modification type with 161 elements each. Feature extraction tools were applied to create separate feature matrices reflecting different data analysis approaches. The outcome of the feature extraction phase is four matrices originated in the principal component analysis (PCA) feature extraction method and one feature matrix from the electrochemical feature approach.

B1) Principal Component Analysis (PCA)

PCA was performed by changing two main properties on the extraction process—the PCA data matrix source and signal amplitude normalization, resulting in four different PCA-based feature matrices. The prevalent data matrix for the PCA feature extraction method is to concatenate the electrochemical signals from every multi-microelectrode array resulting in a "super signal" that describes the electrochemical activity of the examined sample. A different approach to PCA-based feature extraction process was used. The novel approach generates a data matrix by merging the signals based on their modification type and not by their sample's source. The result is seven data matrices for seven different modifications containing one representative signal for each patient, as shown in FIG. 12, where two types of data matrices for the PCA feature extraction phase—PCA for concatenated signals and PCA for sub-data matrices divided by modification, are illustrated.

Compared to the "super signal" method, the "PCA-by-modification" approach preserves the inner modification variance that contributes to the feature's significance. After performing the "PCA-by-modification" method, the first 3 PCs represented more than 85% of the variance were taken from each data matrix and concatenate together, resulting in 21 highly valuable features for each patient.

The other examined property was the signal's amplitude normalization. We inspect two types for signal amplitude-original signal and maximum amplitude normalization approach.

The unique physical properties for a given electrochemical signal located in the relation between the applied voltage and the current amplitude response. On the one hand, we should preserve this signal characteristic and look at the raw signal amplitudes. On the other hand, each modification has its amplification properties, and comparing them without considering the amplification difference could lead to insignificant or misleading features.

To save the voltage-current uniqueness and yet have the same amplification factor on every signal, we performed a maximum amplitude normalization. As a result, all the electrochemical signal's amplitude converted to the range of [0,1] while preserving the voltage-current uniqueness in each signal. The PCA dimensionality reduction implementation resulted in a decrease of 94.4% stored data per patient (1,127 elements to 21 features—seven 3-dimensional features) that can differentiate the patient electrochemical fingerprint. FIG. 13 visualized the PCA by modification for result the normalized electrochemical signal. Every patient's unique fingerprint can be separately clustered in the new 3-dimensional space.

B2) Electrochemical Features

Peak Detection

The estimated baseline was removed, applying the SWiMA algorithm, as shown in FIG. 14A (the original normalized signal is in blue, the estimated baseline is in green, and the clean signal (red) and 14B (the output signal after the baseline reduction).

Next, peak detection using optimized MATLAB's peak finder function was carried out. This is illustrated in FIG. 15: FIG. 15A shows the peak estimation on the normalized signal, while FIG. 15B shows the peaks projection on the original signal, resulting in accurate peak detection in the original signal.

Peak Selection

Table 2 outlines statistical information regarding the number of peaks identified for each of the seven modifications, i.e., the bare electrodes and the six distinct types of coated electrodes. Based on the data tabulated in Table 2 (minimal and maximal numbers of peaks, median and standard deviation), five peaks were extracted from each electrochemical signal.

TABLE 2

(Statistical information for the peak finder preformance for each modification)

| Modification | Min | Max | Median | STD |
|---|---|---|---|---|
| $MoS_{2a}$ | 3 | 12 | 6.58 | 2.10 |
| $MoS_{2b}$ | 2 | 10 | 5.83 | 1.67 |
| $WS_{2a}$ | 2 | 10 | 5.33 | 1.89 |
| $WS_{2b}$ | 3 | 9 | 5.50 | 1.50 |
| Chitosan | 4 | 10 | 6.42 | 2.09 |
| r-GO | 3 | 10 | 5.52 | 1.38 |
| Bare | 3 | 10 | 6.50 | 1.66 |

FIGS. 16A and 16B show peaks histograms for two types of coatings, the $MoS_2$-A modified microelectrode (16A) and chitosan modified microelectrode (16B). Similar histograms were created for the other types of microelectrodes, and the data (positions of selected five peaks for each type) is tabulated in Table 3. Table 3 presenting the final peaks' anchors selected for the peak adjustment process. The peaks' anchors, spanning the potential range from negative values to relatively high voltage, describe the electrochemical signal comprehensively.

TABLE 3

(Most common peak position for every modification set as the "peaks' anchors" for the peak selection function)

| Modification | Peak1 [mV] | Peak2 [mV] | Peak3 [mV] | Peak4 [mV] | Peak5 [mV] |
|---|---|---|---|---|---|
| $MoS_{2a}$ | −160 | 15 | 160 | 225 | 335 |
| $MoS_{2b}$ | −175 | −40 | 30 | 330 | 400 |
| $WS_{2a}$ | −160 | −40 | 75 | 380 | 465 |
| $WS_{2b}$ | −175 | −15 | 90 | 240 | 365 |
| Chitosan | −180 | −105 | 35 | 320 | 450 |
| r-GO | −170 | 15 | 155 | 420 | 575 |
| Bare | −180 | −110 | −30 | 90 | 345 |

Peak Transformation

The final feature matrix contains 35 2-dimensional features for each patient, five with features for each signal. The contemplated AI algorithms cannot relate to the current and voltage peak values as a 2-dimensional feature. To have a 1-dimensional feature that has a unique value for every peak combination, the injective transformation shown above was used:

$$\text{Electrochemical Peak Feature} = tg\left(\frac{I_p}{E_p}\right) \times \sqrt{I_p^2 + E_p^2} \quad (5)$$

(taken as tangent of the ratio between the peak current and peak potential, multiplied by their radial distance), creating a feature matrix consisting of 35 1-dimensional features for each patient.

C) Prediction of Hydroxyurea in Serum with a Regression Model

The chosen regression algorithm was PLSR. The PLSR algorithm's main hyperparameter is the number of latent variables. To obtain an accurate and robust model, we optimized the latent variables number by minimizing the predictor's MSE while maximizing the proportion of variance explained. This optimization process was performed on each optional PLSR regression model to set the suitable number of latent variables. To avoid overfitting, we selected the number of latent variables using an improvement threshold in the saturated area on the MSE predictors results. The number of chosen features can be found in Table 4. After having two optional optimized PLSR models, we used the optimized model configuration to evaluate the samples in test data. The 49 samples were split into 44 training samples and 5 test samples. Table 4 shows the model performances for train and test data using the RMSE score and the Pearson correlation coefficient.

TABLE 4

| Feature Properties | | | | | |
|---|---|---|---|---|---|
| Algorithm | Type | Number | Dataset | RMSE | Pearson |
| PLSR | PCA by Modification | 16 | Train | 43.261 | 0.941 |
|  |  |  | Test | 142.11 | 0.519 |
| PLSR | Electrochemical | 20 | Train | 43.360 | 0.941 |
|  |  |  | Test | 248.65 | 0.209 |

The invention claimed is:

1. An electrochemical sensor comprising an array of working electrodes made of noble metals, wherein the array includes:
    one or more bare working electrode(s); and
    a first set of working electrodes coated with a first transition metal dichalcogenide, the first set comprises at least subset A and subset B, wherein working electrodes of subset B show the presence of hydroxide form(s) and/or high oxidation state oxide form(s) of the noble metals, whereas working electrodes of subset A are free of such form(s); and/or working electrodes of subset B show higher capacitive currents and lower charge transfer resistance compared to working electrodes of subset A, as determined by electrochemical impedance spectroscopy.

2. An electrochemical sensor according to claim 1, wherein the first transition metal dichalcogenide is molybdenum disulfide ($MoS_2$).

3. An electrochemical sensor according to claim 1, comprising a second set of working electrodes coated with a second transition metal dichalcogenide, the second set comprises at least subset A and subset B, wherein working electrodes of subset B show the presence of hydroxide form(s) and/or high oxidation state oxide forms(s) of the noble metals, whereas working electrodes of subset A are free of such form(s); and/or working electrodes of subset B show higher capacitive currents and lower charge transfer resistance compared to working electrodes of subset A, as determined by electrochemical impedance spectroscopy.

4. An electrochemical sensor according to claim 3, wherein the second transition metal dichalcogenide is tungsten disulfide ($WS_2$).

5. An electrochemical sensor according to claim 1, comprising one or more polysaccharide-coated working electrodes and/or one or more reduced graphene oxide-coated electrodes.

6. An electrochemical sensor according to claim 1, further comprising a counter electrode and one or more reference electrode(s) integrated in the sensor.

7. An electrochemical sensor according to claim 6, which is a microsensor comprising microelectrodes, wherein working microelectrodes, a counter microelectrode and one or more reference microelectrode(s) are in the form of microstructures placed on a base substrate, wherein a microstructure comprises an electrode layer, optionally disposed atop of an adhesion layer attached to the substrate, wherein the microstructures are spaced apart from each other, with a wall encircling each microstructure, said wall protruding from the surface of the substrate and being made of electrically insulating polymer.

8. An electrochemical sensor according to claim 7, wherein the working microelectrodes and the one or more reference microelectrode(s) are placed around a circular-shaped counter microelectrode, equidistantly from the perimeter of the counter microelectrode.

9. An electrochemical sensor according to claim 7, wherein the working microelectrodes, the one or more reference electrode(s) and the counter microelectrode are patterned on the base substrate made of glass or silicon/silicon oxide, the adhesion layer is made of titanium and the electrode layer is made of gold.

10. An electrochemical sensor according to claim 7, comprising:
    one or more bare microelectrodes;
    one or more $MoS_2^A$-coated microelectrodes of subset A;
    one or more $MoS_2^B$-coated microelectrodes of subset B;
    one or more $WS_2^A$-coated microelectrodes of subset A;
    one or more $WS_2^B$-coated microelectrodes of subset B;
    one or more polysaccharide-coated microelectrodes;
    one or more reduced graphene oxide-coated microelectrodes;
    the one or more reference microelectrode(s); and
    the counter microelectrode.

11. A device for electrochemical detection, comprising:
    the electrochemical microsensor as defined in claim 1;
    optionally a counter electrode and reference electrode(s);
    a potentiostat or galvanostat to which the array of working electrodes is electrically connected to control the potential or current of each working electrode, respectively, to create a data set of electrochemical signals when the array of working electrodes is in contact with a sample;
    a processor configured to analyze the data set of electrochemical signals by one or more chemometric techniques.

12. A process of preparing an electrochemical microsensor, comprising:
    creating microstructures on a base substrate, wherein the microstructures comprise an electrode material, optionally disposed atop of an adhesion layer attached to the substrate, wherein the microstructures are spaced apart from each other by walls encircling each microstructure and protruding from the surface of the substrate; and
    applying Ag/AgCl coating on the electrode material of at least one microstructure, to provide at least one reference electrode;
    electrodepositing a first transition metal dichalcogenide on the electrode material of at least one microstructure by cycling over potential range A, which corresponds to an electrochemical double layer potential region of said electrode material; and
    electrodepositing the first transition metal dichalcogenide on the electrode material of at least one microstructure by cycling over a potential range B, wherein potential range B extends to more positive potentials than potential range A.

13. A process according to claim 12, wherein the microstructures and the walls encircling the microstructures are created by photolithography, etching or both.

14. A process according to claim 12, further comprising the steps of: electrodepositing a second transition metal dichalcogenide on the electrode material of at least one microstructure by cycling over the potential range A, which corresponds to a double layer potential region of said electrode material; and electrodepositing a second transition metal dichalcogenide on the electrode material of at least one microstructure by cycling over the potential range B, wherein potential range B extends to more positive potentials than potential range A.

15. A process according to claim 12, wherein the electrode material consists of gold, the potential range A is −0.3 to +0.7 V versus Ag/AgCl and potential range B extends up to +1.4 V versus Ag/AgCl.

16. A process according to claim 14, wherein the first transition metal dichalcogenide is $MoS_2$ and the second transition metal dichalcogenide is $WS_2$.

17. A process according to claim 12, further comprising:
a step of electrodepositing reduced graphene oxide on the electrode material of at least one microstructure; and/or
a step of electrodepositing chitosan on the electrode material of at least one microstructure, optionally with conductive additive incorporated into the chitosan.

* * * * *